(12) United States Patent
Wang et al.

(10) Patent No.: US 11,603,417 B2
(45) Date of Patent: Mar. 14, 2023

(54) PRODUCTION METHOD FOR POLAR OLEFIN POLYMER AND COPOLYMER

(71) Applicant: RIKEN, Saitama (JP)

(72) Inventors: Chunxiang Wang, Saitama (JP); Haobing Wang, Saitama (JP); Yang Yang, Saitama (JP); Masayoshi Nishiura, Saitama (JP); Zhaomin Hou, Saitama (JP)

(73) Assignee: RIKEN, Wako (JP)

( * ) Notice: Subject to any disclaimer, the term of this patent is extended or adjusted under 35 U.S.C. 154(b) by 586 days.

(21) Appl. No.: 16/493,743

(22) PCT Filed: Mar. 14, 2018

(86) PCT No.: PCT/JP2018/010009
§ 371 (c)(1),
(2) Date: Sep. 12, 2019

(87) PCT Pub. No.: WO2018/168940
PCT Pub. Date: Sep. 20, 2018

(65) Prior Publication Data
US 2020/0010581 A1 Jan. 9, 2020

(30) Foreign Application Priority Data
Mar. 14, 2017 (JP) .............................. JP2017-049096

(51) Int. Cl.
*C08F 4/54* (2006.01)
*C08F 28/04* (2006.01)
(Continued)

(52) U.S. Cl.
CPC .............. *C08F 4/6192* (2013.01); *C08F 4/54* (2013.01); *C08F 28/04* (2013.01); *C08F 212/08* (2013.01); *C08F 236/08* (2013.01)

(58) Field of Classification Search
CPC .......... C08F 4/54; C08F 28/04; C08F 212/08; C08F 236/08
See application file for complete search history.

(56) References Cited

U.S. PATENT DOCUMENTS

2007/0232758 A1 10/2007 Hou et al.
2017/0335036 A1 11/2017 Cui et al.

FOREIGN PATENT DOCUMENTS

| JP | 05-310834 A | 11/1993 |
| JP | 2001-329023 A | 11/2001 |

(Continued)

OTHER PUBLICATIONS

Byun, Doo-Jin et al., "Synthesis of Phenol Group Containing Polyethylenes via Metallocene Catalyzed Ethylene-Allylanisole Copolymerization", Macromolecular Chemistry and Physics, 2001, vol. 202, No. 7, pp. 992-997 (7 pages).

(Continued)

*Primary Examiner* — Catherine S Branch
(74) *Attorney, Agent, or Firm* — Foley & Lardner LLP

(57) ABSTRACT

An object of the present invention is to provide a novel method of producing a nonpolar olefin polymer (e.g., a copolymer of a nonpolar olefin and a polar olefin). The present invention provides a method of producing a polar olefin polymer or copolymer, the method including the polymerization step of polymerizing a polar olefin monomer using, as a catalyst, a polymerization catalyst composition containing: 1) a metallocene complex represented by Formula (I), which contains a central metal M that is scandium (Sc) or yttrium (Y), a ligand Cp* containing a cyclopentadienyl derivative and being bound to the central metal, monoanionic ligands $Q^1$ and $Q^2$, and W neutral Lewis bases L wherein W is an integer of 0 to 3; and 2) an ionic compound composed of a non-coordinating anion and a cation.

(Continued)

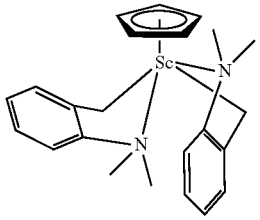

Sc-1

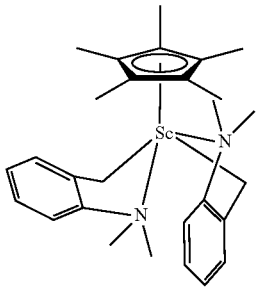

Sc-2

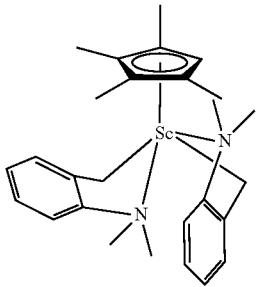

Sc-3

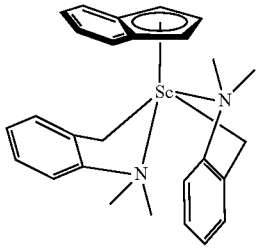

Sc-4

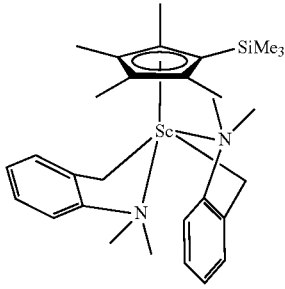

Sc-5

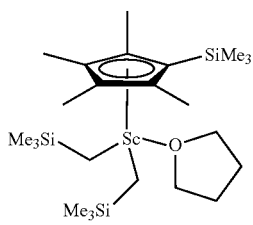

Sc-6

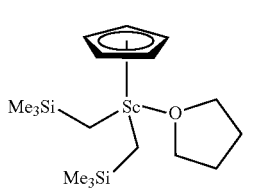

Sc-7

2 Claims, 21 Drawing Sheets

(51) Int. Cl.
*C08F 212/08* (2006.01)
*C08F 236/08* (2006.01)
*C08F 4/6192* (2006.01)

(56) References Cited

FOREIGN PATENT DOCUMENTS

| JP | 2002-201225 A | 7/2002 |
| JP | 2010-241930 A | 10/2010 |
| WO | WO-2006/004068 A1 | 1/2006 |
| WO | WO-2016/023503 A1 | 2/2016 |

OTHER PUBLICATIONS

Chen, Jiazhen et al., "Scandium-Catalyzed Self-Assisted Polar Co-monomer Enchainment in Ethylene Polymerization", Angewandte Chemie International Edition, Oct. 23, 2017, vol. 56, Issue 50, pp. 15964-15968 (6 pages).
International Preliminary Report on Patentability dated Sep. 26, 2019 for corresponding Application No. PCT/JP2018/010009 (19 pages).
International Search Report dated Jun. 5, 2018 for corresponding Application No. PCT/JP2018/010009 (9 pages).
Nakamura A., Accounts of Chemical Research, 1438-1449, 2013, vol. 46, No. 7 (12 pages).
Terao H. et al., J. Am. Chem. Soc. 2008, 130, 17636-17637 (2 pages).

PRODUCTION METHOD FOR POLAR OLEFIN POLYMER AND COPOLYMER

RELATED APPLICATIONS

The present application claims priority under 37 U.S.C. § 371 to International Patent Application No. PCT/JP2018/010009, filed Mar. 14, 2018, which claims priority to and the benefit of Japanese Patent Application No. 2017-049096, filed on Mar. 14, 2017. The contents of these applications are hereby incorporated by reference in their entireties.

TECHNICAL FIELD

The present invention relates to a production method of a polar olefin polymer and copolymer using a polymerization catalyst composition containing a metallocene complex. In addition, the present invention relates to a polar olefin polymer and a copolymer that are produced by the production method.

BACKGROUND ART

Polyolefins such as polyethylenes are widely used in modern society. However, the range of their application is limited relative to the potential of polyolefins. One of the reasons for this is that polyolefins are poorly compatible with other materials, such as polar polymers, polar dyes, glass fibers, clays, and metals. Therefore, aiming at improving the performance and physical properties of polyolefins, addition of chemical functions and polar groups to polyolefins have been widely studied (Non-patent Document 1). Copolymerization of an olefin monomer such as ethylene and a polar olefin monomer containing a heteroatom-containing functional group is considered as one technique that can potentially synthesize a functional group-containing polyolefin.

Non-patent Document 2 describes that copolymerization of ethylene and 5-hexane-1-yl-acetate was performed using a co-catalyst that masks a functional group, such as methylaluminoxane (MAO), along with catalysts such as titanium and zirconium-metallocene complex. However, this copolymerization has problems in terms of the polar monomer introduction rate and the molecular weight of the resulting copolymer.

It is known that catalysts, such as nickel and palladium complex, are capable of catalyzing polymerization of ethylene and a polar monomer without masking any functional group. However, the polymerization activity of a polar monomer with ethylene is usually extremely low, and the polar monomer introduction rate and the molecular weight of the resulting copolymer are not considered to be sufficient.

Therefore, it is desired to synthesize a functional group-containing polyolefin that has a high molecular weight and a large content of a functional group-containing monomer.

Patent Document 1 discloses inventions relating to a polymerization catalyst composition containing a metallocene complex, a production method of a (co)polymer using the polymerization catalyst composition, and a (co)polymer produced by the production method. However, Patent Document 1 offers no description with regard to polymerization of a polar olefin.

PRIOR ART DOCUMENTS

Patent Documents

Patent Document 1: WO 2006/004068

Non-Patent Documents

Non-patent Document 1: Nakamura A., ACCOUNTS OF CHEMICAL RESEARCH, 1438-1449, 2013, Vol. 46, No. 7

Non-patent Document 2: Terao H. et al., J. AM. CHEM. SOC. 2008, 130, 17636-17637

SUMMARY OF THE INVENTION

Technical Problem

The present invention was made under the above-described circumstances, and an object of the present invention is to provide a novel method of producing a nonpolar olefin polymer (e.g., a copolymer of a nonpolar olefin and a polar olefin).

Solution to Problem

The present inventors intensively studied to solve the above-described problems. In copolymerization of a functional group-containing α-olefin with a nonpolar olefin, it is important to improve the polymerization activity of the functional group-containing α-olefin for achieving a high molecular weight and a high introduction rate of a functional group-containing monomer in the resulting copolymer.

The present inventors found that a heteroatom in a functional group-containing α-olefin interacts with a central metal of a specific catalyst to form an intramolecular chelate and to thereby facilitate the interaction between the catalyst and an olefin unit and enhance the polymerization activity of the functional group-containing α-olefin, as a result of which the introduction rate of the functional group-containing monomer into the resulting copolymer can be improved. The present inventors also found that an intramolecular interaction (chelate formation) of the heteroatom and olefin unit of the functional group-containing α-olefin with the central metal of the catalyst can induce a unique stereoselectivity (syndiotacticity), which is difficult in heteroatom-free analogous compounds. Using such a heteroatom-assisted olefin polymerization (HOP) strategy, the present inventors successfully synthesized heteroatom functional group-containing polyolefins having a high molecular weight and a wide range of polar monomer content. The present invention was completed based on these findings.

That is, the gist of the present invention is as follows.

[1] A method of producing a polar olefin polymer or copolymer, the method including the polymerization step of polymerizing a polar olefin monomer using, as a catalyst, a polymerization catalyst composition containing:

1) a metallocene complex represented by the following Formula (I), which contains a central metal M that is scandium (Sc) or yttrium (Y), a ligand Cp* containing a cyclopentadienyl derivative and being bound to the central metal, monoanionic ligands $Q^1$ and $Q^2$, and W neutral Lewis bases L wherein W is an integer of 0 to 3; and 2) an ionic compound composed of a non-coordinating anion and a cation:

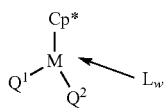
(I)

[2] The method according to [1], wherein the ligand Cp* in the metallocene complex is selected from the group consisting of a substituted or unsubstituted cyclopentadienyl ring, a substituted or unsubstituted indenyl ring, and a substituted or unsubstituted fluorenyl ring.

[3] The method according to [1] or [2], wherein the monoanionic ligands $Q^1$ and $Q^2$ in the metallocene complex are independently a trimethylsilylmethyl group or an o-dimethylaminobenzyl group.

[4] The method according to any one of [1] to [3], wherein the neutral Lewis bases L in the metallocene complex are tetrahydrofuran.

[5] The method according to any one of [1] to [4], wherein the polymerization step is performed in the presence of a solvent selected from the group consisting of saturated aliphatic hydrocarbons, saturated alicyclic hydrocarbons, aromatic hydrocarbons, and halogenated hydrocarbons.

[6] The method according to any one of [1] to [5], wherein the polar olefin monomer contains a polar group represented by the following Formula (II):

$$-Z(R^1)_n \quad (II)$$

(wherein, Z represents a heteroatom selected from the group consisting of nitrogen, oxygen, phosphorus, sulfur, and selenium; $R^1$ represents a substituted or unsubstituted hydrocarbyl group having 1 to 30 carbon atoms; and n represents an integer of 1 or 2 depending on the atomic species of Z).

[7] The method according to any one of [1] to [6], wherein the polar olefin monomer is a compound represented by the following Formula (III):

$$CH_2=CH-R^2-Z(R^1)_n \quad (III)$$

(wherein, Z, $R^1$ and n have the same meanings as described above; and $R^2$ represents a substituted or unsubstituted hydrocarbylene group having 2 to 20 carbon atoms).

[8] A polar olefin polymer that is a polymer of a polar olefin monomer represented by the following Formula (III), the polymer having a syndiotacticity of 60 rrrr % or higher in a pentad indication:

$$CH_2=CH-R^2-Z(R^1)_n \quad (III)$$

(wherein, Z represents a heteroatom selected from the group consisting of nitrogen, oxygen, phosphorus, sulfur, and selenium; $R^1$ represents a substituted or unsubstituted hydrocarbyl group having 1 to 30 carbon atoms; n represents an integer of 1 or 2 depending on the atomic species of Z; and $R^2$ represents a substituted or unsubstituted hydrocarbylene group having 2 to 20 carbon atoms).

[9] A nonpolar olefin-polar olefin copolymer that is a copolymer of a nonpolar olefin monomer and a polar olefin monomer represented by the following Formula (III), the copolymer having a ratio of a polar olefin structural unit of not lower than 2% by mole with respect to all structural units:

$$CH_2=CH-R^2-Z(R^1)_n \quad (III)$$

(wherein, Z represents a heteroatom selected from the group consisting of nitrogen, oxygen, phosphorus, sulfur, and selenium; $R^1$ represents a substituted or unsubstituted hydrocarbyl group having 1 to 30 carbon atoms; n represents an integer of 1 or 2 depending on the atomic species of Z; and $R^2$ represents a substituted or unsubstituted hydrocarbylene group having 2 to 20 carbon atoms).

[10] The nonpolar olefin-polar olefin copolymer according to [9], wherein the ratio of the polar olefin structural unit is not lower than 20% by mole with respect to all structural units.

[11] The nonpolar olefin-polar olefin copolymer according to [9] or [10], wherein the copolymer has a number-average molecular weight of not less than $2.0\times10^3$.

[12] The nonpolar olefin-polar olefin copolymer according to any one of [9] to [11], wherein the copolymer is a copolymer of the nonpolar olefin monomer and a polar olefin monomer represented by the following Formula (IV):

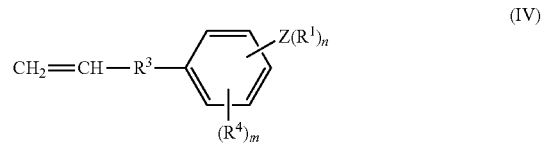
(IV)

(wherein, Z, $R^1$ and n have the same meanings as described above; $R^3$ represents a hydrocarbylene group having 1 to 5 carbon atoms; $R^4$ represents a halogen atom, a hydrocarbyl group having 1 to 10 carbon atoms, an alkylthio group having 1 to 10 carbon atoms, an alkylamino group having 1 to 10 carbon atoms, or an alkoxy group having 1 to 10 carbon atoms; when $R^4$ is a hydrocarbyl group, $R^4$ is optionally bound to form a fused ring; and m represents an integer of 0 to 4).

Advantageous Effects of the Invention

According to the present invention, a novel method of producing a nonpolar olefin polymer (e.g., a copolymer of a nonpolar olefin and a polar olefin) can be provided. According to this production method of the present invention, a copolymer of a nonpolar olefin and a polar olefin, which copolymer has a high ratio of a polar olefin structural unit, can be provided. Further, according to the production method of the present invention, a copolymer of a nonpolar olefin and a polar olefin, which copolymer has a high molecular weight, can be provided. Moreover, according to the production method of the present invention, a polar olefin polymer having a high syndiotacticity can be provided.

DESCRIPTION OF THE EMBODIMENTS

Figure 1:
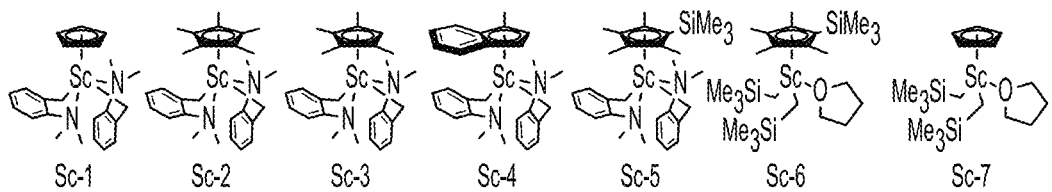
FIG. 1 shows the structures of metallocene complexes used in Examples.

Embodiments of the present invention will now be described in detail.

The present invention relates to a method of producing a polar olefin polymer or copolymer, the method including the polymerization step of polymerizing a polar olefin monomer using a metallocene complex-containing polymerization catalyst composition as a catalyst (more specifically, the polymerization step of polymerizing only a polar olefin monomer, or the copolymerization step of polymerizing a polar olefin monomer and a monomer different from the polar olefin monomer). The polymerization catalyst composition used in the production method of the present invention contains a metallocene complex and an ionic compound. The polymerization catalyst composition may further contain other optional component(s).

<Catalyst Composition Used in Production Method of Present Invention>

(Metallocene Complex)

The metallocene complex is a complex represented by the following Formula (I).

In Formula (I), M represents a central metal in the metallocene complex. The central metal M is selected from scandium (Sc) and yttrium (Y).

In Formula (I), Cp* represents a ligand containing a cyclopentadienyl derivative and forms a π-bond with the central metal M. Examples of the cyclopentadienyl derivative include a substituted or unsubstituted cyclopentadienyl ring, and fused rings containing substituted or unsubstituted cyclopentadienyl (including, but not limited to, an indenyl ring and an fluorenyl ring).

The substituted or unsubstituted cyclopentadienyl ring is represented by a composition formula $C_5H_{5-x}R_x$, wherein x represents an integer of 0 to 5. In other words, the composition formula represents an unsubstituted cyclopentadienyl ring when x=0, or a substituted cyclopentadienyl ring when x=1 to 5. Each of Rs independently represents a hydrocarbyl group, a substituted hydrocarbyl group, or a hydrocarbyl group-substituted metalloid group.

The hydrocarbyl group is preferably a hydrocarbyl group having 1 to 20 carbon atoms, more preferably an alkyl group having 1 to 20 carbon atoms (preferably 1 to 10 carbon atoms, more preferably 1 to 6 carbon atoms), a phenyl group, a benzyl group or the like, most preferably a methyl group.

A hydrocarbyl group in the above-described substituted hydrocarbyl group is the same as the above-described hydrocarbyl group. The term "substituted hydrocarbyl group" used herein refers to a hydrocarbyl group in which at least one hydrogen atom is substituted with, for example, a halogen atom, an amide group, a phosphide group, an alkoxy group, or an aryloxy group.

Examples of a metalloid in the above-described hydrocarbyl group-substituted metalloid group include germyl (Ge), stannyl (Sn), and silyl (Si). Further, the hydrocarbyl group substituting the metalloid group is the same as the above-described hydrocarbyl group, and the number of substitutions is determined based on the type of the metalloid (e.g., in the case of a silyl group, the number of hydrocarbyl group substitutions is 3).

At least one of Rs of the cyclopentadienyl ring is a hydrocarbyl group-substituted metalloid group (preferably a silyl group), more preferably a trimethylsilyl group.

The cyclopentadienyl derivative contained in the ligand Cp* may be, for example, a substituted or unsubstituted indenyl ring (composition formula: $C_9H_{7-x}R_x$), or a substituted or unsubstituted tetrahydroindenyl ring (composition formula: $C_9H_{11-x}R_x$). In these composition formulae, R is the same as in the above-described cyclopentadienyl ring, and x represents an integer of 0 to 7, or 0 to 11. In other words, these composition formulae represent an unsubstituted indenyl ring and an unsubstituted tetrahydroindenyl ring when x=0, or a substituted indenyl ring and a substituted tetrahydroindenyl ring when x=1 to 7 and 1 to 11, respectively.

The cyclopentadienyl derivative contained in the ligand Cp* may also be, for example, a substituted or unsubstituted fluorenyl ring (composition formula: $C_{13}H_{9-x}R_x$), or a substituted or unsubstituted octahydrofluorenyl ring (composition formula: $C_{13}H_{17-x}R_x$). In these composition formulae, R is the same as in the above-described cyclopentadienyl ring, and x represents an integer of 0 to 9, or 0 to 17. In other words, these composition formulae represent an unsubstituted fluorenyl ring and an unsubstituted octahydrofluorenyl ring when x=0, or a substituted fluorenyl ring and a substituted octahydroindenyl ring when x=1 to 9 and 1 to 17, respectively.

When a sterically bulky polar olefin monomer is used in a polymerization reaction or when interaction of the heteroatom and olefin unit of the polar olefin monomer with the central metal of the catalyst is unlikely to occur, it is effective to use a sterically less bulky complex, such as a complex having an unsubstituted cyclopentadienyl ligand that is sterically less bulky.

Examples of a preferred cyclopentadienyl derivative include a substituted or unsubstituted cyclopentadienyl ring, a substituted or unsubstituted indenyl ring, and a substituted or unsubstituted fluorenyl ring. Specific examples thereof include, but not limited to: cyclopentadienyl, tetramethylcyclopentadienyl, pentamethylcyclopentadienyl, tetramethyl(trimethylsilyl)cyclopentadienyl, and indenyl.

In the complex represented by Formula (I) that is used in the present invention, $Q^1$ and $Q^2$ are the same monoanionic ligand or different monoanionic ligands. Examples of the monoanionic ligands include, but not limited to: 1) a hydride, 2) a halide, 3) a substituted or unsubstituted hydrocarbyl group having 1 to 20 carbon atoms, 4) an alkoxy group or aryloxy group, 5) an amide group, and 6) a phosphino group.

Further, $Q^1$ and $Q^2$ may be bound with each other, or together form a so-called dianionic ligand. Examples of the dianionic ligand include an alkylidene, a diene, a cyclometaled hydrocarbyl group, and a bidentate chelate ligand.

The halide may be any of chloride, bromide, fluoride, and iodide.

The hydrocarbyl group having 1 to 20 carbon atoms may be preferably an alkyl group, such as a methyl group, an ethyl group, a propyl group, a butyl group, an amyl group, an isoamyl group, a hexyl group, an isobutyl group, a heptyl group, an octyl group, a nonyl group, a decyl group, a cetyl group, or a 2-ethylhexyl group; an unsubstituted hydrocarbyl group, such as a phenyl group or a benzyl group; or a substituted hydrocarbyl group, such as a substituted benzyl group, a trialkylsilylmethyl group, or a bis(trialkylsilyl)methyl group. Preferred examples of the hydrocarbyl group include a substituted or unsubstituted benzyl group and a trialkylsilylmethyl group, and more preferred examples of the hydrocarbyl group include an o-dimethylaminobenzyl group and a trimethylsilylmethyl group.

The above-described alkoxy group or aryloxy group is preferably, for example, a methoxy group, or an unsubstituted or substituted phenoxy group.

The above-described amide group is preferably, for example, a dimethylamide group, a diethylamide group, a methylethylamide group, a di-t-butylamide group, a diisopropylamide group, or an unsubstituted or substituted diphenylamide group.

The above-described phosphino group is preferably, for example, a diphenylphosphino group, a dicyclohexylphosphino group, a diethylphosphino group, or a dimethylphosphino group.

The above-described alkylidene is preferably, for example, methylidene, ethylidene, or propylidene.

The above-described cyclometaled hydrocarbyl group is preferably, for example, propylene, butylene, pentylene, hexylene, or octylene.

The above-described diene is preferably, for example, 1,3-butadiene, 1,3-pentadiene, 1,4-pentadiene, 1,3-hexadiene, 1,4-hexadiene, 1,5-hexadiene, 2,4-dimethyl-1,3-pentadiene, 2-methyl-1,3-hexadiene, or 2,4-hexadiene.

In the complex represented by Formula (I) that is used in the present invention, L is a neutral Lewis base. Examples of the neutral Lewis base include tetrahydrofuran, diethyl ether, dimethylaniline, trimethyl phosphine, and lithium chloride.

Further, L may be bound with $Q^1$ and/or $Q^2$ to form a so-called multidentate ligand.

In Formula (I), w of $L_w$ represents the number of neutral Lewis bases L, and w is an integer of 0 to 3, preferably 0 or 1.

The metallocene complex used in the present invention can be synthesized in accordance with a known method, such as the method described in (1) X. Li, M. Nishiura, K. Mori, T. Mashiko, Z. Hou, Chem. Commun. 4137-4139 (2007), (2) M. Nishiura, J. Baldamus, T. Shima, K. Mori, Z. Hou, Chem. Eur. J. 17, 5033-5044 (2011), (3) F. Guo, M. Nishiura, H. Koshino, Z. Hou, Macromolecules. 44, 6335-6344 (2011), (4) reference document: Tardif, O.; Nishiura, M.; Hou, Z. M. Organometallics 22, 1171, (2003), (5) reference document: Hultzsch, K. C.; Spaniol, T. P.; Okuda, J. Angew. Chem. Int. Ed, 38, 227, (1999), (6) Patent Document 1: WO 2006/004068, (7) reference document: Japanese Laid-open Patent Application (Kokai) No. 2008-222780, or (8) reference document: Japanese Laid-open Patent Application (Kokai) No. 2008-095008.

(Ionic Compound)

As described above, the catalyst composition used in the production method of the present invention contains an ionic compound. The term "ionic compound" used herein encompasses an ionic compound composed of a non-coordinating anion and a cation. The ionic compound is combined with the metallocene complex and thereby allows the metallocene complex to exert an activity as a polymerization catalyst. As for the mechanism thereof, it is believed that the ionic compound reacts with the metallocene complex to generate a cationic complex (active species).

The non-coordinating anion which is a constituent of the ionic compound is preferably, for example, a tetravalent boron anion, and examples thereof include tetra(phenyl)borate, tetrakis(monofluorophenyl)borate, tetrakis(difluorophenyl)borate, tetrakis(trifluorophenyl)borate, tetrakis(trifluorophenyl)borate, tetrakis(pentafluorophenyl)borate, tetrakis(tetrafluoromethylphenyl)borate, tetra(tolyl)borate, tetra(xylyl)borate, (triphenyl, pentafluorophenyl)borate, [tris(pentafluorophenyl), phenyl]borate, and tridecahydride-7,8-dicarbaundecaborate.

Among these non-coordinating anions, tetrakis(pentafluorophenyl)borate is preferred.

Examples of the cation which is a constituent of the ionic compound include a carbonium cation, an oxonium cation, an ammonium cation, a phosphonium cation, a cycloheptatrienyl cation, and a ferrocenium cation having a transition metal.

Specific examples of the carbonium cation include tri-substituted carbonium cations, such as a triphenylcarbonium cation and tri-substituted phenylcarbonium cations. Specific examples of the tri-substituted phenylcarbonium cations include a tri(methylphenyl)carbonium cation and a tri(dimethylphenyl)carbonium cation.

Specific examples of the ammonium cation include trialkyl ammonium cations, such as trimethyl ammonium cation, a triethyl ammonium cation, a tripropyl ammonium cation, a tributyl ammonium cation, and a tri(n-butyl) ammonium cation; N,N-dialkylanilinium cations, such as an N,N-dimethylanilinium cation, an N,N-diethylanilinium cation, and an N,N-2,4,6-pentamethylanilinium cation; and dialkyl ammonium cations, such as a di(isopropyl) ammonium cation and a dicyclohexyl ammonium cation.

Specific examples of the phosphonium cation include triaryl phosphonium cations, such as a triphenyl phosphonium cation, a tri(methylphenyl) phosphonium cation, and a tri(dimethylphenyl) phosphonium cation.

Among these cations, for example, an anilinium cation or a carbonium cation is preferred, and a triphenyl carbonium cation is more preferred.

In other words, the ionic compound contained in the catalyst composition of the present invention may be a compound obtained by combining a non-coordinating anion and a cation, which are selected from the above-exemplified non-coordinating anions and cations, respectively.

Preferred examples of such a compound include triphenylcarbonium tetrakis(pentafluorophenyl)borate, triphenylcarbonium tetrakis(tetrafluorophenyl)borate, N,N-dimethylanilinium tetrakis(pentafluorophenyl)borate, and 1,1'-dimethylferrocenium tetrakis(pentafluorophenyl)borate. These ionic compounds may be used individually, or in combination of two or more thereof.

Among these ionic compounds, for example, triphenylcarbonium tetrakis(pentafluorophenyl)borate is particularly preferred.

Further, $B(C_6F_5)_3$, $Al(C_6F_5)_3$ or the like, which is a Lewis acid capable of reacting with a transition metal compound to yield a cationic transition metal compound, may be used as the ionic compound, and such a compound may be used in combination with any of the above-described ionic compounds.

Moreover, an alkylaluminum compound (aluminoxane, preferably MAO or MMAO) or a combination of an alkylaluminum compound and a borate compound may be used as the ionic compound, and such an ionic compound may be used in combination with other ionic compound as well. Particularly, when a monoanionic ligand Q of the complex (Formula (I)) used in the present invention is other than an alkyl and a hydride (e.g., when the monoanionic ligand Q is a halogen), it is believed preferable to use an alkylaluminum compound, or a combination of an alkylaluminum compound and a borate compound.

(Other Optional Components Contained in Catalyst Composition)

The catalyst composition used in the production method of the present invention may contain an optional component(s) in addition to the metallocene complex and the ionic compound. Examples of the optional components include an alkylaluminum compound, a silane compound, and hydrogen.

The term "alkylaluminum compound" used herein encompasses organoaluminum compounds that are usually used in metallocene polymerization catalysts and referred to as "aluminoxane (almoxane)", and examples thereof include methylaluminoxane (MAO).

Examples of the silane compound include phenylsilane.

(Catalyst Composition)

As described above, the catalyst composition used in the production method of the present invention is characterized by containing the above-described metallocene complex and ionic compound. In the catalyst composition of the present invention, a molar ratio of the ionic compound with respect to the metallocene complex varies depending on the types of the complex and the ionic compound.

For example, the molar ratio is preferably 0.5 to 1 with respect to the central metal of the metallocene complex when the ionic compound is composed of a carbonium cation and a boron anion (e.g., $[Ph_3C][B(C_6F_5)_4]$), or the molar ratio is preferably about 10 to 4,000 with respect to the central metal of the metallocene complex when the ionic compound is an alkylaluminum compound such as methylaluminoxane.

It is believed that the ionic compound ionizes (i.e., cationizes) the metallocene complex to generate a catalyst active species. With the molar ratio of the ionic compound being in the above-described range, the metallocene complex can be sufficiently activated and the ionic compound composed of a carbonium cation and a boron anion does not exist in excess; therefore, a risk that the ionic compound undergoes an undesirable reaction with a monomer to be polymerized can be reduced.

<Production Method of Polar Olefin Polymer or Copolymer According to Present Invention>

A polar olefin polymer or copolymer can be produced by polymerizing a polar olefin monomer(s) using the above-described catalyst composition as a polymerization catalyst composition.

The catalyst composition can be used as a polymerization catalyst composition by, for example, 1) providing a composition containing the respective constituents (e.g., the metallocene complex and the ionic compound) into a polymerization reaction system, or 2) separately providing the respective constituents into the polymerization reaction system and allowing a composition to be formed in the reaction system.

In the above-described 1), an expression "providing a composition" encompasses providing the metallocene complex (active species) which has been activated by a reaction with the ionic compound.

The catalyst composition used in the production method of the present invention can be utilized as a polymerization catalyst composition in polymerization reactions of various monomers. Particularly, the catalyst composition is capable of catalyzing a polymerization reaction of an addition-polymerizable monomer compound.

Specifically, the production method of the present invention relates to a method of producing a copolymer of a nonpolar olefin and a polar olefin and a method of producing a (co)polymer of a polar olefin(s), in which methods a catalyst composition containing a metallocene complex having a specific central metal is used.

(Polar Olefin Monomer)

The polar olefin monomer used in the production method of the present invention is a polar olefin monomer containing a polar group, preferably a polar olefin monomer containing a polar group represented by the following Formula (II):

(wherein, Z represents a heteroatom selected from the group consisting of nitrogen, oxygen, phosphorus, sulfur, and selenium; $R^1$ represents a substituted or unsubstituted hydrocarbyl group having 1 to 30 carbon atoms; and n represents an integer of 1 or 2 depending on the atomic species of Z).

As described above, in the production method of the present invention, it is believed that the heteroatom in the polar olefin monomer and the central metal of the catalyst interact with each other to form an intramolecular chelate, whereby not only interaction between the catalyst and an olefin unit is facilitated to enhance the polymerization activity of the polar olefin monomer, but also a unique stereoselectivity is exerted.

In Formula (II), $R^1$ is not restricted as long as an intramolecular interaction of the heteroatom in the polar group and the olefin unit of the polar olefin monomer with the central metal of the catalyst occurs in the polymerization reaction. Usually, $R^1$ is a substituted or unsubstituted hydrocarbyl group having 1 to 30 carbon atoms, and it is preferably a linear, branched or cyclic alkyl group, a linear or branched alkenyl group, or a linear or branched alkynyl group, which has 1 to 20, 1 to 10, or 1 to 6 carbon atoms; a cyclic alkyl group substituted with an alkyl group(s), alkenyl group(s) or alkynyl group(s) having 1 to 10 carbon atoms (it is noted here that the number of the alkyl groups, alkenyl groups or alkynyl groups as substituents, and the positions of substitution in the cyclic alkyl group are not particularly restricted); an aryl group; or an aryl group substituted with an alkyl group(s), alkenyl group(s) or alkynyl group(s) having 1 to 10 carbon atoms (it is noted here that the number of the alkyl groups, alkenyl groups or alkynyl groups as substituents, and the positions of substitution in the aryl group are not particularly restricted). The cyclic alkyl group or the aryl group may form a saturated or unsaturated fused ring.

A hydrocarbyl group in the above-described substituted hydrocarbyl group is the same as the above-described hydrocarbyl group. The term "substituted hydrocarbyl group" used herein refers to a hydrocarbyl group in which at least one hydrogen atom is substituted with a halogen atom or the like.

The polar olefin monomer used in the production method of the present invention is preferably a compound represented by Formula (III):

In Formula (III), Z, $R^1$ and n have the same definitions as described for Formula (II). In the polar olefin monomer, $R^2$ functions as a spacer connecting a polar group and an olefin moiety. $R^2$ is not restricted as long as an intramolecular interaction of the heteroatom in the polar group and the olefin unit of the polar olefin monomer with the central metal of the catalyst occurs in the polymerization reaction. From the standpoint of the formation of intramolecular interaction, $R^2$ preferably has 2 to 20 carbon atoms. Further, in accordance with, for example, the type of the heteroatom represented by Z and the type of the substituent represented by $R^1$, the number of carbon atoms of $R^2$ can be selected to be suitable for the formation of intramolecular interaction of the heteroatom and the olefin unit with the central metal of the catalyst in the polymerization reaction, taking the polymerization activity or the like as an index. Usually, $R^2$ is a hydrocarbylene group having 2 to 11 carbon atoms. $R^2$ is more preferably a linear or branched alkylene group having 2 to 3 carbon atoms; a cyclic alkylene group having 3 to 11 carbon atoms; an arylene group having 6 to 11 carbon atoms; or an aralkylene group having 7 to 11 carbon atoms. Examples of the substituent of $R^2$ include halogen atoms, hydrocarbyl groups having 1 to 10 carbon atoms, alkylthio groups having 1 to 10 carbon atoms, alkylamino groups having 1 to 10 carbon atoms, and alkoxy groups having 1 to 10 carbon atoms.

One mode of the compound represented by Formula (III) is a compound represented by Formula (IV).

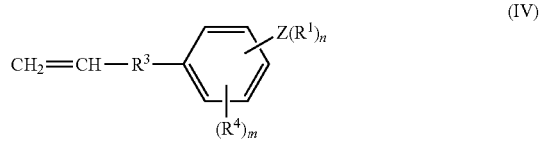

In Formula (IV), Z, $R^1$ and n have the same definitions as described for Formula (II). In Formula (IV), Z is preferably oxygen. In Formula (IV), $R^1$ is preferably a linear, branched or cyclic alkyl group having 1 to 3 carbon atoms.

The binding position of $-Z(R^1)_n$ on the aromatic ring is not restricted; however, it is preferably the o-position.

Usually, $R^3$ is a hydrocarbylene group having 1 to 5 carbon atoms. $R^3$ is more preferably a linear or branched alkylene group having 1 to 3 carbon atoms, or a cyclic alkylene group having 3 to 5 carbon atoms.

$R^4$, which is a substituent of the aromatic ring, is a halogen atom, a hydrocarbyl group having 1 to 10 carbon atoms, an alkylthio group having 1 to 10 carbon atoms, an alkylamino group having 1 to 10 carbon atoms, or an alkoxy group having 1 to 10 carbon atoms. When $R^4$ is a hydrocarbyl group, $R^4$ may be bound to form a saturated or unsaturated hetero-fused ring. The position of substitution with $R^4$ on the aromatic ring is not restricted; however, it is preferably the m-position. In Formula (IV), m is an integer of 0 to 4, more preferably 0 to 2.

Examples of the halogen atom include a fluorine atom, a chlorine atom, a bromine atom, and an iodine atom. The hydrocarbyl group having 1 to 10 carbon atoms is more preferably a linear or branched alkyl group, alkenyl group or alkynyl group, which has 1 to 6 carbon atoms, still more preferably, for example, a methyl group, an ethyl group, an n-propyl group, an isopropyl group, an n-butyl group, an isobutyl group, a sec-butyl group, a tert-butyl group, an n-pentyl group, or an n-hexyl group. The alkylthio group having 1 to 10 carbon atoms is more preferably an alkylthio group having 1 to 6 carbon atoms, examples of which include a methylthio group, an ethylthio group, an n-propylthio group, an isopropylthio group, an n-butylthio group, an isobutylthio group, a sec-butylthio group, a tert-butylthio group, an n-pentylthio group, and an n-hexylthio group. The alkylamino group having 1 to 10 carbon atoms is more preferably an alkylamino group having 1 to 6 carbon atoms. The alkylamino group is preferably a dialkylamino group, and alkyl groups substituting an amino group may be the same or different. More preferred examples of the alkylamino group include dialkylamino groups, such as a dimethylamino group, a diethylamino group, a di-n-propylamino group, a diisopropylamino group, a di-n-butylamino group, a diisobutylamino group, a di-sec-butylamino group, and a di-tert-butylamino group. The alkoxy group having 1 to 10 carbon atoms is more preferably an alkoxy group having 1 to 3 carbon atoms, examples of which include a methoxy group, an ethoxy group, and a propoxy group. Examples of the unsaturated fused ring, which is formed when $R^4$s are bound with each other and condensed with the aromatic ring substituted with $R^4$s, include a naphthalene ring. Examples of the hetero-fused ring, which is formed when $R^4$s are bound with each other and condensed with the aromatic ring substituted with $R^4$s, include an indole ring, an isoindole ring, a quinoline ring, an isoquinoline ring, a carbazole ring, an acridine ring, a benzofuran ring, a benzopyran ring, and a benzothiophene ring. The fused ring may have one to six substituents, and the substituent(s) is/are the same as the above-described $R^4$.

Specific examples of the compound represented by Formula (IV) include, but not limited to: substituted 2-allylanisoles (hereinafter, also referred to as "$AP^R$"), such as 2-allyl-4-fluoroanisole, 2-allyl-4,5-difluoroanisole, 2-allyl-4-methylanisole, 2-allyl-4-tert-butylanisole, 2-allyl-4-hexylanisole, 2-allyl-4-methoxyanisole, and 3-(2-methoxy-1-naphthyl)-1-propylene; and unsubstituted 2-allylanisole (3-(2-anisyl)-1-propylene) (hereinafter, also referred to as "AP").

In the (co)polymerization reaction, any of the above-described polar monomers may be used individually, or two or more of the above-described polar monomers may be used in combination.

(Nonpolar Olefin Monomer)

The nonpolar olefin monomer used in the production method of the present invention is not particularly restricted as long as it is a nonpolar olefin monomer that is addition-polymerizable and copolymerizable with a polar olefin monomer, and examples thereof include ethylene, α-olefins, substituted and unsubstituted styrenes, dienes, cyclic olefins having 3 to 20 carbon atoms (including norbornenes and cyclohexadienes, such as 2-norbornene and dicyclopentadiene).

Specific examples of the α-olefins include linear α-olefins having 3 to 20 carbon atoms, such as propylene, 1-butene, 1-pentene, 1-hexene, 1-octene, 1-decene, 1-dodecene, 1-tetradecene, 1-hexadecene, 1-octadecene, and 1-eicosene; and branched α-olefins having 4 to 20 carbon atoms, such as 4-methyl-1-pentene, 3-methyl-1-pentene, and 3-methyl-1-butene.

Examples of the dienes, which are olefin monomers, include linear dienes having 3 to 20 carbon atoms, such as 1,3-butadiene, 1,3-pentadiene, 1,4-pentadiene, 1,3-hexadiene, 1,4-hexadiene, 1,5-hexadiene, and 2,4-hexadiene; branched dienes having 4 to 20 carbon atoms, such as 2-methyl-1,3-butadiene, 2,4-dimethyl-1,3-pentadiene, and 2-methyl-1,3-hexadiene; and cyclic dienes having 4 to 20 carbon atoms, such as cyclohexadiene.

In the copolymerization reaction, any of the above-described nonpolar olefin monomers may be used individually, or two or more of the above-described nonpolar olefin monomers may be used in combination.

As the polar olefin monomer and the nonpolar olefin monomer, ones that are synthesized based on a conventional method in the field of organic chemistry can be used. Alternatively, commercially available polar olefin monomer and nonpolar olefin monomer may be used as well.

<Polar Olefin Polymer and Copolymer of Present Invention>

According to the production method of the present invention, a copolymer of a nonpolar olefin and a polar olefin, which copolymer has a high ratio of a polar olefin structural unit (the ratio of the polar olefin structural unit is, in terms of molar ratio, preferably 20% by mole or higher, more preferably 30% by mole or higher, 40% by mole or higher, 50% by mole or higher, 60% by mole or higher, 70% by mole or higher, or 80% by mole or higher), can be provided. In addition, according to the production method of the present invention, a copolymer of a nonpolar olefin and a polar olefin, which copolymer has a high molecular weight, can be provided.

In other words, one mode of the present invention is a copolymer of a nonpolar olefin and a polar olefin, the copolymer being characterized by having a high ratio of a polar olefin structural unit. The copolymer of the nonpolar olefin and the polar olefin is also characterized by having a high molecular weight (such copolymer may be hereinafter referred to as "the copolymer of the present invention").

Further, according to the production method of the present invention, a polar olefin polymer having a high syndiotacticity can be provided. In other words, another mode of the present invention is a polar olefin polymer characterized by having a high syndiotacticity (such polar olefin polymer is hereinafter referred to as "the polymer of the present invention").

(Polymer)

The polymer of the present invention is a polymer containing a repeating unit represented by the following Formula (A). The repeating unit represented by Formula (A) is usually repeated via head-to-tail bonds.

(A)

In Formula (A), Z, $R^1$, $R^2$ and n have the same meanings as the above-described Z, $R^1$, $R^2$ and n for Formulae (II) and (III).

The polymer of the present invention is a highly syndiotactic polymer with stereoregularity. The term "highly syndiotactic" used herein means that a ratio at which —$R^2$—$Z(R^1)_n$ in adjacent repeating units represented by Formula (A) are alternately arranged with respect to a plane formed by a polymer main chain (this ratio is referred to as "syndiotacticity") is high.

The syndiotacticity of the polymer of the present invention is, in terms of pentad indication, usually 60 rrrr % or higher, preferably 70 rrrr % or higher, 80 rrrr % or higher, 90 rrrr % or higher, 92 rrrr % or higher, or 95 rrrr % or higher. The syndiotacticity can be calculated from data obtained by measuring the NMR (particularly $^{13}$C-NMR) of the polymer of the present invention. Specifically, the syndiotacticity can be determined based on the integral ratio of a peak attributed to a methylene carbon on $R^2$ that is bound with the polymer main chain.

The molecular weight distribution of the polymer of the present invention may be arbitrarily selected, and according to the production method of the present invention, a polymer having a relatively narrow molecular weight distribution can be obtained. The molecular weight distribution may be a value (Mw/Mn) measured by, for example, a GPC method (where measurement is performed at 40° C. using a polystyrene as a standard substance and THF as an eluate), using a GPC apparatus (TOSHO HLC8320 GPC) or the like.

The molecular weight distribution (Mw/Mn) of the polymer of the present invention is 5.0 or less, preferably 4.0 or less, or 3.0 or less.

The number-average molecular weight of the polymer of the present invention may be arbitrarily selected and, according to the production method of the present invention, a polymer having a relatively high number-average molecular weight can be obtained. The number-average molecular weight (g/mol) varies depending on, for example, the structure of a structural unit derived from the polar olefin monomer; however, it is usually $1.0\times10^3$ or higher, preferably $10\times10^3$ or higher, $50\times10^3$ or higher, $100\times10^3$ or higher, or $500\times10^3$ or higher.

The glass transition temperature (Tg) of the polymer of the present invention may vary depending on, for example, the structure of a structural unit derived from the polar olefin monomer. The glass transition temperature is not particularly restricted; however, it is usually about −40 to 150° C., preferably about −40 to 100° C. The glass transition temperature can be determined by, for example, differential scanning calorimetry (DSC).

When the polymer of the present invention has a melting point, the melting point varies depending on the structure of a structural unit derived from the polar olefin monomer and the like; however, it is usually 100° C. or higher, preferably 110° C. or higher, 120° C. or higher, or 130° C. or higher. The melting point can be determined by, for example, differential scanning calorimetry (DSC).

The polymer of the present invention can effectively exhibit adhesiveness, compatibility and the like with polar materials, which are characteristics of the polar group of the polar olefin monomer. In addition, since the polymer of the present invention is a highly syndiotactic polymer, a polymer having a relatively high melting point can be synthesized depending on the monomer structure, and such a polymer is advantageous in terms of application as a heat-resistant material.

(Copolymer)

The copolymer of the present invention will now be described using a copolymer in which a nonpolar olefin monomer is ethylene as an example. This copolymer includes a structural unit derived from a polar olefin monomer represented by the following Formula (A) and a structural unit derived from ethylene represented by the following Formula (B).

In Formula (A), Z, $R^1$, $R^2$ and n have the same meanings as the above-described Z, $R^1$, $R^2$ and n for Formulae (II) and (III).

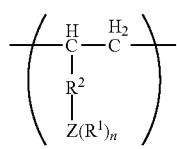

(A)

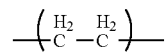

(B)

In the copolymer of the present invention, the structural units represented by Formulae (A) and (B) may be arranged in any arbitrary order. In other words, these structural units may be arranged in a random manner, or with a certain regularity (e.g., the structural units of (A) and (B) are arranged in an alternating manner, in a successive manner to some extent, or in any other fixed-order manner). Accordingly, the copolymer of the present invention may be a random copolymer, an alternating copolymer, a block copolymer, or any other sequence-defined copolymer. The copolymer of the present invention is preferably an alternating copolymer.

It is noted here that, although an alternating copolymer has a sequence in which the structural units (A) and (B) are alternately arranged as a main sequence (hereinafter, also referred to as "alternating (A)-(B) sequence"), the alternating copolymer may contain, for example, a sequence in which each structural unit is arrange successively in a series of two to some extent as a subsequence. The copolymer of the present invention is such an alternating copolymer in which the ratio of the alternating (A)-(B) sequence in all sequences of the copolymer is, in terms of molar ratio, usually 30% by mole or higher, preferably 40% by mole or higher, 50% by mole or higher, 60% by mole or higher, or 70% by mole or higher.

The ratio of the alternating (A)-(B) sequence can be measured by, for example, $^1$H-NMR or $^{13}$C-NMR. Specifically, the ratio of the alternating (A)-(B) sequence can be determined by comparing integral ratios of peaks at 1.0 to 1.5 ppm in $^1$H-NMR.

The content ratio of the structural unit represented by Formula (A) and that of the structural unit represented by Formula (B) in the copolymer of the present invention are arbitrarily selected. For example, the ratio of the structural unit represented by Formula (A) in all structural units can be 1 to 99% by mole in terms of molar ratio. According to the production method of the present invention, a copolymer having a relatively high ratio of a polar olefin structural unit can be obtained. An expression "copolymer having a high ratio of a polar olefin structural unit" means that the copolymer contains the structural unit represented by Formula (A) at a molar ratio of usually 2% by mole or higher, preferably 30% by mole or higher, 40% by mole or higher, 50% by mole or higher, 60% by mole or higher, 70% by mole or higher, or 80% by mole or higher.

The ratios of the structural units can be measured by, for example, $^1$H-NMR or $^{13}$C-NMR. Specifically, the ratios of the structural units can each be determined by comparing, in $^1$H-NMR, the integral ratios between methylene or methyl hydrogen adjacent to a heteroatom and a hydrocarbon at 1 to 1.8 ppm. The ratios of the structural units can be controlled by adjusting the ratios of the respective monomers used as raw materials in the production of the copolymer.

When the content ratio of the structural unit represented by Formula (A) is increased, adhesiveness, compatibility and the like with polar materials, which are characteristics of the polar group of the polar olefin monomer, can be effectively exerted. Further, the copolymer of the present invention is advantageous in that, since the molecular weight thereof can be increased and the number of entanglement points can thereby be increased, the compatibility and the adhesiveness are expected to be improved.

The molecular weight distribution of the copolymer of the present invention may be arbitrarily selected, and according to the production method of the present invention, a copolymer having a relatively narrow molecular weight distribution can be obtained. The molecular weight distribution may be a value (Mw/Mn) measured by, for example, a GPC method (where measurement is performed at 145° C. using a polystyrene as a standard substance and 1,2-dichlorobenzene as an eluate), using a GPC apparatus (TOSHO HLC8321 GPC/HT) or the like.

The molecular weight distribution of the copolymer of the present invention is, in terms of Mw/Mn which is an index of the molecular weight distribution, 5.0 or less, preferably 4.0 or less, or 3.0 or less.

The number-average molecular weight of the copolymer of the present invention may be arbitrarily selected and, according to the production method of the present invention, a copolymer having a relatively high number-average molecular weight can be obtained. The number-average molecular weight (g/mol) varies depending on, for example, the structures of structural units derived from the (non)polar olefin monomers and the ratio between the structural unit derived from the polar olefin monomer and the structural unit derived from the nonpolar olefin monomer; however, it is usually $1.0 \times 10^3$ or higher, preferably $2.0 \times 10^3$ or higher, $10 \times 10^3$ or higher, $50 \times 10^3$ or higher, $80 \times 10^3$ or higher, $100 \times 10^3$ or higher, $150 \times 10^3$ or higher, $200 \times 10^3$ or higher, $250 \times 10^3$ or higher, $300 \times 10^3$ or higher, $350 \times 10^3$ or higher, $400 \times 10^3$ or higher, $450 \times 10^3$ or higher, $500 \times 10^3$ or higher, or $1,000 \times 10^3$ or higher.

The glass transition temperature (Tg) of the copolymer of the present invention may vary depending on, for example, the structure of a structural unit derived from the polar olefin monomer. The glass transition temperature is not particularly restricted; however, it is usually about −40 to 100° C. The glass transition temperature can be determined by, for example, differential scanning calorimetry (DSC).

When the copolymer of the present invention has a melting point, the melting point varies depending on, for example, the structures of structural units derived from the (non)polar olefin monomers and the ratio between the structural unit derived from the polar olefin monomer and the structural unit derived from the nonpolar olefin monomer; however, it is usually 100° C. or higher, preferably 110° C. or higher, 120° C. or higher, or 130° C. or higher. The melting point can be determined by, for example, differential scanning calorimetry (DSC).

<Production Method of Present Invention>

The production method of the present invention is characterized by polymerizing (addition-polymerizing) a polar olefin monomer and a nonpolar olefin monomer using the above-described polymerization catalyst composition used in the production method of the present invention.

Specifically, the production method of the present invention can be carried out by, for example, the following procedure.

1. A polymerizable monomer is supplied to and polymerized in a system (preferably a liquid phase) containing a catalyst composition to be used in the production method of the present invention. In this process, the monomer can be supplied by dropwise addition if it is in a liquid form, or the monomer may be supplied through a gas pipe if it is in a gaseous form (bubbling or the like in the case of a liquid-phase reaction system).

2. To a system (preferably a liquid phase) containing a polymerizable monomer, add a catalyst composition to be used in the production method of the present invention, or separately add the constituents of the catalyst composition, so as to polymerize the polymerizable monomer. The catalyst composition to be added may be prepared (preferably prepared in a liquid phase) and activated in advance (in this case, the catalyst composition is preferably added such that it does not come into contact with the ambient air).

The production method can be any method, such as a vapor-phase polymerization method, a solution polymerization method, a suspension polymerization method, a liquid-phase bulk polymerization method, an emulsion polymerization method, or a solid-phase polymerization method. When the production method is based on solution polymerization, a solvent to be used is not particularly restricted as long as it is inert in the polymerization reaction and is capable of dissolving the monomer and the catalyst without interacting with the catalyst. Examples of such a solvent include saturated aliphatic hydrocarbons, such as butane, pentane, hexane, and heptane; saturated alicyclic hydrocarbons, such as cyclopentane and cyclohexane; aromatic hydrocarbons, such as benzene and toluene; and halogenated hydrocarbons, such as methylene chloride, chlorobenzene, bromobenzene, and chlorotoluene.

Further, a solvent that is not toxic to the living body is preferred. Specifically, an aromatic hydrocarbon, particularly toluene, is preferred. Such a solvent may be used individually, or a combination of two or more thereof may be used as a mixed solvent.

The amount of the solvent(s) to be used can be set arbitrarily; however, for example, it is such an amount that adjust the concentration of the complex contained in the polymerization catalyst to be $1.0 \times 10^{-5}$ to $1.0 \times 10^{-1}$ mol/L.

The amount of the monomer to be subjected to the polymerization reaction can be set as appropriate in accordance with the desired (co)polymer to be produced; however, the molar ratio of the monomer with respect to the metallocene complex constituting the polymerization catalyst composition is preferably 100 times or higher, 200 times of higher, or 500 times or higher.

In cases where the polymerization of the present invention is performed by solution polymerization, the polymerization can be performed at any arbitrary temperature, for example, in a range of −90 to 100° C. The polymerization temperature may be selected as appropriate in accordance with the type of the monomer to be polymerized and the like, and the polymerization can be performed usually around room temperature, i.e., at about 25° C. The polymerization time is several seconds to about several days, and may be selected as appropriate in accordance with the type of the monomer to be polymerized and the like. The polymerization time may be 1 hour or shorter, or 1 minute or shorter depending on the case.

Needless to say, these reaction conditions can be selected as appropriate in accordance with, for example, the polymerization reaction temperature, the type and the molar amount of the monomer, and the type and the amount of the catalyst composition, and are not restricted to the above-exemplified ranges.

Further, with regard to the production of a copolymer, 1) a random copolymer or an alternating copolymer can be produced by polymerizing a mixture of two or more kinds of monomers in the presence of the catalyst composition, or 2) a block copolymer can be produced by sequentially supplying monomers to a reaction system containing the catalyst composition.

In addition, an arbitrary step(s), for example, the purification step and the polar group induction step such as the step of detaching $R^1$ from the polar group, can be performed after the polymerization step.

EXAMPLES

The present invention is concretely described below by way of Examples thereof. It is noted here, however, that the present invention is not restricted to the modes of the below-described Examples.

The present invention will now be described in more detail referring to Examples; however, the scope of the present invention is not restricted by the below-described Examples.

<Metallocene Complexes>

The metallocene complexes used in Examples were synthesized in accordance with the methods described in the following documents.
(1) X. Li, M. Nishiura, K. Mori, T. Mashiko, Z. Hou, Chem. Commun. 4137-4139 (2007)
(2) M. Nishiura, J. Baldamus, T. Shima, K. Mori, Z. Hou, Chem. Eur. J. 17, 5033-5044 (2011).
(3) F. Guo, M. Nishiura, H. Koshino, Z. Hou, Macromolecules. 44, 6335-6344 (2011).

The metallocene complexes used in Examples are as follows.

Sc-1: $(C_5H_5)Sc(CH_2C_6H_4NMe_{2\text{-}o})_2$
Sc-2: $(C_5Me_5)Sc(CH_2C_6H_4NMe_{2\text{-}o})_2$
Sc-3: $(C_5HMe_4)Sc(CH_2C_6H_4NMe_{2\text{-}o})_2$
Sc-4: $(C_9H_7)Sc(CH_2C_6H_4NMe_{2\text{-}o})_2$
Sc-5: $(C_5Me_4SiMe_3)Sc(CH_2C_6H_4NMe_{2\text{-}o})_2$
Sc-6: $(C_5Me_4SiMe_3)Sc(CH_2SiMe_3)_2(THF)$
Sc-7: $(C_5H_5)Sc(CH_2SiMe_3)_2(THF)$ The structures of the metallocene complexes used in Examples are shown in FIG. 1.

<Ionic Compound>

$[Ph_3C][B(C_6F_5)_4]$ (97%) was purchased from Strem Chemical Corporation and used without purification.

<Monomers>

Figure 2:
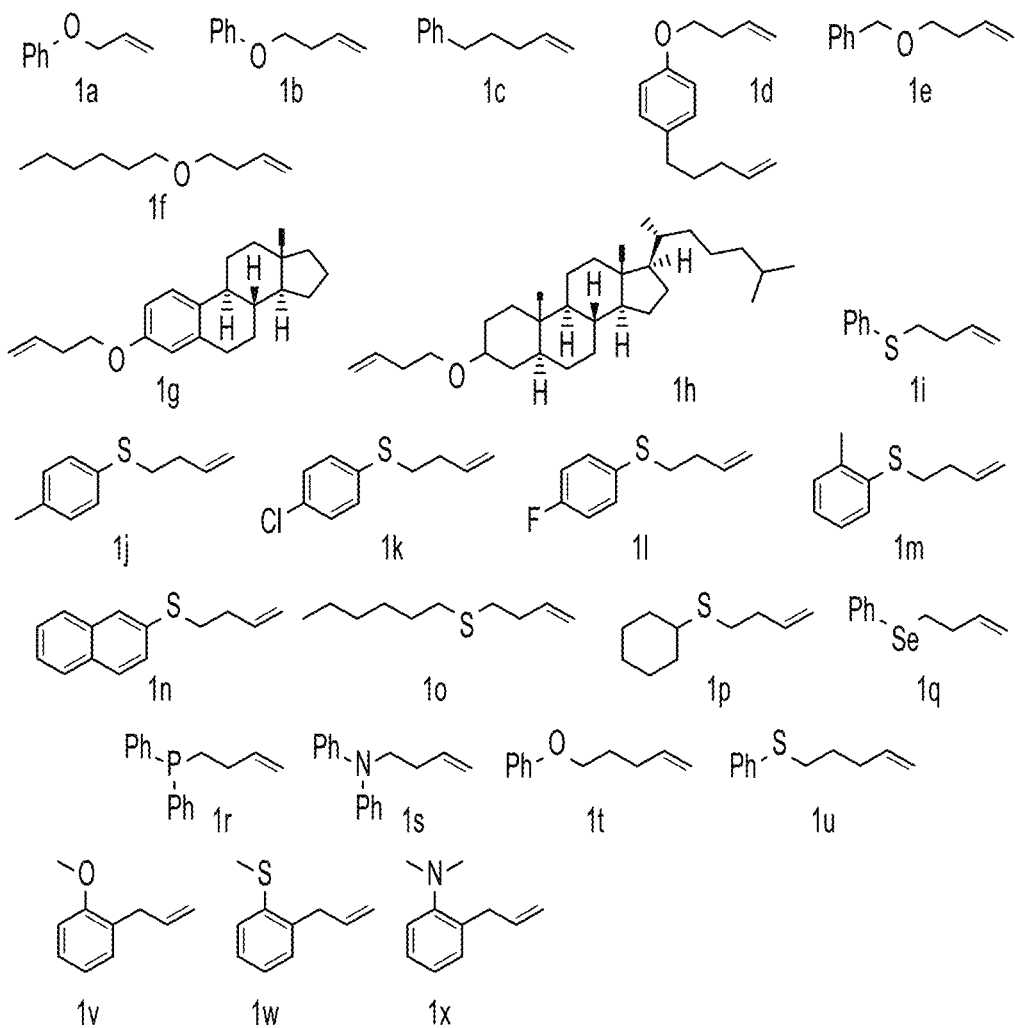
FIG. 2 shows the structures of polar olefin monomers used in Examples.
Figure 33:
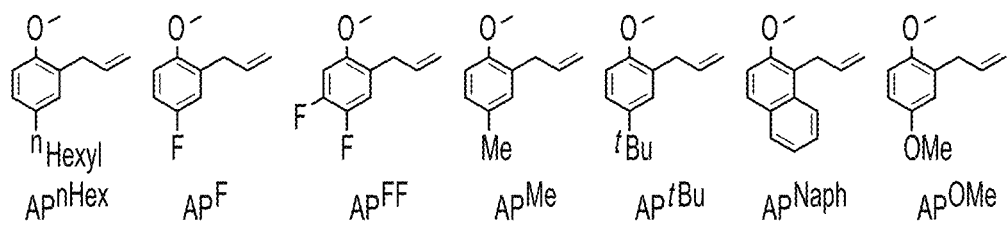
FIG. 33 shows the structures of polar olefin monomers used in Examples.

All α-olefins were purified by distillation from $Al(octyl)_3$ (in 25%-by-weight hexane) and Na or recrystallization from hexane before being used. The structures of the polar monomers used in Examples are shown in FIGS. 2 and 33.

<Measurement Methods>

(NMR)

NMR data of a polymer were obtained by Bruker AVANCE III HD 500 NMR (FT, 500 MHz: $^1$H; 125 MHz: $^{13}$C) spectrometer using $CD_2Cl_2$ (26.8° C.) or 1,1,2,2-$C_2D_2Cl_4$ (120° C.) as a solvent. $^1$H NMR measurement was performed using tetramethylsilane (TMS) as an internal standard, and solvents had the following chemical shifts (7.26 ppm: $CDCl_3$, 7.16 ppm: $C_6D_6$, 5.32 ppm: $CD_2Cl_2$, 6.0 ppm: 1,1,2,2-$C_2D_2Cl_4$). Chemical shifts in $^{13}$C NMR were reported based on the peak of each solvent ($CDCl_3$ (77.16 ppm), $CD_2Cl_2$ (53.84 ppm), 1,1,2,2-$C_2D_2Cl_4$ (73.78 ppm), or $C_6D_6$ (128.06 ppm)). A coupling constant (J) was expressed in Hz, representing an overlap of separated peaks. Abbreviations s, d, t, q and m represent singlet, doublet, triplet, quartet and multiplet, respectively.

(Gel Permeation Chromatography (GPC))

The molecular weight and the molecular weight distribution of a homopolymer was determined by gel permeation chromatography (GPC) performed on HLC-8320 GPC apparatus (manufactured by Tosoh Corporation) using THF as an elution solvent at 40° C. and a flow rate of 0.35 mL/min.

The molecular weight and the molecular weight distribution of a copolymer was determined by high-temperature gel permeation chromatography (HT-GPC) performed at 145° C. on HLC-8321GPC/HT apparatus (manufactured by Tosoh Corporation). As an elution solvent, 1,2-dichlorobenzene (DCB) was used at a flow rate of 1.0 mL/min. Calibration was performed using a polystyrene standard (manufactured by Tosoh Corporation).

(Differential Scanning Calorimetry (DSC))

DSC measurement was performed using DSC 6220 (manufactured by SII Corporation) at a rate of 10° C./min (unless otherwise specified). A thermal history error in a polymer was eliminated by heating a sample thereof to 150° C. and cooling it to −100° C. at 10° C./min for the initial DSC scan, and recording the second DSC scan (unless otherwise specified).

[Example 1] Production of Polar Olefin Polymers

<Polymerization of α-Olefin 1b (Table 1, Run 2)>

Figure 3:
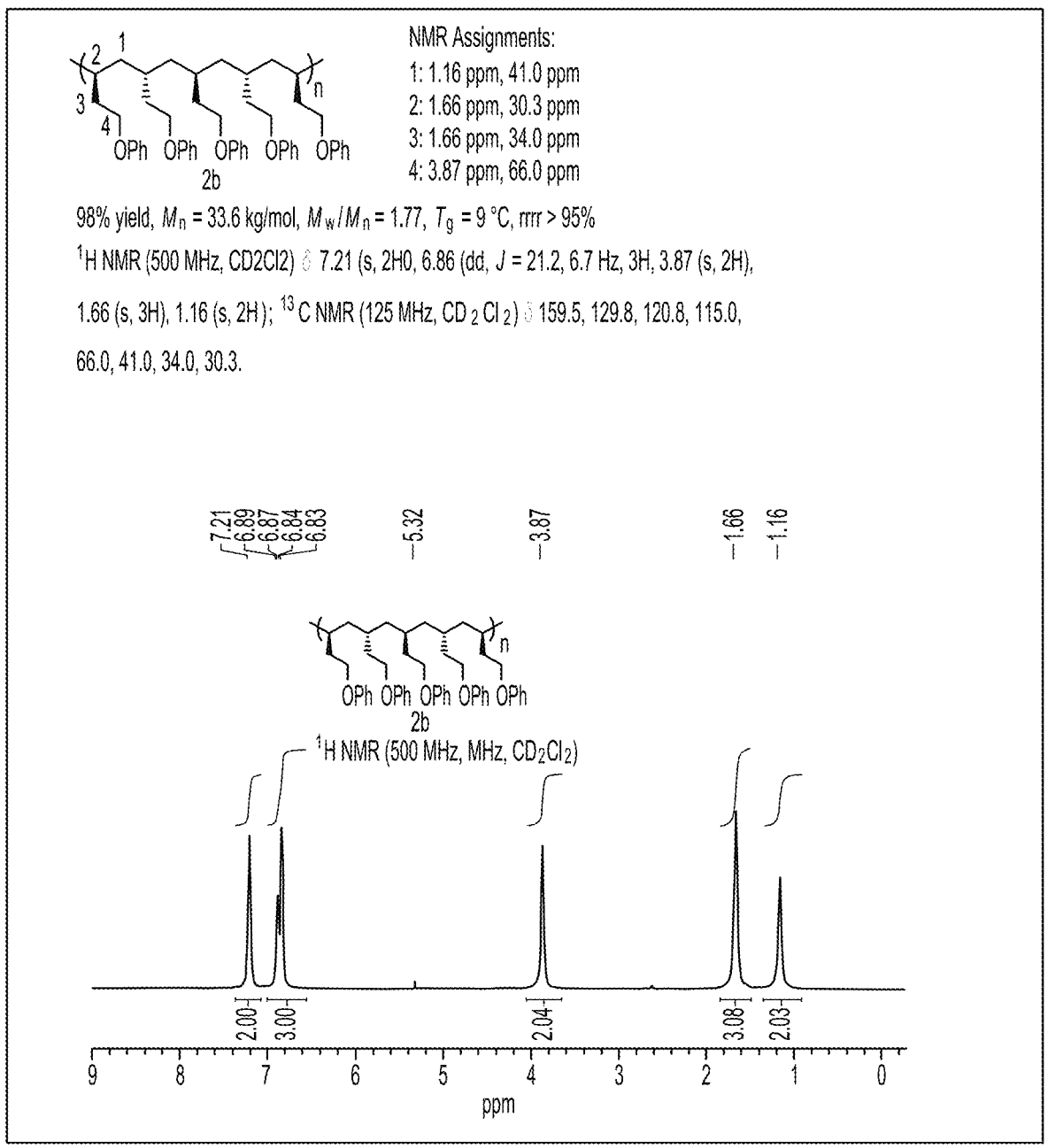
FIG. 3 shows analysis values and $^1$H NMR spectrum of a polymer 2b obtained in Run 2 of Table 1.
Figure 4:
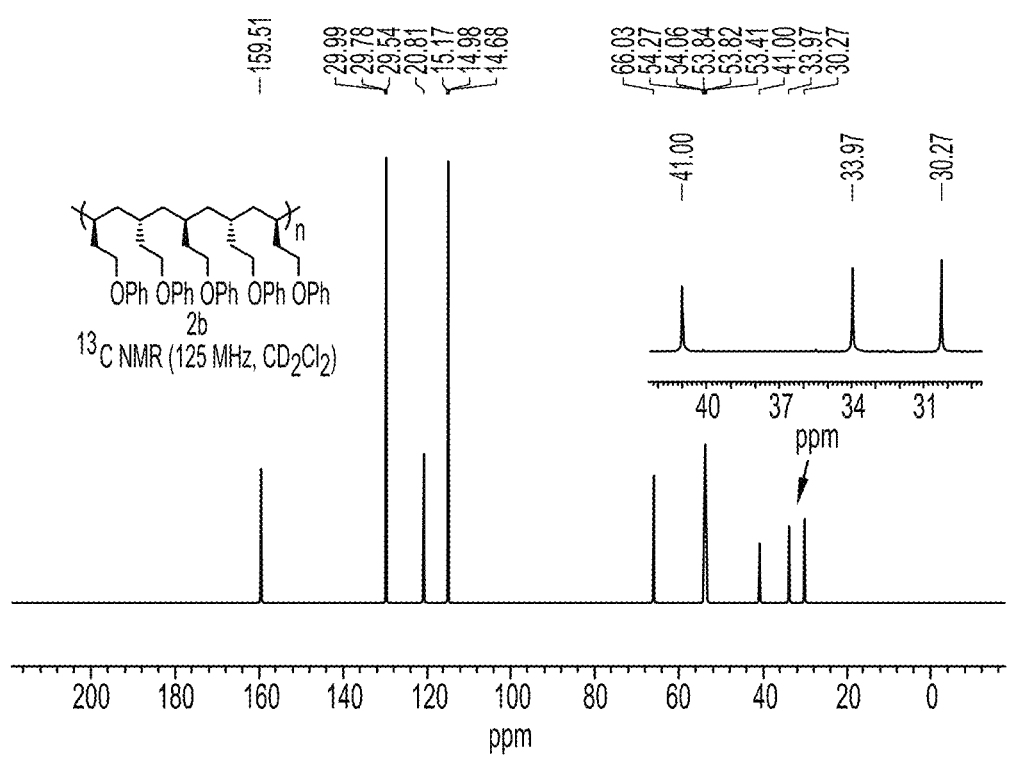
FIG. 4 shows the $^{13}$C NMR spectrum of the polymer 2b obtained in Run 2 of Table 1.
Figure 5:
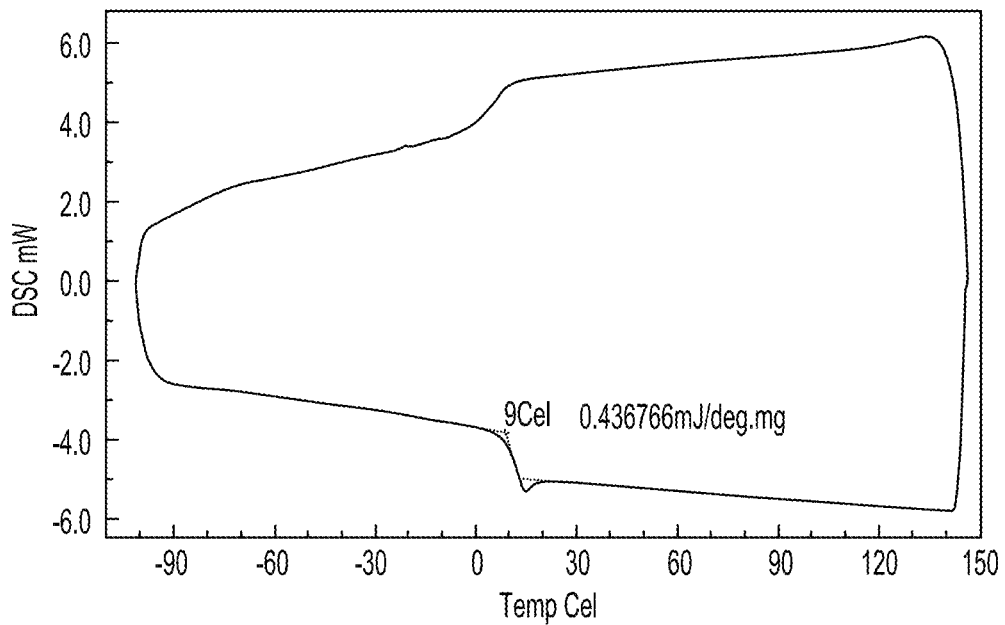
FIG. 5 shows the DSC curve of the polymer 2b obtained in Run 2 of Table 1.

In a 20-mL Schlenk tube placed in a THF-free glove box, a toluene solution (0.5 mL) of $[Ph_3C][B(C_6F_5)_4]$ (28.5 mg, 0.03 mmol) was slowly added to a toluene solution (0.5 mL) of $C_5H_5Sc(CH_2C_6H_4NMe_{2\text{-}o})_2$ (Sc-1, 13.0 mg, 0.03 mmol) under stirring with a magnetic stirrer. After stirring the resulting mixture for 5 minutes, an α-olefin 1b (889.2 mg, 6.0 mmol, 1.5 M in toluene) was added to the thus obtained reaction solution. The Schlenk tube was tightly sealed and maintained in the glove box for 24 hours under stirring at room temperature. Polymerization reaction was quenched with an addition of methanol (10 mL). The resulting mixture was poured into methanol (200 mL) so as to allow a polymer product to precipitate. The precipitated polymer was dried at 60° C. under reduced pressure to a constant weight (871.4 mg, 98% yield). The results of measuring the physical properties of the thus obtained polymer are shown in Table 1 and FIGS. 3 to 5.

Polymerization reactions were performed in the same manner as in the above-described polymerization of the α-olefin 1b, except that the monomer, the complex, the ratio of the monomer and the catalyst, the reaction temperature and the like were changed as shown in Table 1. The results of measuring the physical properties of the thus obtained polymers are shown in Table 1.

TABLE 1

$$\text{1a-u} \xrightarrow[\text{toluene, rt, 24 h}]{[M]/[Ph_3C][B(C_6F_5)_4]} \text{2a-u}$$

| run[a] | Monomer 1 | Complex [M] | 1/[M] | Polymer 2 | Yield[b] % | $M_n$[c] (kg/mol) | $M_w/M_n$[c] | rrrr[d] % | $T_g$[e] (°C.) |
|---|---|---|---|---|---|---|---|---|---|
| 1 | 1a | Sc-1 | 100/1 | 2a | 0[f] | — | — | — | — |
| 2 | 1b | Sc-1 | 200/1 | 2b | 98 | 33.6 | 1.77 | >95 | 9 |
| 3 | 1b | Sc-2 | 200/1 | 2b | 0 | — | — | — | — |
| 4 | 1b | Sc-3 | 200/1 | 2b | 100 | 29.8 | 1.33 | >95 | 5 |
| 5 | 1b | Sc-3 | 500/1 | 2b | 78 | 59.8 | 1.78 | >95 | 4 |
| 6 | 1c | Sc-3 | 100/1 | 2c | 0 | — | — | — | — |
| 7 | 1d | Sc-3 | 500/1 | 2d | 93 | 80.4 | 2.06 | >95 | −32 |
| 8 | 1e | Sc-3 | 500/1 | 2e | 71 | 83.6 | 1.96 | >95 | −31 |
| 9 | 1f | Se-3 | 500/1 | 2f | 89 | 74.5 | 1.76 | >95 | n.o.[g] |
| 10 | 1g | Sc-3 | 500/1 | 2g | 95 | 80.4 | 1.85 | >95 | 98 |
| 11 | 1h | Sc-3 | 100/1 | 2h | trace | — | — | — | — |
| 12 | 1h | Sc-4 | 100/1 | 2h | 99 | 30.2[h] | 1.16[h] | >95 | no. |
| 13 | 1i | Sc-3 | 200/1 | 2i | 100 | 57.0 | 2.23 | >95 | 0 |
| 14 | 1i | Se-3 | 1000/1 | 2i | 100 | 103.2 | 2.29 | >95 | 0 |
| 15 | 1i | Sc-3 | 2000/1 | 2i | 100 | 133.1 | 2.20 | >95 | −1 |
| 16 | 1i | Sc-3 | 5000/1 | 2i | 63 | 189.0 | 2.03 | >95 | 0 |
| 17[i] | 1i | Sc-3 | 200/1 | 2i | 100 | 304.9 | 1.65 | >95 | 0 |
| 18[i] | 1i | Sc-3 | 2000/1 | 2i | 93 | 585.5 | 1.57 | >95 | 1 |
| 19 | 1j | Sc-3 | 1000/1 | 2j | 100 | 83.4 | 2.36 | >95 | −1 |
| 20 | 1k | Sc-3 | 1000/1 | 2k | 97 | 103.5 | 2.02 | >95 | 12 |
| 21 | 1l | Sc-3 | 1000/1 | 2l | 99 | 132.9 | 2.52 | >95 | −5 |
| 22 | 1m | Sc-3 | 1000/1 | 2m | 100 | 118.4 | 2.87 | >95 | 2 |
| 23 | 1n | Sc-3 | 1000/1 | 2n | 99 | 20.7 | 2.68 | >95 | 29 |
| 24[j] | 1n | Sc-3 | 1000/1 | 2n | 99 | 60.2 | 2.45 | >95 | 24 |
| 25 | 1o | Sc-3 | 1000/1 | 2o | 100 | 102.0 | 1.80 | >95 | n.o. |
| 26 | 1p | Sc-3 | 1000/1 | 2p | 100 | 123.8 | 1.84 | >95 | −8 |
| 27 | 1q | Sc-3 | 500/1 | 2q | 100 | 58.9 | 2.55 | 92 | −7 |
| 28 | 1r | Sc-3 | 500/1 | 2r | 10 | 4.1 | 1.56 | n.d.[k] | −2 |
| 29 | 1r | Se-1 | 500/1 | 2r | 100 | 14.6 | 1.77 | n.d. | 27 |
| 30 | 1s | Se-3 | 100/1 | 2s | 37 | 1.5 | 1.39 | n.d. | 2 |
| 31 | 1s | Sc-1 | 100/1 | 2s | 39 | 1.2 | 1.46 | n.d. | 22 |
| 32 | 1s | Sc-4 | 100/1 | 2s | 64 | 3.1 | 1.53 | n.d. | 36 |
| 33 | 1t | Sc-1 | 100/1 | 2t | trace | — | — | — | — |
| 34 | 1u | Se-3 | 200/1 | 2u | 40 | 11.3 | 1.99 | 89 | −21 |
| 35 | 1u | Sc-1 | 200/1 | 2u | 80 | 8.9 | 2.16 | 90 | −23 |
| 36 | 1u | Sc-4 | 200/1 | 2u | 88 | 23.5 | 2.36 | >95 | −22 |

[a]Conditions: [M] (0.03 mmol), [Ph₃C][B(C₆F₅)₄](0.03 mmol), monomer 1 (1.5 M), toluene, rt, 24 h, unless otherwise noted.
[b]Weight of polymer obtained/weight of monomer used.
[c]Determined by gel permeation chromatography (GPC) in tetrahydrofuran at room temperature against polystyrene standard.
[d]Determined by $^{13}$C NMR analysis.
[e]Determined by differential scanning calorimetry (DSC).
[f]Formation of 1-phenoxy-1-propene (an isomerization product of monomer 1a) was observed.
[g]n.o. = not observed.
[h]Determined by high temperature GP C in 1,2-dichlorobenzene at 145° C. against polystyrene standard.
[i]−40° C.
[j]0° C.
[k]n.d. = not determined.
*"FG" means "functional group".

As described above, polar olefin polymers were obtained by the production method of the present invention. A polymer was not obtained in Run 1 of Table 1, and this is believed to be because the monomer 1a was isomerized into 1-phenoxy-1-propene by 1,3-hydrogen shift. In contrast, a polymer was obtained when the monomer 1b having two carbon atoms (ethylene unit) in a spacer moiety between a C=C bond and an oxygen atom (i.e., R² in Formula (III)) was used (Run 2). However, a polymer was not obtained when the complex Sc-2 was used in place of the complex Sc-1 (Run 3). From these results, it was suggested that the polymerization activities of polar olefin monomers are significantly affected by the spacer length and the steric hindrance of a complex ligand.

In addition, no polymerization activity was observed in Run 6 of Table 1 where the monomer 1c, an oxygen atom-free analogue, was used. From this result, it was suggested that the oxygen atom of the monomer 1b plays a critically important role in the polymerization activity.

Moreover, when the monomer 1h having a sterically bulky substituent was used, although a polymer was hardly obtained using the complex Sc-3 (Run 11), a polymer was obtained using the complex Sc-4 (Run 12).

Furthermore, in Run 33 of Table 1 where the monomer 1t was used, a polymer was hardly obtained despite that the monomer 1t had a spacer moiety longer than that of the monomer 1b (Run 33). On the other hand, the monomer 1u, a sulfur analogue of the monomer 1t, was polymerized under the same conditions (Runs 34 to 36). This is believed to be because a sulfur atom has a larger radius and the monomer 1u thus sufficiently interacted with the scandium atom via the long spacer.

<Determination of Microstructure of Polymer 2b>

Figure 6:
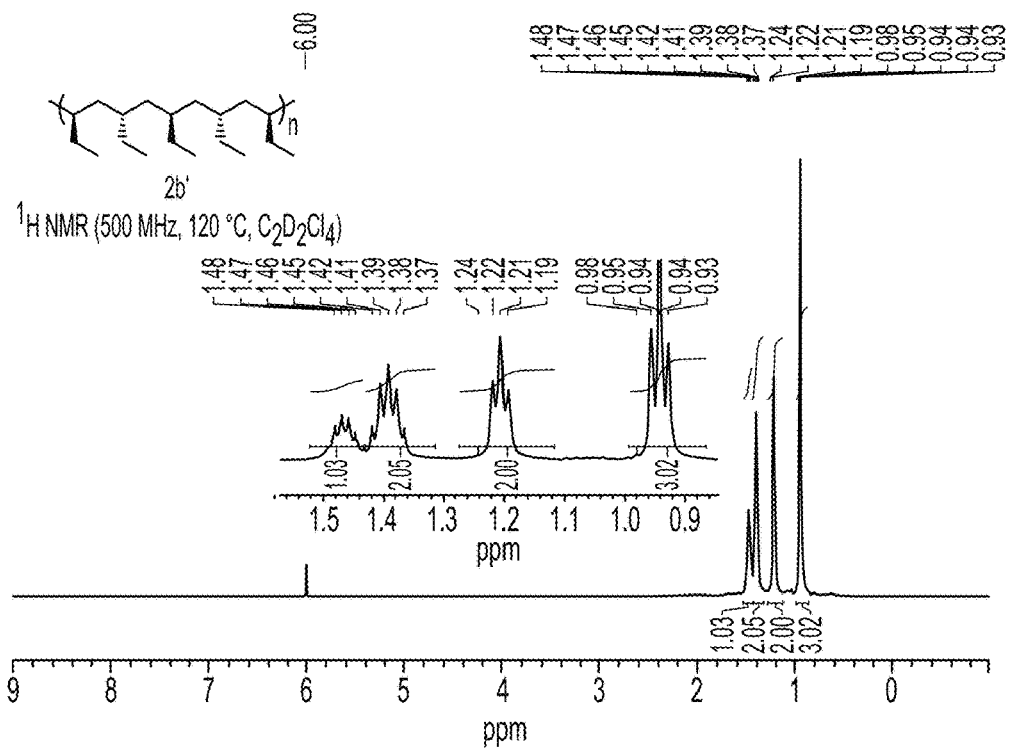
FIG. 6 shows the $^1$H NMR spectrum of 2b' derived from the polymer 2b obtained in Run 5 of Table 1.
Figure 7:
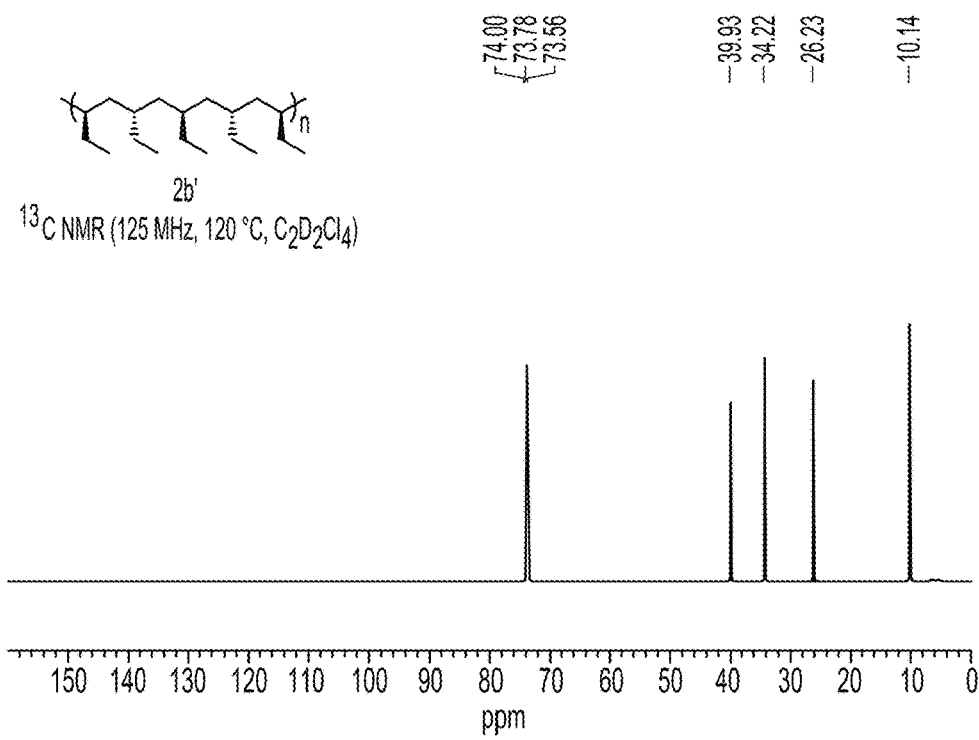
FIG. 7 shows the $^{13}$C NMR spectrum of 2b' derived from the polymer 2b obtained in Run 5 of Table 1.

The microstructure of the polymer 2b obtained in Run 5 of Table 1 was determined by converting the polymer 2b into poly-1-butene 2b' through selective C—O bond cleavage based on the method described in a document (E. Feghali et al., Chem. Commun. 50, 862-865 (2014)). In a nitrogen-saturated glove box, $B(C_6F_5)_3$ (1,078.0 mg, 2% by mole, based on monomer) and $Et_3SiH$ (1,780.0 mg, 15 mmol, based on monomer) were added to a dichloromethane solution of the polymer 2b (1,482.0 mg, 10 mmol, based on monomer). The resulting solution was stirred at room temperature for 12 hours, and the reaction was carefully quenched by adding thereto methanol. An off-white precipitate was recovered and dried at 60° C. under reduced pressure to a constant weight (556.8 mg, 99% yield). When the syndiotacticity of the thus obtained poly-1-butene 2b' was determined by the method described in a document (EP0387609; T. Asakura et al., Polymer 28, 1037-1040 (1987); T. Asakura et al., Macromolecules 24, 2334-2340 (1991)), a high syndiotacticity (rrrr>95%) was observed. In other words, the polymer 2b was confirmed to have a syndiotactic microstructure. The $^1H$ NMR spectrum and $^{13}C$ NMR spectrum of the poly-1-butene 2b' are shown in FIGS. 6 and 7, respectively.

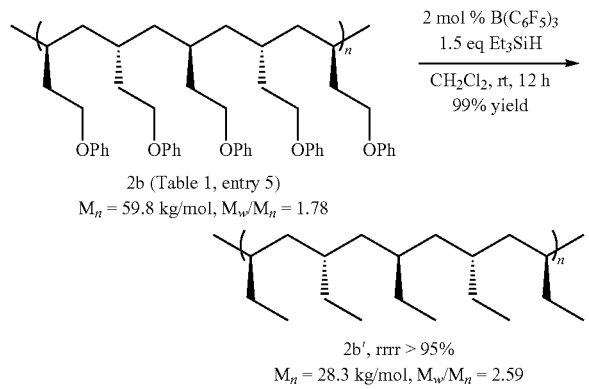

[Example 2] Production of Nonpolar Olefin and Polar Olefin Copolymers

<Copolymerization of α-Olefin 1i and Ethylene (Table 2, Run 38)>

Figure 8:
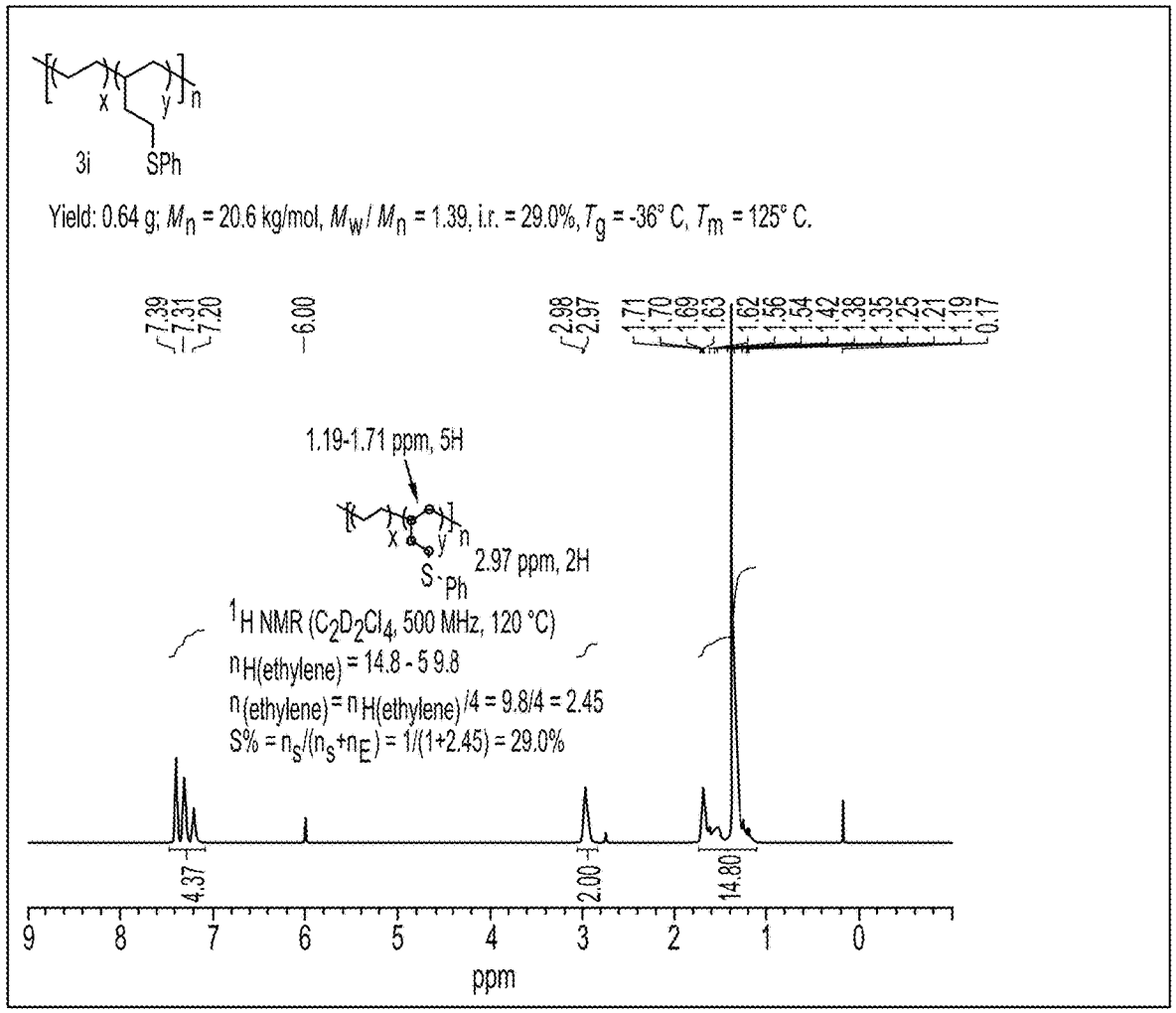
FIG. 8 shows analysis values and $^1$H NMR spectrum of a copolymer 3i obtained in Run 38 of Table 2.
Figure 9:
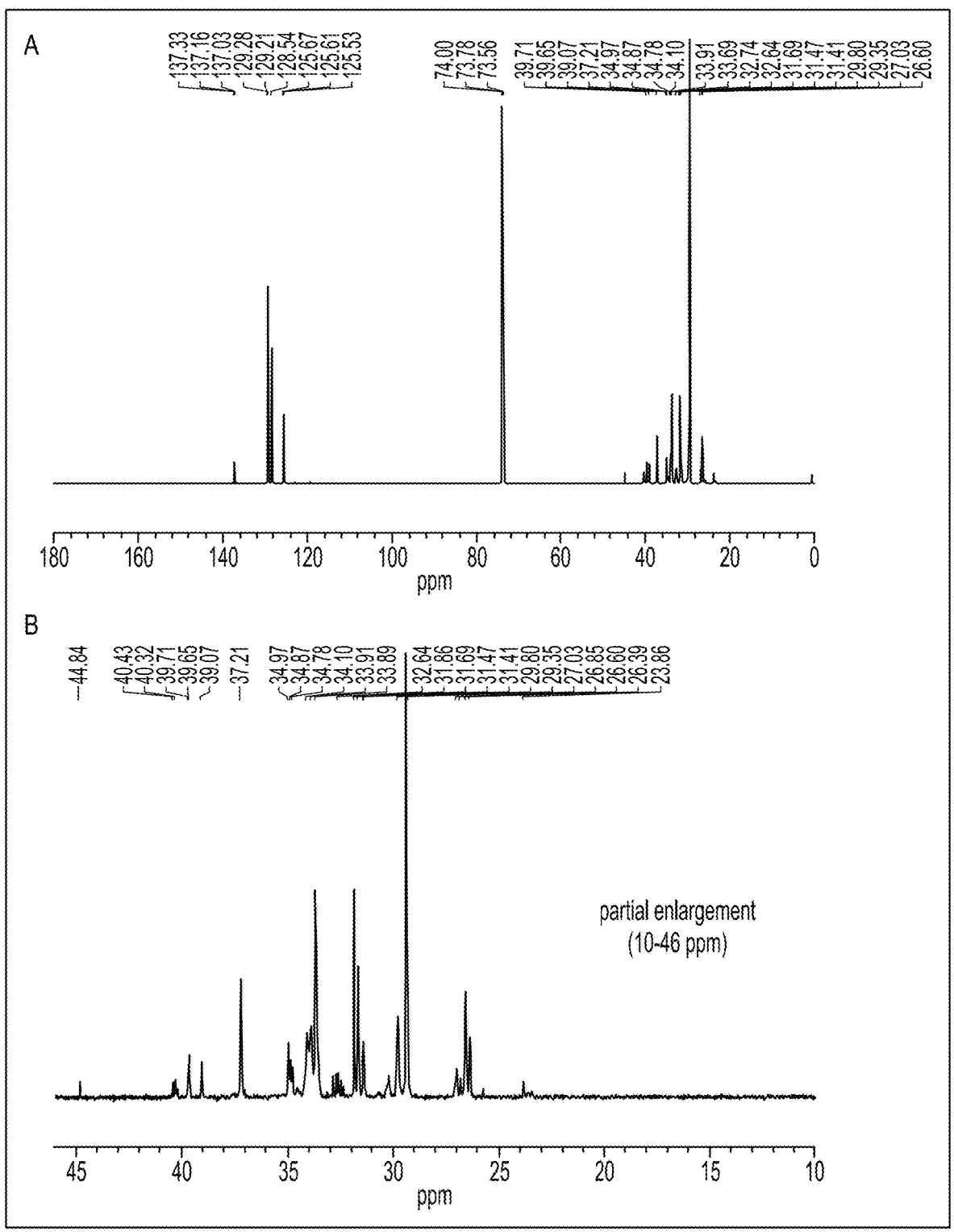
FIG. 9 shows the $^{13}$C NMR spectrum (125 MHz, $C_2D_2Cl_4$, 120° C.) of the polymer 3i obtained in Run 38 of Table 2. A of FIG. 9 is the entirety thereof, and B of FIG. 9 is a partially enlarged view taken for a range of 10 to 46 ppm.
Figure 10:
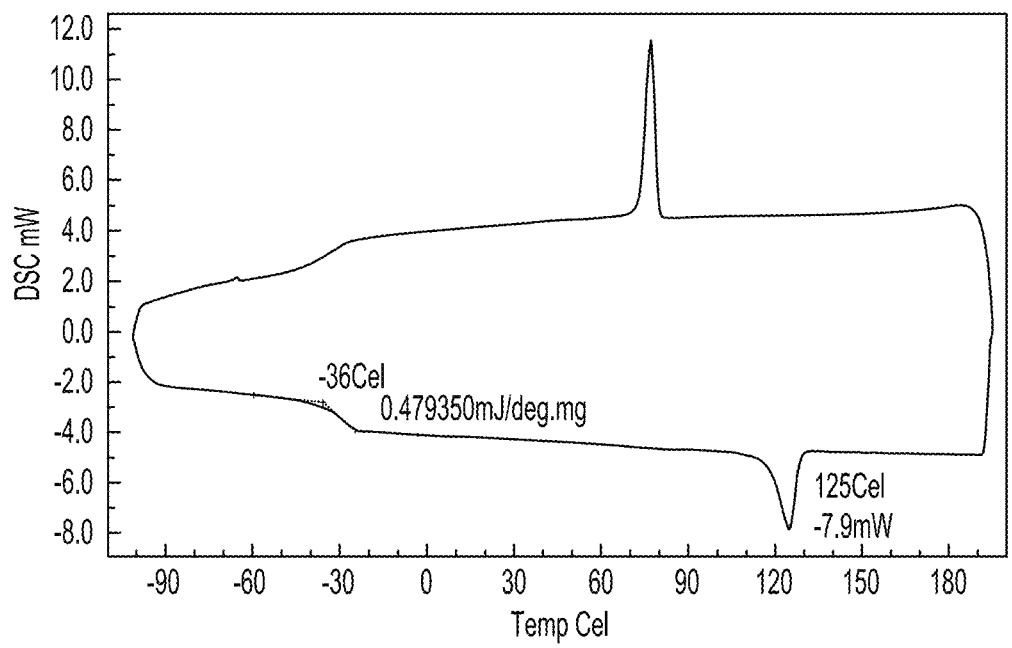
FIG. 10 shows the DSC curve of the polymer 3i obtained in Run 38 of Table 2.

In a THF-free glove box, a toluene solution (50 mL) of an α-olefin 1i (492.8 mg, 3 mmol) was charged into a three-necked flask along with a magnetic stir bar. The flask was taken out of the glove box, set in a water bath (20° C.), and then connected to a thoroughly-purged ethylene Schlenk line and a mercury-sealed stopper using a three-way stopcock. Ethylene (1 atm) was introduced to the system, and the solution was stirred for 2 minutes to be saturated with ethylene. While vigorously stirring this solution, a toluene solution (2 mL) of $C_5Me_4SiMe_3Sc(CH_2C_6H_4NMe_{2\text{-}o})_2$ (Sc-5) (15.2 mg, 0.03 mmol) and $[Ph_3C][B(C_6F_5)_4]$ (28.5 mg, 0.03 mmol) was added thereto using a syringe. After 2 hours, polymerization reaction was quenched with an addition of methanol (200 mL). The resulting polymer was recovered by filtration, washed with methanol, and then dried at 60° C. under reduced pressure to a constant weight (0.64 g). The thus obtained polymer was soluble in heated toluene, dichlorobenzene and 1,1,2,2-tetrachloroethane. A solvent fractionation test suggested that the extent of the formation of a homopolymer (2i or polyethylene) could be disregarded (<2%). The 1i content in the copolymer was determined from $^1H$ NMR analysis. The results of measuring the physical properties of the thus obtained polymer are shown in Table 2 and FIGS. 8 to 10.

Polymerization reactions were performed in the same manner as in the above-described copolymerization of the α-olefin 1i and ethylene, except that the monomer, the complex, the ratio of the monomer and the catalyst, the reaction temperature and the like were changed as shown in Table 2. The results of measuring the physical properties of the thus obtained polymers are shown in Table 2.

TABLE 2

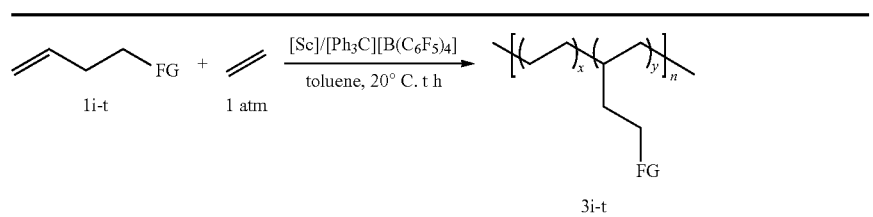

| run[a] | Monomer 1 | [M] | 1/[M] | t (h) | Yield (g) | Activity[b] | $M_n$[c] (kg/mol) | $M_w/M_n$[c] | i.r.[d] (%) | $T_g$[e] (° C.) | $T_m$[e] (° C.) |
|---|---|---|---|---|---|---|---|---|---|---|---|
| 37 | 1i, FG = SPh | Sc-3 | 100/1 | 1.5 | 0.12 | 2.7 | 14.7 | 1.76 | 73.5 | −8 | n.o.[f] |
| 38 | 1i | Sc-5 | 100/1 | 2 | 0.64 | 10.6 | 20.6 | 1.39 | 29.0 | −36 | 125 |
| 39 | 1i | Sc-5 | 500/1 | 20 | 1.95 | 3.3 | 57.7 | 1.92 | 44.9 | −16 | 128 |
| 40 | 1i | Sc-6 | 100/1 | 5 | 1.11 | 7.4 | 82.4 | 1.69 | 2.6 | −18 | 124 |
| 41 | 1i | Sc-6 | 500/1 | 20 | 3.48 | 5.8 | 31.7 | 1.96 | 15.7 | −19 | 119 |
| 42 | 1i | Sc-6 | 1000/1 | 20 | 4.39 | 7.3 | 17.0 | 2.38 | 38.9 | −14 | 110 |
| 43 | 1r, FG = PPh$_2$ | Sc-5 | 100/1 | 0.33 | 1.03 | 103.2 | 54.0 | 2.20 | 9.5 | 2 | 133 |
| 44 | 1r | Sc-5 | 500/1 | 1.5 | 2.90 | 64.4 | —[g] | —[g] | 32.5 | 10 | 124 |
| 45 | 1b, FG = OPh | Sc-5 | 100/1 | 5 | 0 | — | — | — | — | — | — |
| 46 | 1t, FG = CH$_2$OPh | Sc-5 | 100/1 | 0.5 | 1.36 | 90.4 | 124.9 | 2.29 | 8.7 | −40 | 127 |
| 47 | 1t | Sc-5 | 50011 | 5 | 3.07 | 20.5 | 89.6 | 1.95 | 24.8 | −39 | 114 |

TABLE 2-continued

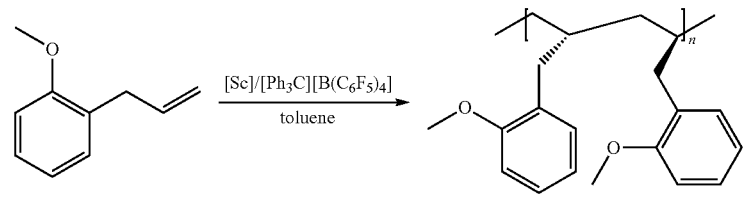

| run[a] | Monomer 1 | [M] | 1/[M] | t (h) | Yield (g) | Activity[b] | $M_n^c$ (kg/mol) | $M_w/M_n^c$ | i.r.[d] (%) | $T_g^e$ (°C.) | $T_m^e$ (°C.) |
|---|---|---|---|---|---|---|---|---|---|---|---|
| 48 | 1t | Sc-6 | 100/1 | 5 | 1.78 | 11.8 | 154.2 | 2.71 | 3.3 | −31 | 124 |
| 49 | 1t | Sc-6 | 500/1 | 20 | 1.22 | 2.0 | 83.0 | 2.23 | 11.8 | −36 | 119 |

[a]Conditions: [M] (0.03 mmol), [Ph₃C][B(C₆F₅)₄] (0.03 mmol), monomer 1, ethylene (1 atm), toluene (50 mL) at 20° C. for t hours unless otherwise stated.
[b]kg of copolymer/(mol of complex·h·atm).
[c]Determined by GP C in 1,2-dichlorobenzene at 145° C. against polystyrene standard.
[d]Incorporation ratio of monomer 1, determined by ¹H NMR analysis.
[e]Determined by differential scanning calorimetry.
[f]n.o. = not observed.
[g]No GP C signal was observed in 1,2-dichlorobenzene at 145° C. probably due to oxidation (or other reaction) of the phosphine components at high temperature inside the GP C columns.
*"FG" means "functional group".

As described above, copolymers of a polar olefin and ethylene were obtained by the production method of the present invention. It is noted here that, although a copolymer was not obtained in Run 45 of Table 2, this is believed to be because the effect of steric hindrance of the complex was large with respect to the spacer length as in Run 3 of Table 1.

[Example 3] Production of Polar Olefin Polymers

<Polymerization of α-Olefin 1v (Table 3, Run 1)>

Figure 11:
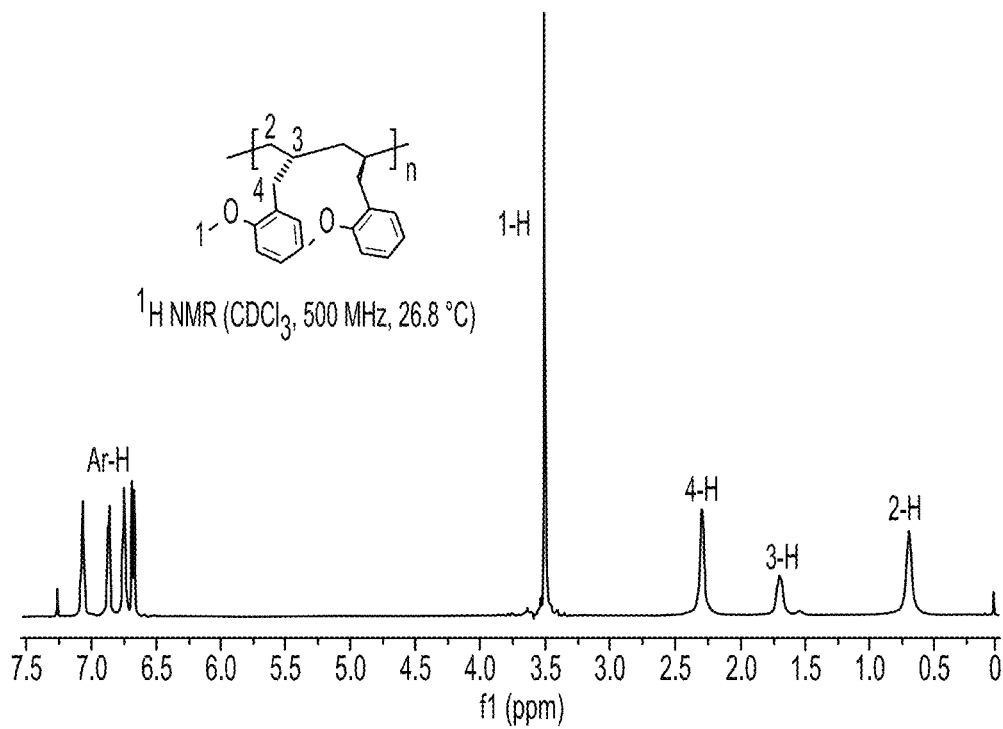
FIG. 11 shows the $^1$H NMR spectrum of a polymer obtained in Run 1 of Table 3.
Figure 12:
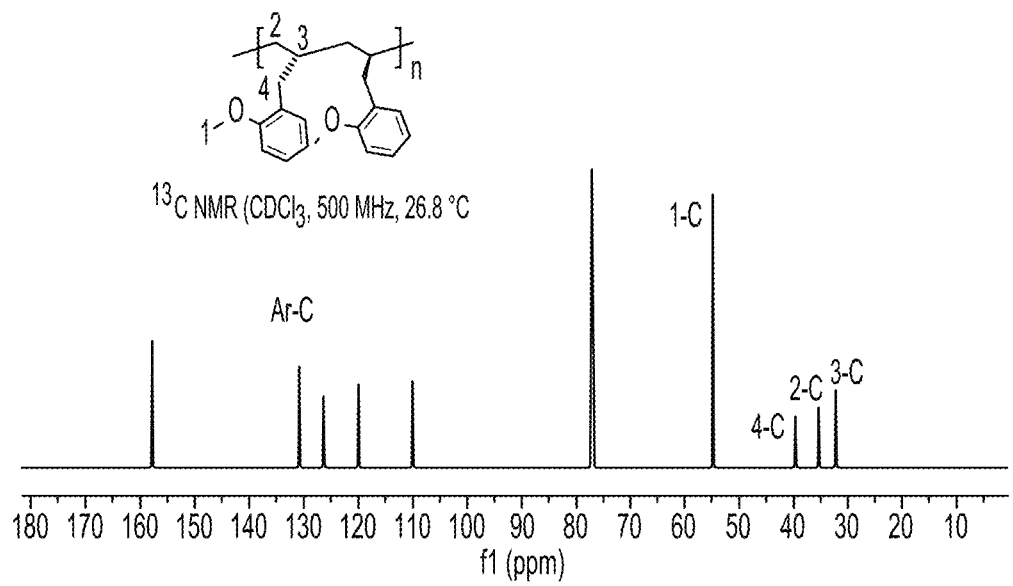
FIG. 12 shows the $^{13}$C NMR spectrum of the polymer obtained in Run 1 of Table 3.
Figure 13:
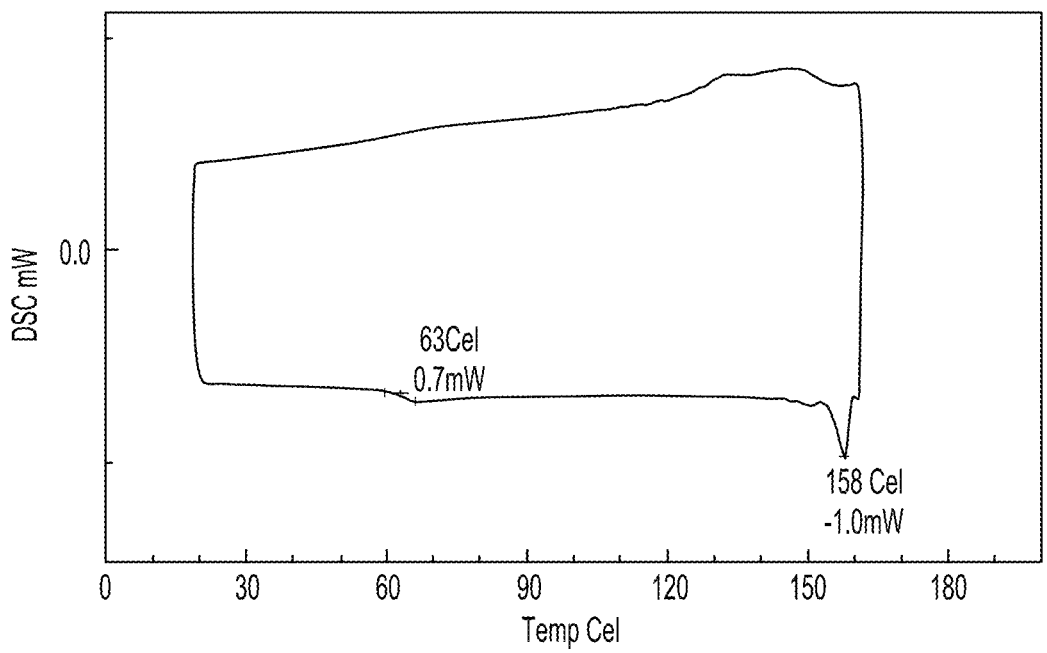
FIG. 13 shows the DSC curve of the polymer obtained in Run 1 of Table 3.

In a 10-mL glass tube placed in a glove box, a toluene solution (1.0 mL) of [Ph₃C][B(C₆F₅)₄] (18.4 mg, 20 µmol) was slowly added to a toluene solution (1.0 mL) of (C₅H₅)Sc(CH₂C₆H₄NMe₂-ₒ)₂ (Sc-1, 8.0 mg, 20 µmol) under stirring with a magnetic stirrer. After 5 minutes, an α-olefin 1v (296 mg, 1 mmol) was promptly added to the resulting reaction solution. Once the viscosity of the reaction solution was increased (12 minutes), polymerization reaction was quenched with an addition of methanol (5 mL). A polymer product was recovered by filtration, washed with methanol, and then dried for 24 hours at 60° C. under reduced pressure, whereby a white powder was obtained (296 mg). The results of measuring the physical properties of the thus obtained polymer are shown in Table 3 and FIGS. 11 to 13.

Polymerization reactions were performed in the same manner as in the above-described polymerization of the α-olefin 1v, except that the complex, the ratio of the monomer and the catalyst, the reaction time and the like were changed as shown in Table 3. The results of measuring the physical properties of the thus obtained polymers are shown in Table 3.

TABLE 3

| Run[a] | [M] | [O]/[M] | Time (h) | Yield (mg)[b] | Activity (kg·mol⁻¹·h⁻¹) | $M_n$ (× 10³ g/mol)[c] | $M_w/M_n^c$ | $T_g^d$ | $T_m^d$ | rrrr[e] |
|---|---|---|---|---|---|---|---|---|---|---|
| 1 | Sc-1 | 100/1 | 12 min | 296 | 74 | 13.7 | 1.62 | 65 | 152 | 99 |
| 2[f] | Sc-1 | 1000/1 | 1 | 2.84 g | 142 | 25.1 | 1.80 | 65 | 155 | 99 |
| 3[g] | Sc-1 | 1000/1 | 13 | 2.96 g | 11 | 56.6 | 1.89 | 65 | 158 | 99 |
| 4 | Sc-3 | 100/1 | 48 | 280 | 0.29 | 10.5 | 1.35 | 55 | — | 85 |
| 5 | Sc-2 | 100/1 | 48 | 277 | 0.29 | 6.7 | 1.50 | 46 | — | 77 |
| 6 | Sc-5 | 100/1 | 72 | 246 | 0.47 | 2.4 | 1.72 | 43 | — | 60 |

TABLE 3-continued

[Reaction scheme: allyl-methoxybenzene + [Sc]/[Ph₃C][B(C₆F₅)₄] in toluene → polymer]

| Run[a] | [M] | [O]/[M] | Time (h) | Yield (mg)[b] | Activity (kg·mol⁻¹·h⁻¹) | $M_n$ (× 10³ g/mol)[c] | $M_w/M_n$[c] | $T_g$[d] | $T_m$[d] | rrrr[e] |
|---|---|---|---|---|---|---|---|---|---|---|
| 7 | Sc-7 | 100/1 | 3 | 250 | 4.2 | 15.9 | 1.97 | 65 | 155 | 99 |
| 8 | Sc-6 | 100/1 | 72 | trace | — | — | — | — | — | — |

[a]Conditions: [M] (0.02 mmol), [B]:[Ph₃C][B(C₆F₅)₄] (0.02 mmol), 3 mL toluene, 20° C.
[b]Yield of final polymer.
[c]Determined by GPC in THF at 40° C. against polystyrene standard.
[d]Determined by differential scanning calorimetry.
[e]determined by ¹³C NMR analysis.
[f][M] = [B] = 0.01 mmol, 10 mL toluene.
[h][M] = [B] = 0.01 mmol, 10 mL toluene, −20° C.

As described above, polymers of the polar olefin 1v were obtained by the production method of the present invention. It is noted here that, although a polymer was not obtained in Run 8 of Table 3, this is believed to be attributed to the high bulkiness of $C_5Me_4SiMe_3$ as well as the effect of steric hindrance due to the coordination of THF.

[Example 4] Production of Nonpolar Olefin and Polar Olefin Copolymers

<Copolymerization of α-Olefin 1v and Ethylene (Table 4, Run 4)>

In a 10-mL glass tube placed in a glove box, a toluene solution (1.0 mL) of [Ph₃C][B(C₆F₅)₄] (9.3 mg, 10 μmol) was slowly added to a toluene solution (1.0 mL) of $(C_5HMe_4)Sc(CH_2C_6H_4NMe_{2-o})_2$ (Sc-3, 5.1 mg, 10 μmol) under stirring with a magnetic stirrer. The α-olefin 1v (0.74 g, 5.0 mmol) in 150 mL of toluene) was charged into a three-necked flask. The flask was taken out, set in a water bath (25° C.), and then connected to a thoroughly-purged ethylene Schlenk line and a mercury-sealed stopper using a three-way stopcock. Ethylene was introduced to the system, and the solution was stirred for 1 minute to be saturated with ethylene. While vigorously stirring this solution, the above-prepared catalyst solution was added thereto using a sealed syringe. Once the viscosity of this reaction solution was increased (5 minutes), polymerization reaction was quenched with an addition of methanol (50 mL). The resulting polymer was recovered by filtration, washed with methanol, and then dried for 24 hours at 60° C. under reduced pressure, whereby a colorless rubber-like substance was obtained (0.91 g). The results of measuring the physical properties of the thus obtained polymer are shown in Table 4.

Figure 14:
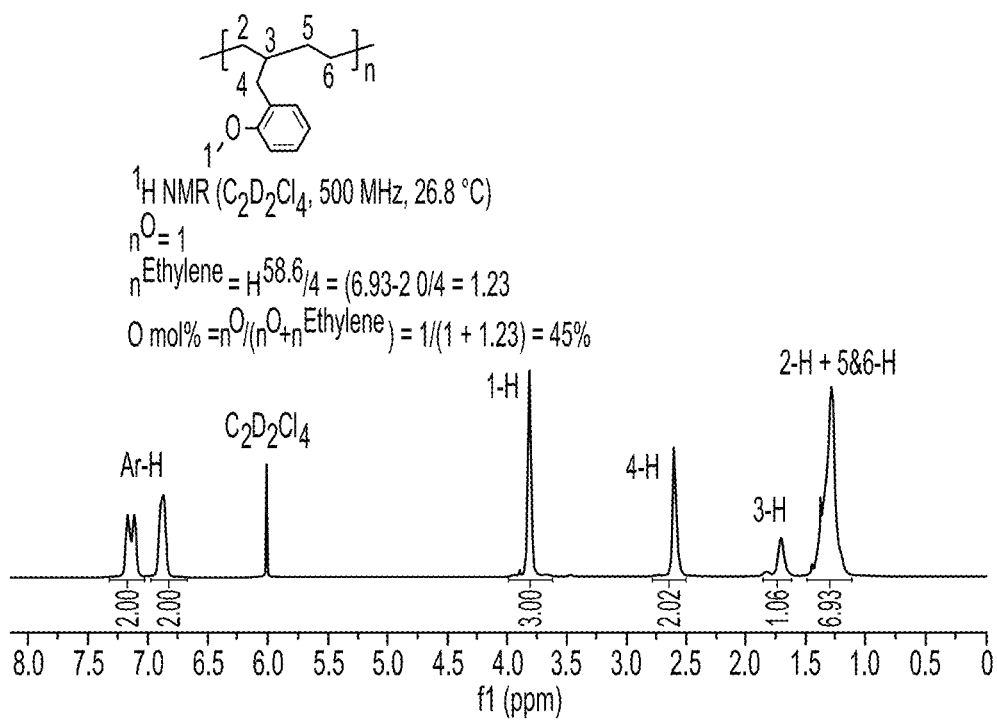
FIG. 14 shows the $^1$H NMR spectrum of a copolymer obtained in Run 7 of Table 4.
Figure 15:
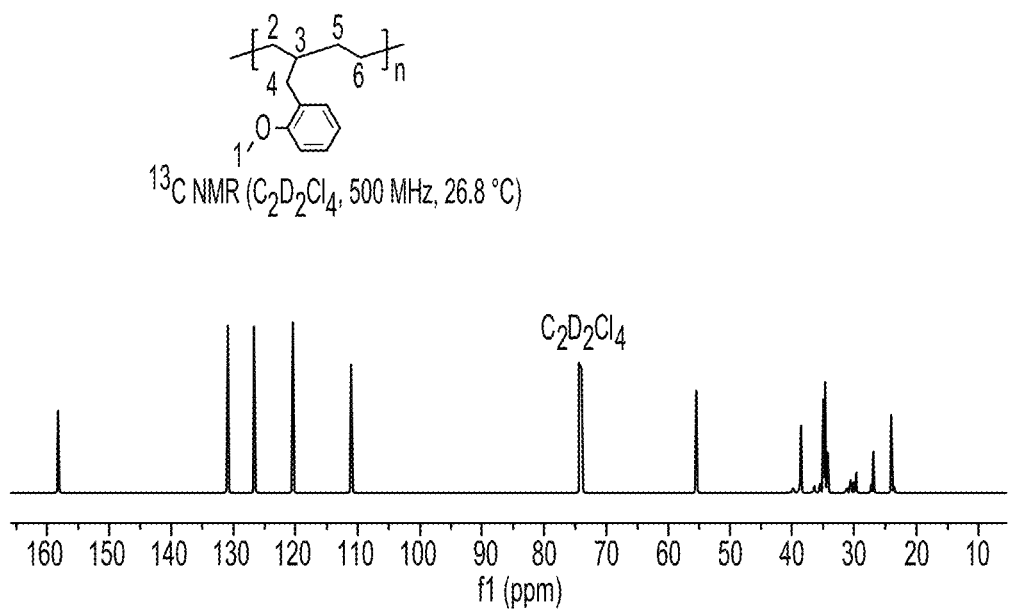
FIG. 15 shows the $^{13}$C NMR spectrum of the copolymer obtained in Run 7 of Table 4.
Figure 16:
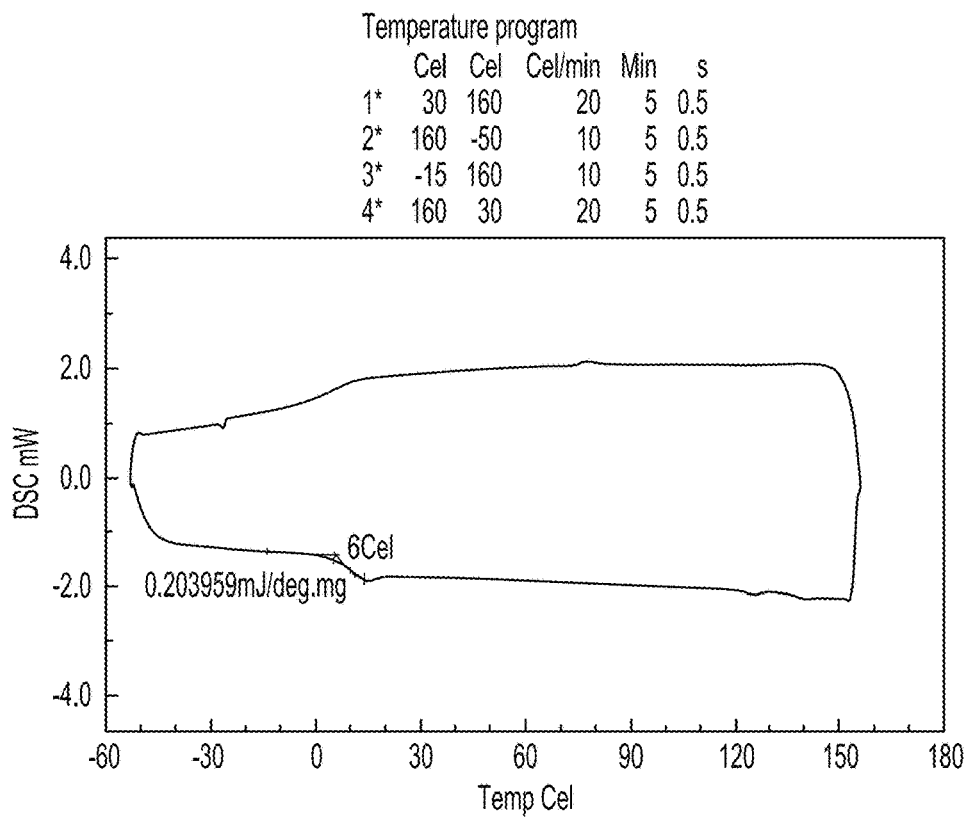
FIG. 16 shows the DSC curve of the copolymer obtained in Run 7 of Table 4.

Polymerization reactions were performed in the same manner as in the above-described copolymerization of the α-olefin 1v and ethylene, except that the complex, the ratio of the monomer and the catalyst, the reaction time and the like were changed as shown in Table 4. The results of measuring the physical properties of the thus obtained polymers are shown in Table 4 and FIGS. 14 to 16. Further, in systems using a chain transfer agent as shown in Table 5, polymerization reactions were performed in the same manner as in the above-described copolymerization of the α-olefin 1v and ethylene. The results of measuring the physical properties of the thus obtained polymers are shown in Table 5. TIBA (triisobutyl aluminum) and anisole hardly changed the molecular weight of the resulting polymer; however, TMA (trimethyl aluminum) markedly reduced the molecular weight of the resulting polymer. This indicates that TMA is extremely effective as a chain transfer agent and that the molecular weight can be controlled by adjusting the amount thereof to be added.

TABLE 4

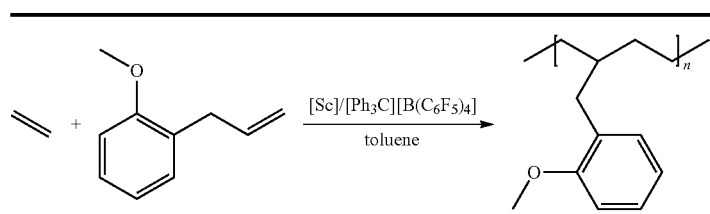

| Run[a] | [M] | [O]/[M] | Yield (g)[b] | Time | Activity (kg·mol⁻¹·h⁻¹) | $M_n$ (× 10³ g/mol)[c] | $M_w/M_n$[c] | Incorporation ([O]/[Et] · mol %)[d] | $T_g$[e] | $T_m$[e] |
|---|---|---|---|---|---|---|---|---|---|---|
| 1[f] | Sc-6 | 100:1 | 610 mg | 1 h | 20.3 | 38.4 | 1.39 | 23/77 | −19 | 121 |
| 2 | Sc-6 | 500:1 | 1.2 | 4.5 h | 26.7 | 187.0 | 1.45 | 40/60 | −4 | — |
| 3[f] | Sc-3 | 200:1 | 0.70 | 15 min | 140 | 41.1 | 1.68 | 38/62 | −6 | — |

TABLE 4-continued

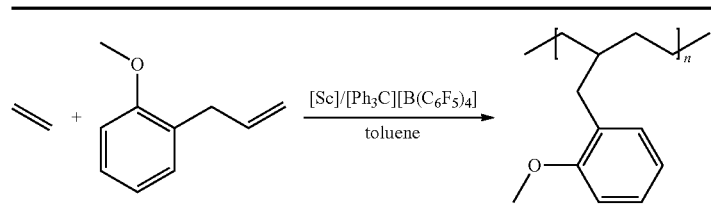

| Run[a] | [M] | [O]/[M] | Yield (g)[b] | Time | Activity (kg·mol$^{-1}$·h$^{-1}$) | $M_n$ (×10³ g/mol)[c] | $M_w/M_n$[c] | Incorporation ([O]/[Et] · mol %)[d] | $T_g^e$ | $T_m^e$ |
|---|---|---|---|---|---|---|---|---|---|---|
| 4 | Sc-3 | 500:1 | 0.91 | 5 min | 1092 | 89.4 | 1.58 | 42/58 | 4 | — |
| 5 | Sc-3 | 1000:1 | 1.61 | 15 min | 644 | 172.8 | 1.94 | 43/57 | 4 | — |
| 6 | Sc-3 | 2000:1 | 3.05 | 12 h | 25.4 | 343.7 | 1.70 | 43/57 | 5 | — |
| 7 | Sc-3 | 5000:1 | 8.35 | 53 h | 15.8 | 551.6 | 1.98 | 45/55 | 6 | — |
| 8[f] | Sc-3 | 200:1 | 3.38 g | 30 min | 338 | 620.1 | 1.62 | 2.8/97.2 | −25 | 131 |
| 9 | Sc-3 | 600:1 | 6.47 g | 30 min | 1294.1 | 1,159.7 | 1.85 | 3/97 | −22 | 131 |

[a]Conditions: Sc-5/Sc-6 (0.01 mmol), [B]:[Ph₃C][B(C₆F₅)₄] (0.01 mmol), ethylene (1 atm), 150 mL toluene, 20° C.
[b]Yield of final polymer.
[c]Determined by GPC in o-DCB at 140° C. against polystyrene standard.
[d]Incorporation ratio of O-monomer 1 v [O] and ethylene [Et], determined by ¹H NMR analysis.
[e]Determined by differential scanning calorimetry.
[f][M] = [B] = 0.02 mmol, 50 mL toluene.

TABLE 5

| Run[a] | CTA | [O]/[CTA]/[M] | Yield (g)[b] | Time | Activity (kg·mol$^{-1}$·h$^{-1}$) | $M_o^{Exp}$ (×10³ g/mol)[c] | $M_w/M_n$[c] | $M_o^{NMR}$ (×10³ g/mol)[d] | chain/Sc[e] |
|---|---|---|---|---|---|---|---|---|---|
| 1 | — | 1000:1 | 1.61 | 15 min | 644 | 173 | 1.94 | — | 0.93 |
| 2 | TIBA | 1000:100:1 | 0.71 | 15 min | 284 | 99.3 | 1.62 | — | 0.72 |
| 3 | Anisole | 1000:100:1 | 1.24 | 2 h | 62 | 188 | 1.79 | — | 0.5 |
| 4 | TMA | 1000:100:1 | 0.75 | 40 min | 113 | 1.36 | 1.58 | 1.24 | 55 |
| 5 | TMA | 1000:100:1 | 1.56 | 100 min | 93.4 | 1.76 | 1.41 | 1.44 | 88.6 |
| 6 | TMA | 1000:50:1 | 1.70 | 1 h | 170 | 2.90 | 1.67 | 2.45 | 58.6 |
| 7 | TMA | 1000:10:1 | 1.74 | 30 min | 348 | 11.9 | 2.19 | 11.2 | 14.6 |

[a]Conditions: [M] (0.01 mmol), [Ph₃C] [B(C₆F₅)₄] (0.01 mmol), ethylene (1 atm), 150 mL toluene, 20° C.
[b]Yield of final polymer.
[c]Determined by GPC in o-DCB at 140° C. or THF in 35° C. against polystyrene standard.
[d]Determined by ¹H NMR analysis.
[e]Polymer chain per Sc was calculated based on the Sc feed, polymer yield, and the $M_n$ of the resulting polymer by using the equation chain/Sc = yield (g)/($M_n$ · mol of Sc).

As described above, copolymers of the polar olefin 1v and ethylene were obtained by the production method of the present invention.

[Example 5] Production of Nonpolar Olefin and Polar Olefin Copolymers

<Copolymerization of α-Olefin 1v and Styrene (Table 6, Run 2)>

Figure 17:
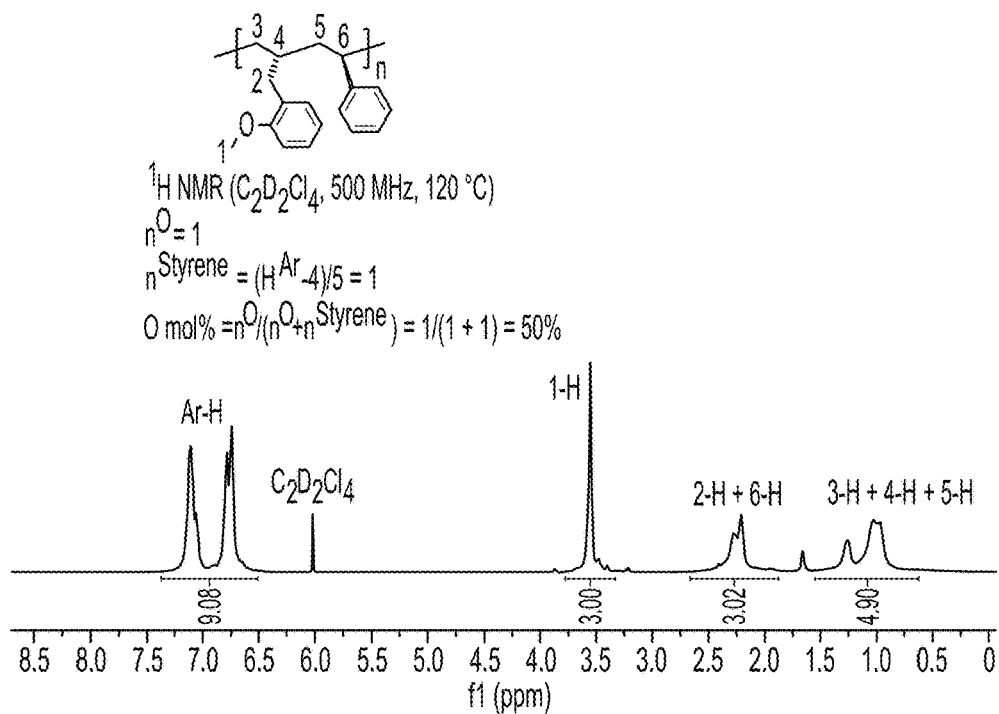
FIG. 17 shows the $^1$H NMR spectrum of a copolymer obtained in Run 2 of Table 6.
Figure 18:
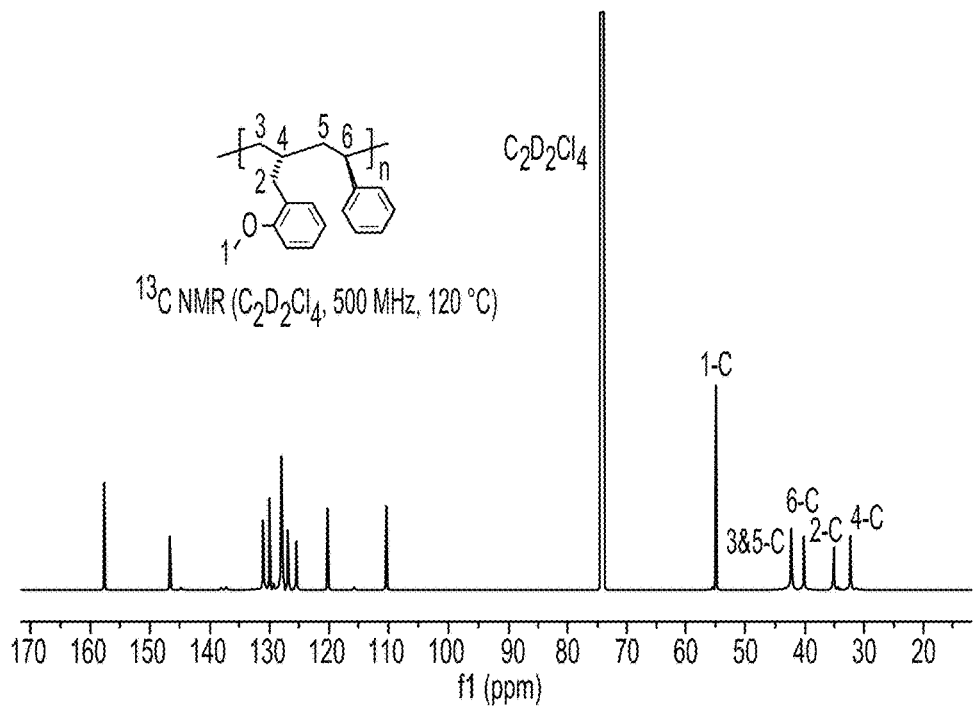
FIG. 18 shows the $^{13}$C NMR spectrum of the copolymer obtained in Run 2 of Table 6.
Figure 19:
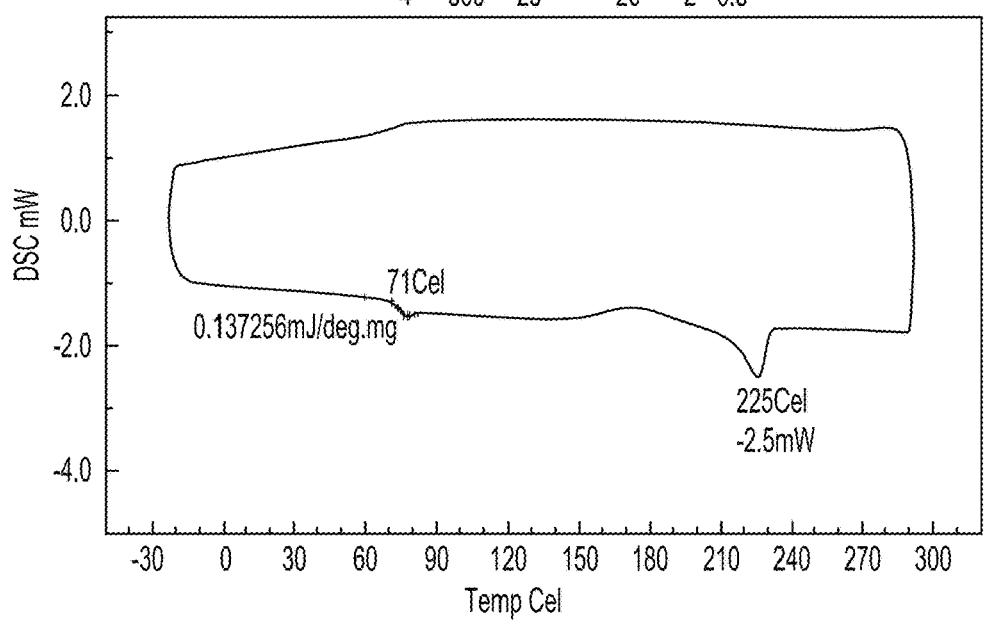
FIG. 19 shows the DSC curve of the copolymer obtained in Run 2 of Table 6.

In a 20-mL glass tube placed in a glove box, a toluene solution (1.0 mL) of [Ph₃C][B(C₆F₅)₄] (9.3 mg, 10 μmol) was slowly added to a toluene solution (4.0 mL) of (C₅Me₄SiMe₃)Sc(CH₂C₆H₄NMe₂-o)₂ (Sc-5, 5.1 mg, 10 μmol) under stirring with a magnetic stirrer. After 5 minutes, in 5 mL of toluene, a mixed solution of styrene (1.04 g, 10 mmol) and the α-olefin 1v (1.48 g, 10 mmol) was promptly added to the thus obtained catalyst solution. Once the viscosity of the resulting reaction solution was increased (24 hours), polymerization reaction was quenched with an addition of methanol (50 mL). A polymer product was recovered by filtration, washed with methanol, and then dried for 24 hours at 60° C. under reduced pressure, whereby a white powder was obtained (2.2 g). The results of measuring the physical properties of the thus obtained polymer are shown in Table 6 and FIGS. 17 to 19.

Polymerization reactions were performed in the same manner as in the above-described copolymerization of the α-olefin 1v and styrene, except that the complex, the ratio of the monomer and the catalyst, the reaction time and the like were changed as shown in Table 6. The results of measuring the physical properties of the thus obtained polymers are shown in Table 6.

TABLE 6

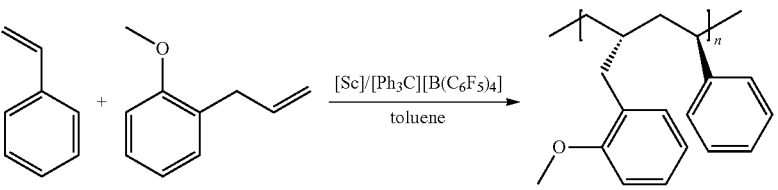

| Run[a] | [M] | [O]:[St]:[M] | Time (h) | Yield (mg)[b] | Activity (kg·mol$^{-1}$·h$^{-1}$) | $M_n$ (×10³ g/mol)[c] | $M_W/M_n$[c] | ([O]/[St]·mol %)[d] | $T_g^e$ | $T_m^e$ | rrrr[g] |
|---|---|---|---|---|---|---|---|---|---|---|---|
| 1 | Sc-5 | 200:200:1 | 48 | 510 | 0.5 | 11.7 | 1.56 | 50/50 | 60 | 210 | >95% |
| 2 | Sc-5 | 1000:1000 | 24 | 22 g | 4.6 | 92.5 | 1.75 | 50/50 | 69 | 220 | >95% |
| 3[g] | Sc-5 | 2000:2000 | 30 | 1.8 g | 5 | 113.6 | 1.81 | 50/50 | 69 | 220 | >95% |
| 4[g] | Sc-5 | 500:2500 | 2 | 800 | 40 | 69.5 | 1.78 | 50/50 | 71 | 225 | >95% |
| 5[g] | Sc-5 | 500:2500 | 8 | 4.0 g | 50 | 141.3 | 2.85 | 20/100 | 71 | 270/222 | >95% |
| 6[g] | Sc-6 | 500:2500 | 12 | 4.08 g | 34 | 210.6 | 2.04 | 20/100 | 71 | 270/222 | >95% |
| 8 | Sc-6 | 100:1000 | 1.5 | 2.38 g | 79 | 122.5 | 1.83 | 10/100 | | 271/264 | >95% |
| 9[g] | Sc-6 | 100:2000 | 15 min | 2.22 g | 888 | 237.2 | 1.57 | 5/100 | | 270 | >95% |
| 10[g] | Sc-6 | 100:5000 | 5 min | 5.35 g | 6420 | 411.34 | 1.47 | 2/100 | | 271 | >9.5% |

[a]Conditions: [M] (0.02 mmol), [B]:[Ph₃C][B(C₆F₅)₄] (0.02 mmol), 5 mL toluene, 20° C.
[b]Yield of final polymer.
[c]Determined by GPC in o-DCB at 140° C. against polystyrene standard.
[d]Incorporation ratio of O-monomer 1v [O] and styrene [St], determined by ¹H NMR analysis.
[e]Determined by differential scanning calorimetry.
[f]Stereotacticity of copolymers, determined by ¹³C NMR analysis.
[g][M] = [B] = 0.01 mmol, 25 mL toluene.

As described above, copolymers of the polar olefin 1v and styrene were obtained by the production method of the present invention.

[Example 6] Production of Nonpolar Olefin and Polar Olefin Copolymers

<Copolymerization of α-Olefin 1v and Propylene (Table 7, Run 2)>

Figure 20:
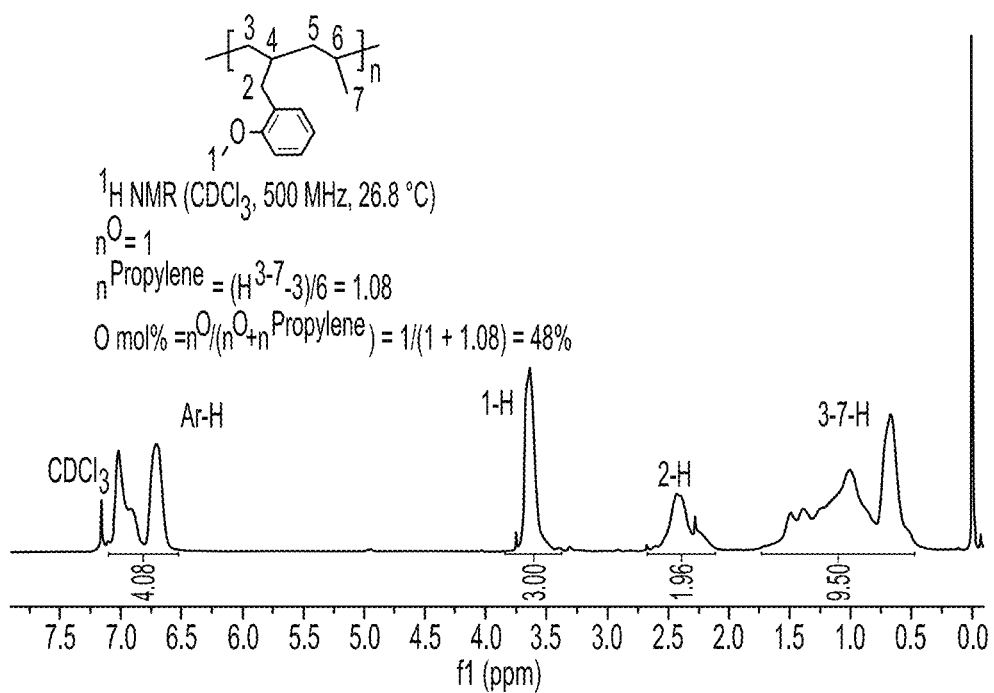
FIG. 20 shows the $^1$H NMR spectrum of a copolymer obtained in Run 2 of Table 7.
Figure 21:
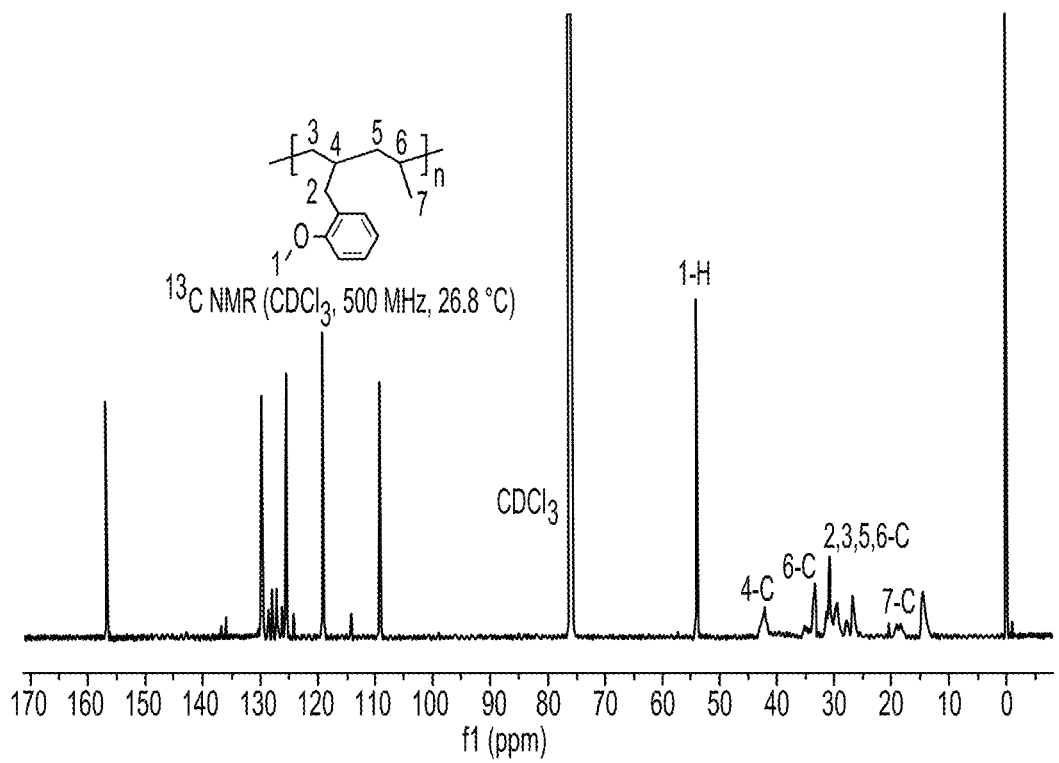
FIG. 21 shows the $^{13}$C NMR spectrum of the copolymer obtained in Run 2 of Table 7.
Figure 22:
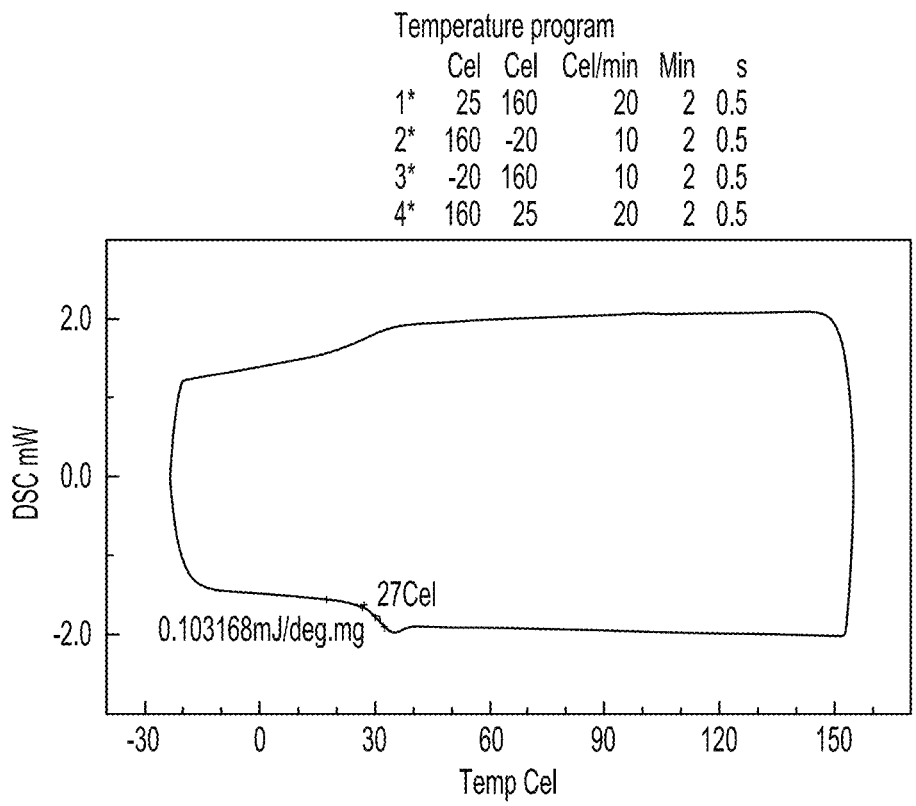
FIG. 22 shows the DSC curve of the copolymer obtained in Run 2 of Table 7.

In a 10-mL glass tube placed in a glove box, a toluene solution (1.0 mL) of [Ph₃C][B(C₆F₅)₄] (18.4 mg, 20 μmol) was slowly added to a toluene solution (1.0 mL) of (C₅Me₄SiMe₃)Sc(CH₂C₆H₄NMe₂-$o$)₂ (Sc-5, 10.2 mg, 20 μmol) under stirring with a magnetic stirrer. The α-olefin 1v (0.30 g, 2.0 mmol in 50 mL of toluene) was charged into a three-necked flask. The flask was taken out, set in a water bath (25° C.), and then connected to a thoroughly-purged propylene Schlenk line and a mercury-sealed stopper using a three-way stopcock. Propylene was introduced to the system, and the solution was stirred for 1 minute to be saturated with propylene. While vigorously stirring this solution, the above-prepared catalyst solution was added thereto using a sealed syringe. Once the viscosity of this reaction solution was increased (5 minutes), polymerization reaction was quenched with an addition of methanol (50 mL). The resulting polymer was recovered by filtration, washed with methanol, and then dried for 24 hours at 60° C. under reduced pressure, whereby a colorless solid was obtained (400 mg). The results of measuring the physical properties of the thus obtained polymer are shown in Table 7 and FIGS. 20 to 22.

Polymerization reactions were performed in the same manner as in the above-described copolymerization of the α-olefin 1v and propylene, except that the complex, the ratio of the monomer and the catalyst, the reaction temperature and the like were changed as shown in Table 7. The results of measuring the physical properties of the thus obtained polymers are shown in Table 7.

TABLE 7

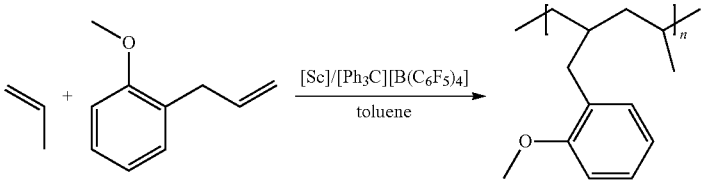

| Run[a] | [M] | Temp (° C.) | Pressure (atm) | [O]/[M] | Yield (mg)[b] | Time | $M_n$ (×10³ g/mol)[c] | $M_W/M_n$[c] | Incorporation ([O]/[Pr]·mol %)[d] | $T_g^e$ (° C.) |
|---|---|---|---|---|---|---|---|---|---|---|
| 1 | Sc-6 | 25 | 1 | 25:1 | 70 | 24 h | 2.4 | 1.24 | 40/60 | 23 |
| 2 | Sc-5 | 25 | 1 | 100:1 | 400 | 24 h | 11.4 | 1.68 | 50/50 | 27 |
| 3 | Sc-5 | 25 | 5 | 100:1 | 1.60 g | 24 h | 4.7 | 2.85 | 6/94 | −20 |
| 4 | Sc-5 | 0 | 5 | 50:1 | 757 | 24 h | 7.8 | 2.48 | 10.5/89.5 | −17.22 |
| 5 | Sc-5 | 0 | 5 | 100:1 | 1.20 g | 24 h | 12.3 | 1.95 | 14/86 | −15.23 |

TABLE 7-continued

[reaction scheme: allyl + 2-methoxy-allylbenzene → copolymer, catalyzed by [Sc]/[Ph₃C][B(C₆F₅)₄] in toluene]

| Run[a] | [M] | Temp (°C.) | Pressure (atm) | [O]/[M] | Yield (mg)[b] | Time | $M_n$ (× 10³ g/mol)[c] | $M_w/M_n$[c] | Incorporation ([O]/[Pr] · mol %)[d] | $T_g$[e] (°C.) |
|---|---|---|---|---|---|---|---|---|---|---|
| 6 | Sc-5 | 0 | 5 | 150:1 | 1.06 g | 24 h | 15.7 | 1.72 | 32/68 | −14.24 |
| 7 | Sc-5 | 0 | 5 | 200:1 | 1.22 g | 24 h | 18.3 | 1.67 | 42/58 | 24 |

[a]Conditions: [M] (0.03 mmol), [B]:[Ph₃C][B(C₆F₅)₄] (0.03 mmol), 50 mL toluene, 24 h.
[b]Yield of final polymer.
[c]Determined by GPC in THF at 40° C. against polystyrene standard.
[d]Incorporation ratio of O-monomer 1v [O] and propylene [Pr], determined by ¹H NMR analysis.
[e]Determined by differential scanning calorimetry.
[f][M] = [B] = 0.04 mmol.
[g][M] = [B] = 0.02 mmol.

As described above, copolymers of the polar olefin 1v and propylene were obtained by the production method of the present invention.

[Example 7] Production of Nonpolar Olefin and Polar Olefin Copolymers

<Copolymerization of α-Olefin 1v and 1-Hexene (Table 8, Run 1)>

Figure 23:
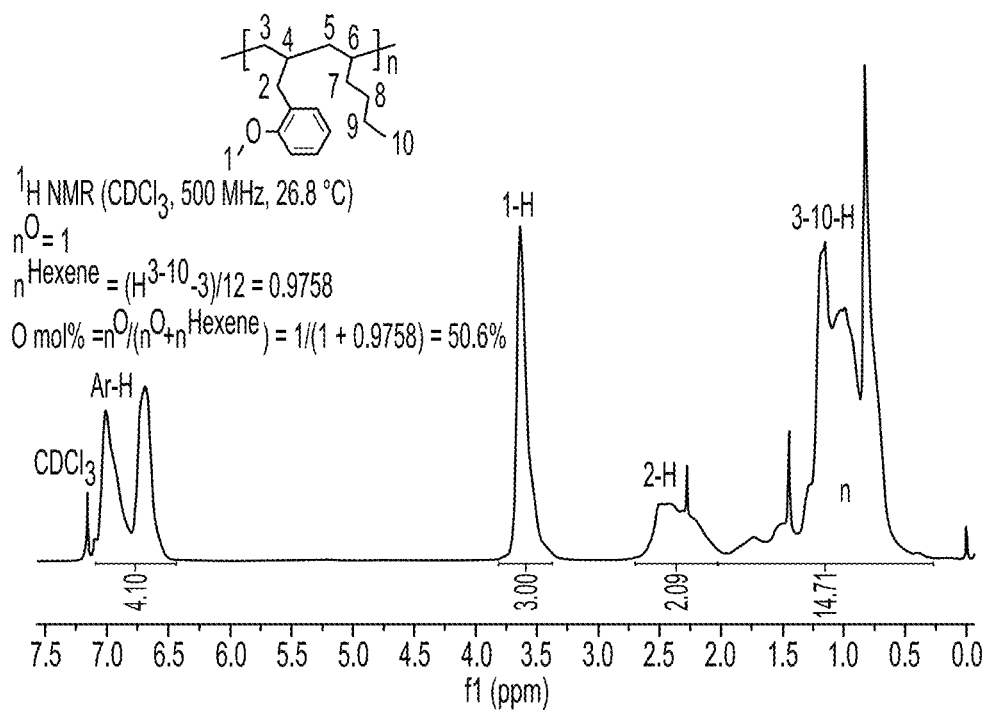
FIG. 23 shows the $^1$H NMR spectrum of a copolymer obtained in Run 1 of Table 8.
Figure 24:
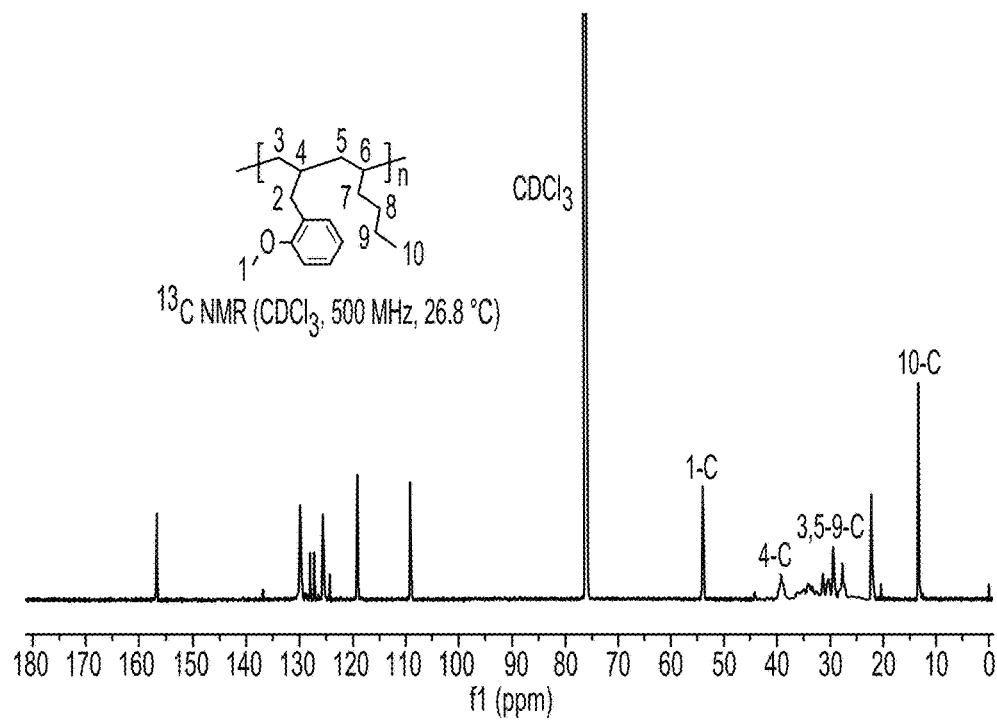
FIG. 24 shows the $^{13}$C NMR spectrum of the copolymer obtained in Run 1 of Table 8.
Figure 25:
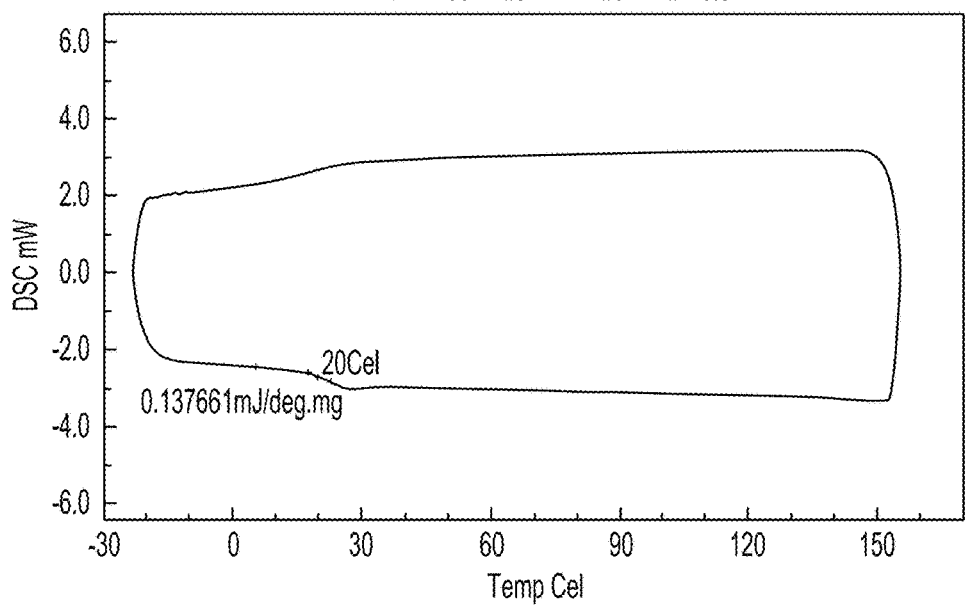
FIG. 25 shows the DSC curve of the copolymer obtained in Run 1 of Table 8.

In a 10-mL glass tube placed in a glove box, a toluene solution (1.0 mL) of [Ph₃C][B(C₆F₅)₄] (18.4 mg, 20 μmol) was slowly added to a toluene solution (1.0 mL) of (C₅Me₄SiMe₃)Sc(CH₂C₆H₄NMe₂-o)₂ (Sc-5, 10.2 mg, 20 μmol) under stirring with a magnetic stirrer. After 5 minutes, in 2 mL of toluene, a mixed solution of 1-hexene (210 mg, 2.5 mmol) and the α-olefin 1v (74 mg, 0.5 mmol) was promptly added to the thus obtained catalyst solution. Once the viscosity of the resulting reaction solution was increased (3 days), polymerization reaction was quenched with an addition of methanol (50 mL). A polymer product was recovered by filtration, washed with methanol, and then dried for 24 hours at 60° C. under reduced pressure, whereby a white powder was obtained (205 mg). The results of measuring the physical properties of the thus obtained polymer are shown in Table 8 and FIGS. 23 to 25.

Polymerization reactions were performed in the same manner as in the above-described copolymerization of the α-olefin 1v and 1-hexene, except that the ratio of the monomer, the reaction time and the like were changed as shown in Table 8. The results of measuring the physical properties of the thus obtained polymers are shown in Table 8.

TABLE 8

[reaction scheme: 1-hexene + 2-methoxy-allylbenzene → copolymer, catalyzed by [Sc-5]/[Ph₃C][B(C₆F₅)₄] in toluene]

| Run[a] | [O]/[1-He]/[M] | Time | Yield (mg)[b] | $M_n$ (× 10³ g/mol)[c] | $M_w/M_n$[c] | Incorporation ([O]/[He] · mol %)[d] | $T_g$[e] |
|---|---|---|---|---|---|---|---|
| 1[f] | 25:125 | 3 day | 205 | 6.265 | 1.477 | 50/50 | 20 |
| 2 | 50:250:1 | 3 day | 188 | 8.877 | 1.508 | 60/40 | 23 |
| 3 | 100:500:1 | 3 day | 333 | 13.414 | 1.586 | 63/37 | 27 |
| 4 | 200:1000:1 | 4 day | 271 | 22.511 | 1.634 | 66/34 | 33 |
| 5 | 500:2500:1 | 4 day | 552 | 33.037 | 1.658 | 68/32 | 37 |

[a]Conditions: [M] (0.02 mmol), [Ph₃C][B(C₆F₅)₄] (0.02 mmol), 5 mL toluene,
[b]Yield of final polymer.
[c]Determined by GPC in THF at 40° C. against polystyrene standard.
[d]Incorporation ratio of O-monomer 1v [O] and 1-hexene [He], determined by ¹H NMR analysis.
[e]Determined by differential scanning calorimety.
[f][M] (0.04 mmol), [Ph₃C][B(C₆F₅)₄] (0.04 mmol).

As described above, copolymers of the polar olefin 1v and 1-hexene were obtained by the production method of the present invention.

[Example 8] Production of Nonpolar Olefin and Polar Olefin Copolymers

<Copolymerization of α-Olefin 1v and Isoprene (Table 9, Run 3)>

In a 10-mL glass tube placed in a glove box, a toluene solution (1.0 mL) of [Ph$_3$C][B(C$_6$F$_5$)$_4$] (18.4 mg, 20 μmol) was slowly added to a toluene solution (1.0 mL) of (C$_5$H$_5$)Sc(CH$_2$SiMe$_3$)$_2$THF (Sc-7, 8 mg, 20 μmol) under stirring with a magnetic stirrer. After 5 minutes, in 2 mL of toluene, a mixed solution of isoprene (136 mg, 2.0 mmol) and the α-olefin 1v (296 mg, 2.0 mmol) was promptly added to the thus obtained catalyst solution. Once the viscosity of the resulting reaction solution was increased (12 hours), polymerization reaction was quenched with an addition of methanol (50 mL). A polymer product was recovered by filtration, washed with methanol, and then dried for 24 hours at 60° C. under reduced pressure, whereby a white rubber-like substance was obtained (400 mg). The results of measuring the physical properties of the thus obtained polymer are shown in Table 9.

Figure 26:
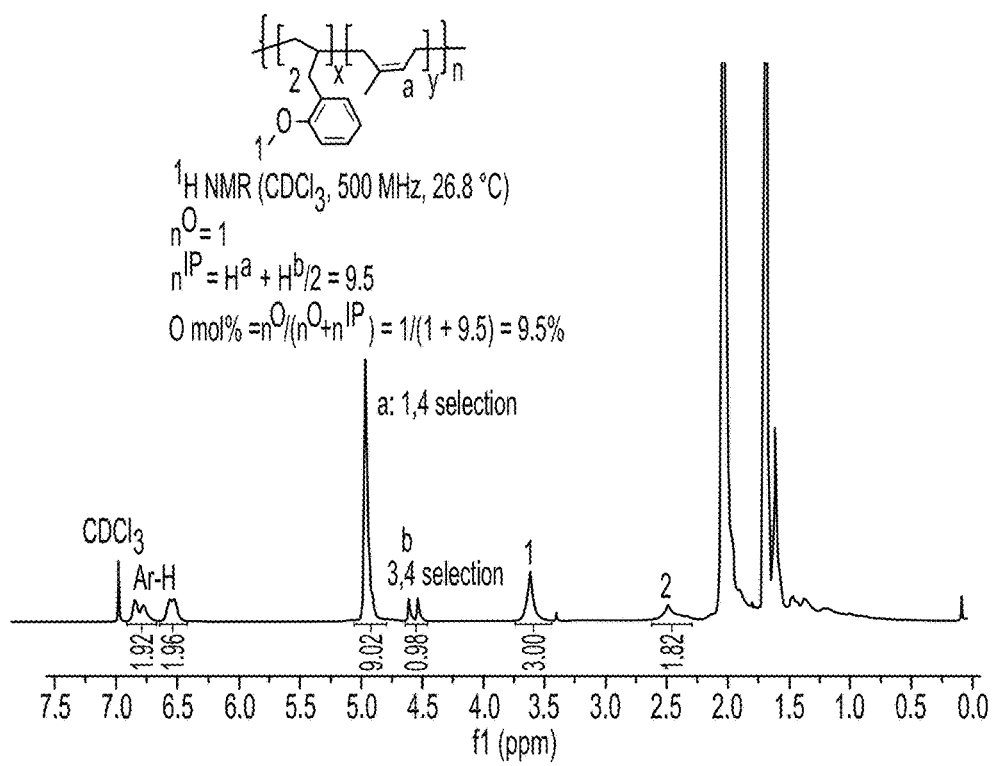
FIG. 26 shows the $^1$H NMR spectrum of a copolymer obtained in Run 5 of Table 9.
Figure 27:
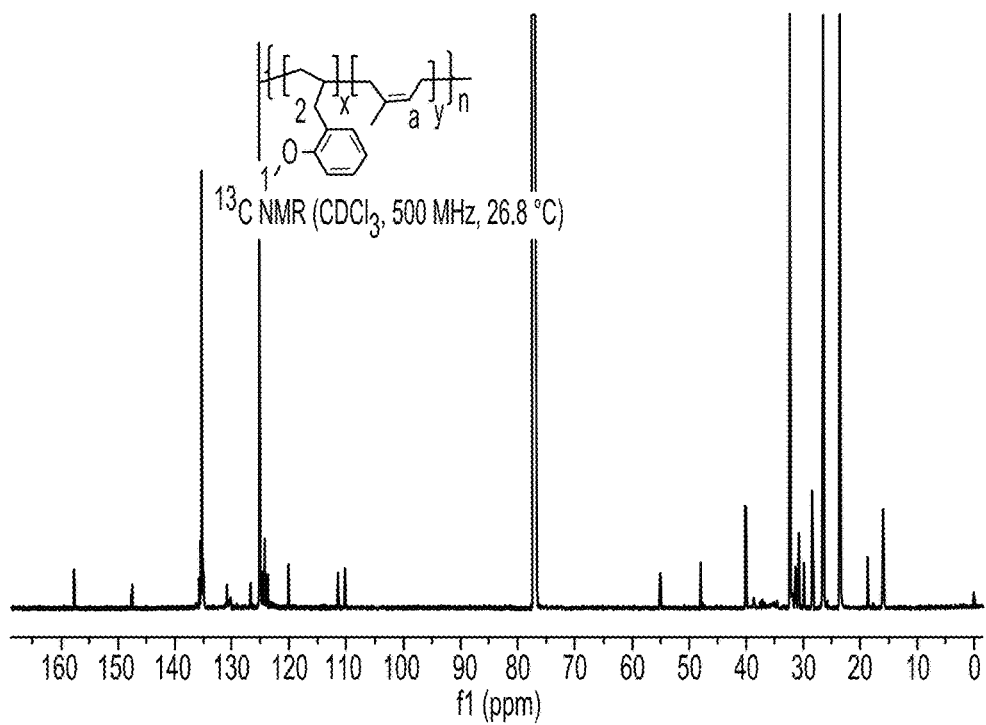
FIG. 27 shows the $^{13}$C NMR spectrum of the copolymer obtained in Run 5 of Table 9.
Figure 28:
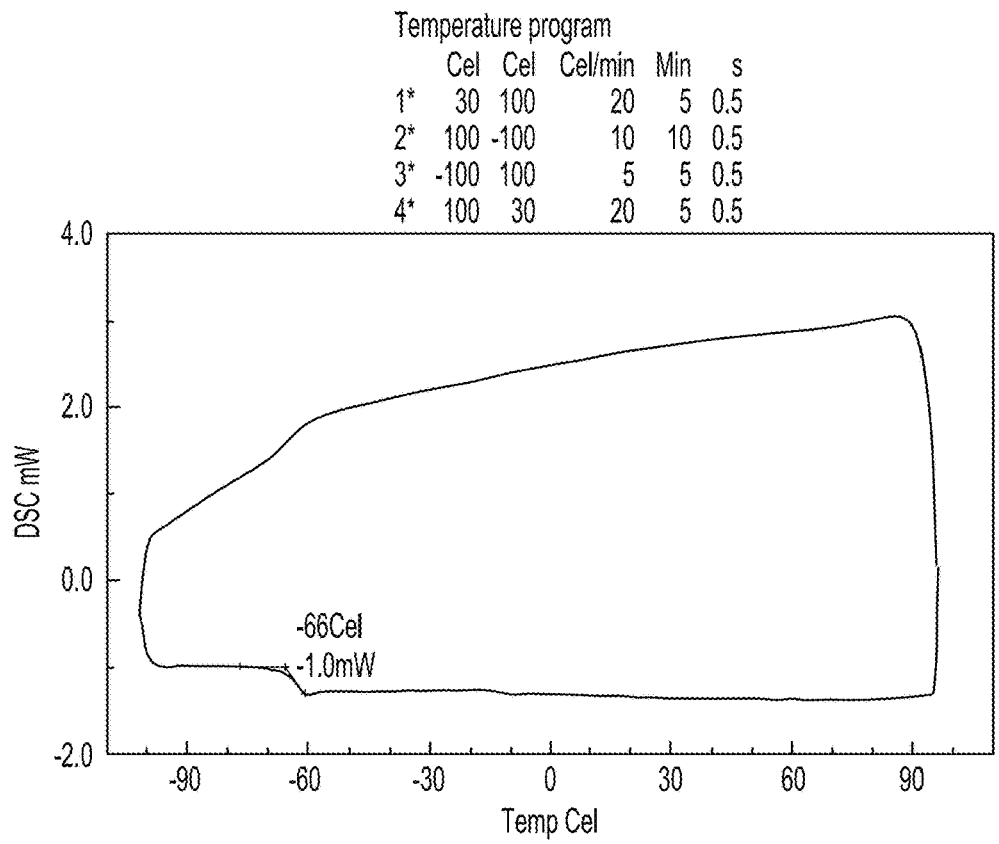
FIG. 28 shows the DSC curve of the copolymer obtained in Run 5 of Table 9.

Polymerization reactions were performed in the same manner as in the above-described copolymerization of the α-olefin 1v and isoprene, except that the ratio of the monomer and the like were changed as shown in Table 9. The results of measuring the physical properties of the thus obtained polymers are shown in Table 9 and FIGS. 26 to 28.

solution (100 mL) of an isotactic 2-allylanisole polymer (0.444 g, 3 mmol), and the resultant was stirred for 1 hour. The thus obtained reaction solution was heated to room temperature and further stirred for 24 hours. The resulting purple solution was cooled to −20° C., and 30 mL of deionized water was added thereto. After the subsequent release of fume, the resulting mixture was slowly heated to room temperature. The thus formed 2-allyphenol polymer was soluble in neither dichloromethane nor water and precipitated out of the reaction solution. The resulting precipitate was recovered by filtration and subsequently washed with water and dichloromethane, after which the thus obtained white powder was dried under reduced pressure (0.40 g, 98%).

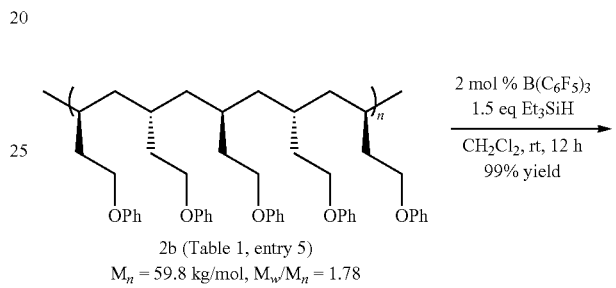

2b (Table 1, entry 5)
$M_n = 59.8$ kg/mol, $M_w/M_n = 1.78$ 2 mol % B(C$_6$F$_5$)$_3$
1.5 eq Et$_3$SiH
CH$_2$Cl$_2$, rt, 12 h
99% yield

TABLE 9

| Run[a] | [O]/[1P]/[M] | Yield (mg)[b] | $M_w/M_n$[c] (× 10$^3$ g/mol) | $M_w/M_n$[c] | Incorporation ([O]/[1P] · mol %)[d] | 1P C is 1, 4 content (%)[e] | $T_g$[f] |
|---|---|---|---|---|---|---|---|
| 1 | 100:25:1 | 326 | 15.7 | 1.53 | 85.6/14.5 | — | 44 |
| 7 | 100:50:1 | 355 | 11.8 | 1.66 | 70/30 | — | 29 |
| 3 | 100:100:1 | 400 | 12.1 | 1.69 | 61/39 | — | 26 |
| 4 | 100:200:1 | 483 | 7.9 | 1.97 | 43/57 | — | 9 |
| 5 | 100:1000:1 | 1710 | 116.7 | 1.58 | 9.3/90.7 | >90% | −65 |
| 6[f] | 100:2000:1 | 1500 | 252.2 | 1.51 | 5/95 | >90% | −66 |

[a]Conditions: [M] (0.02 mmol),
[b]Yield of final polymer.
[c]Determined by GPC in THF at 40° C. against polystyrene standard.
[d]Incorporation ratio of O-monomer 1v [O] and isoprene [IP], determined by $^1$H NMR analysis.
[e]microstructures of polyisoprene, determined by $^{13}$C NMR analysis.
[f]Determined by differential scanning calorimetry.
[f][M] = [B] = 0.01 mmol.

As described above, copolymers of the polar olefin 1v and isoprene were obtained by the production method of the present invention.

[Reference Example 1] Production of Allylphenol Polymer

In a 250-mL round-bottomed flask under a nitrogen atmosphere at −20° C., boron tribromide (2.60 g, 1 mL, 10.4 mmol) was slowly added dropwise to a dichloromethane -continued

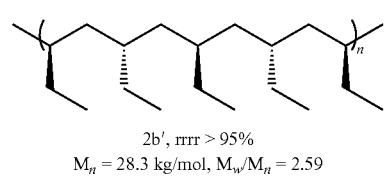

2b', rrrr > 95%
$M_n = 28.3$ kg/mol, $M_w/M_n = 2.59$

As described above, an allylphenol polymer was derived from the allylanisole polymer obtained by the production method of the present invention.

[Example 9] Production of Nonpolar Olefin and Polar Olefin Copolymers

<Copolymerization of α-Olefin 1w and Ethylene (Table 10, Run 1)>

Figure 29:
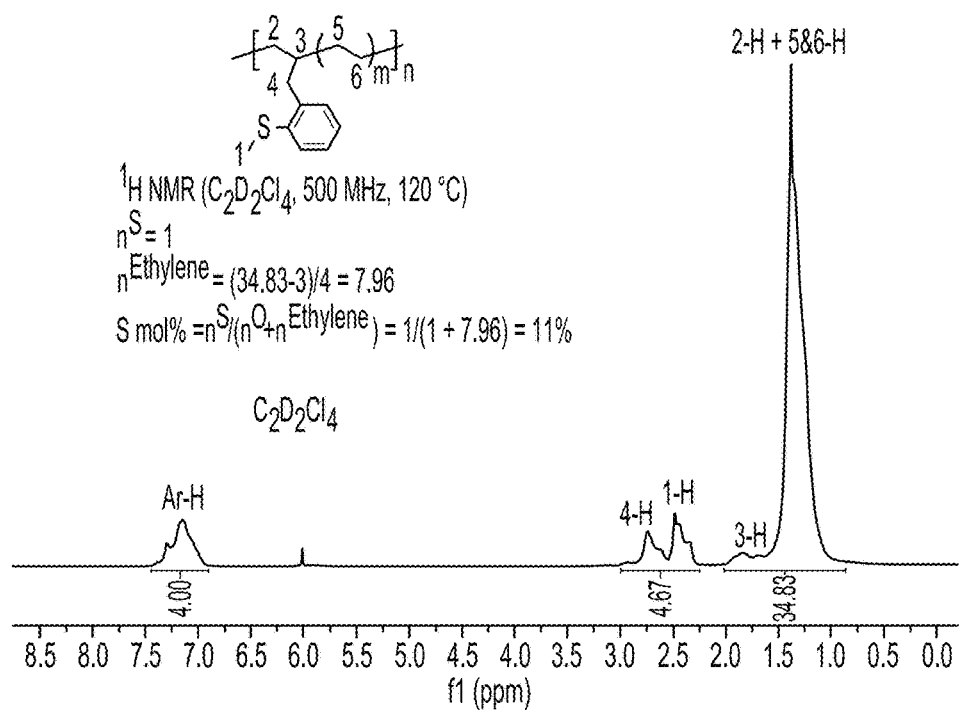
FIG. 29 shows the $^1$H NMR spectrum of a copolymer obtained in Run 1 of Table 10.
Figure 30:
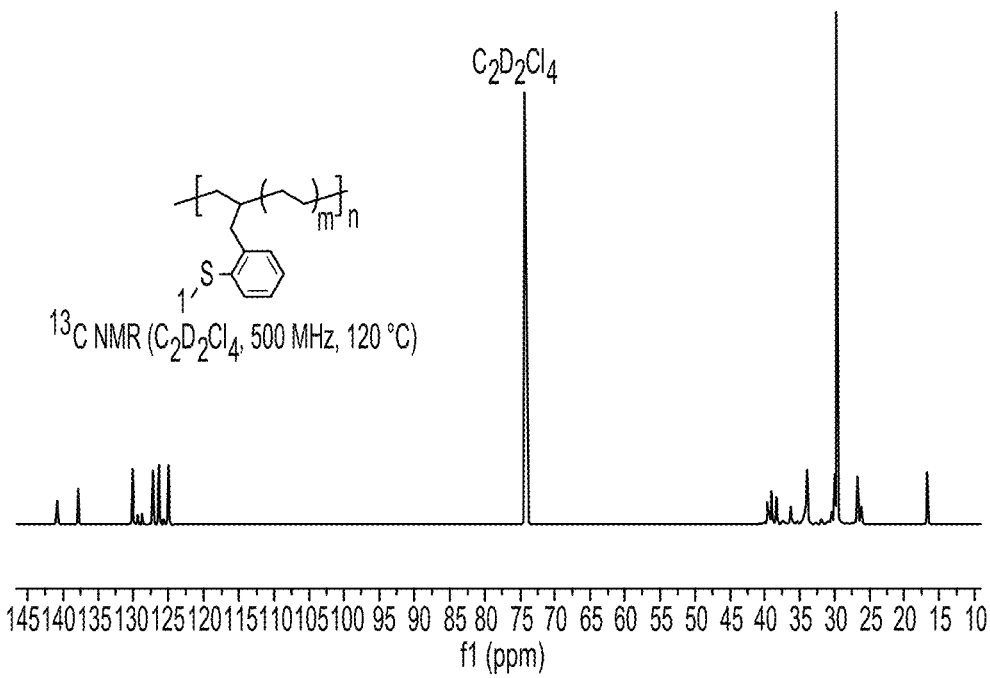
FIG. 30 shows the $^{13}$C NMR spectrum of the copolymer obtained in Run 1 of Table 10.

In a 10-mL glass tube placed in a glove box, a toluene solution (1.0 mL) of [Ph$_3$C][B(C$_6$F$_5$)$_4$] (18.4 mg, 20 μmol) was slowly added to a toluene solution (1.0 mL) of (C$_5$Me$_4$SiMe$_3$)Sc(CH$_2$C$_6$H$_4$NMe$_{2-o}$)$_2$ (Sc-5, 10.2 mg, 20 μmol) under stirring with a magnetic stirrer. An α-olefin 1w (0.328 g, 2.0 mmol in 50 mL of toluene) was charged into a three-necked flask. The flask was taken out, set in a water bath (25° C.), and then connected to a thoroughly-purged ethylene Schlenk line and a mercury-sealed stopper using a three-way stopcock. Ethylene was introduced to the system, and the solution was stirred for 1 minute to be saturated with ethylene. While vigorously stirring this solution, the above-prepared catalyst solution was added thereto using a sealed syringe. Once the viscosity of this reaction solution was increased (20 minutes), polymerization reaction was quenched with an addition of methanol (50 mL). The resulting polymer was recovered by filtration, washed with methanol, and then dried for 24 hours at 60° C. under reduced pressure, whereby a colorless rubber-like substance was obtained (0.155 g). The results of measuring the physical properties of the thus obtained polymer are shown in Table 10 and FIGS. 29 and 30.

Polymerization reactions were performed in the same manner as in the above-described copolymerization of the α-olefin 1w and ethylene, except that the ratio of the monomer and the catalyst and the like were changed as shown in Table 10. The results of measuring the physical properties of the thus obtained polymers are shown in Table 10.

TABLE 10

| Run$^a$ | [S]/[M] | Yield (mg)$^b$ | Temp | Activity (kg · mol$^{-1}$ · h$^{-1}$) | M$_n$ (× 10$^3$ g/mol)$^c$ | M$_w$/M$_n$$^c$ | Incorporation ([S]/[Et] · mol %)$^d$ | T$_g^e$ (° C.) | T$_m^e$ (° C.) |
|---|---|---|---|---|---|---|---|---|---|
| 1 | 50:1 | 155 | 20 min | 23 | 14.819 | 1.24 | 11/89 | −10 | 127/130 |
| 2 | 100:1 | 295 | 20 min | 44 | 11.556 | 1.734 | 34/66 | −2 | 132 |

$^a$Conditions: Sc-5 (0.02 mmol), [Ph$_3$C][B(C$_6$F$_5$)$_4$] (0.02 mmol), ethylene (1 atm), 50 mL toluene, 20° C.
$^b$Yield of final copolymer.
$^c$Determined by GPC in o-DCB at 140° C. against polystyrene standard.
$^d$Incorporation ratio of S-monomer 1w [S] and ethylene [Et], determined by $^1$H NMR analysis.
$^e$Determined by differential scanning calorimetry.

As described above, copolymers of the polar olefin 1w and ethylene were obtained by the production method of the present invention.

[Example 10] Production of Nonpolar Olefin and Polar Olefin Copolymer <Copolymerization of α-Olefin 1x and Styrene (Table 11)>

Figure 31:
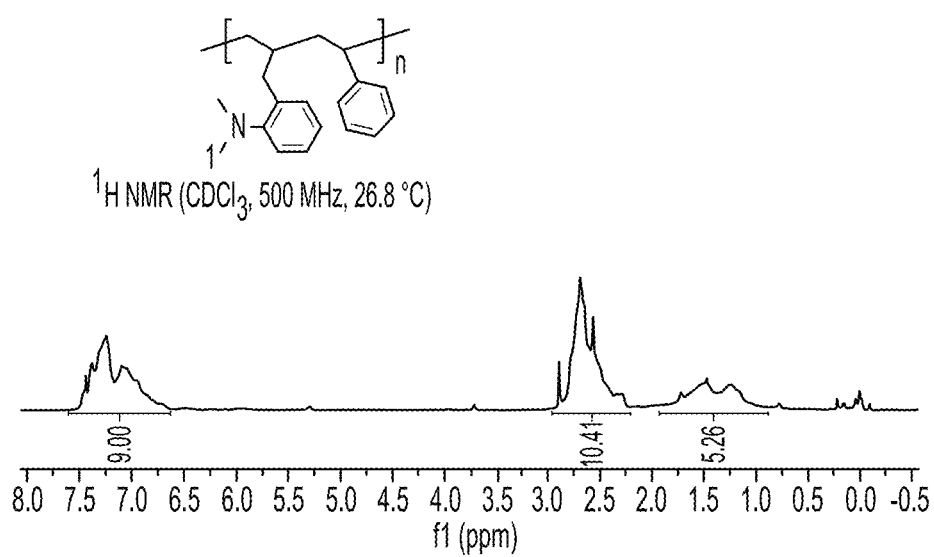
FIG. 31 shows the $^1$H NMR spectrum of a copolymer obtained in Run 1 of Table 11.
Figure 32:
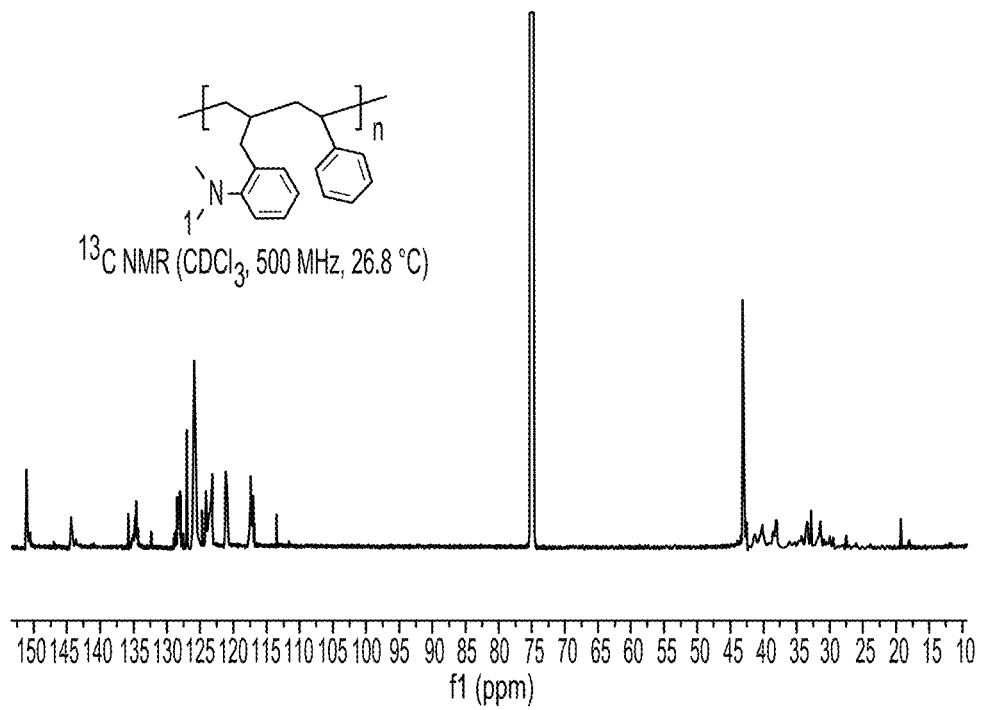
FIG. 32 shows the $^{13}$C NMR spectrum of the copolymer obtained in Run 1 of Table 11.

In a 10-mL glass tube placed in a glove box, a toluene solution (1.0 mL) of [Ph$_3$C][B(C$_6$F$_5$)$_4$] (18.4 mg, 20 μmol) was slowly added to a toluene solution (4.0 mL) of (C$_5$Me$_4$SiMe$_3$)Sc(CH$_2$C$_6$H$_4$NMe$_{2-o}$)$_2$ (Sc-5, 10 mg, 20 μmol) under stirring with a magnetic stirrer. After 5 minutes, in 5 mL of toluene, a mixed solution of styrene (104 mg, 1 mmol) and an α-olefin 1x (161 mg, 1 mmol) was promptly added to the thus obtained catalyst solution. Once the viscosity of this reaction solution was increased (36 hours), polymerization reaction was quenched with an addition of methanol (20 mL). A polymer product was recovered by filtration, washed with methanol, and then dried for 24 hours at 60° C. under reduced pressure, whereby a white powder was obtained (73 mg). The results of measuring the physical properties of the thus obtained polymer are shown in Table 11 and FIGS. 31 and 32.

TABLE 11

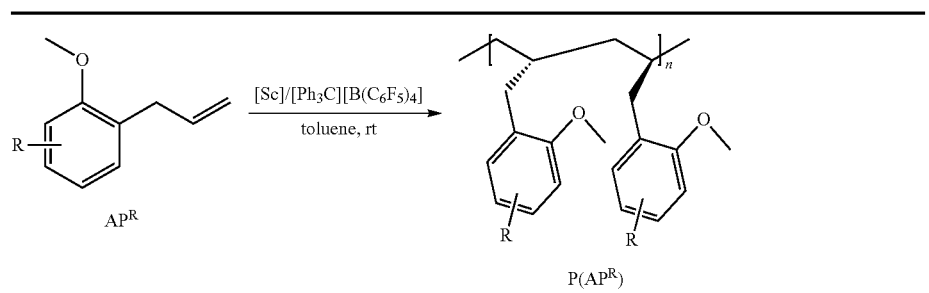

| Run[a] | [N]/[St]/[M] | Yield (mg)[b] | Temp (° C.) | Time | $M_n$ (× $10^3$ g/mol)[c] | $M_w/M_n$[c] | Incorporation ([N]/[Et] · mol %)[d] |
|---|---|---|---|---|---|---|---|
| 1 | 50:50:1 | 73 | 20 | 36 h | 4.58 | 1.39 | 50/50 |

[a] Conditions: [M] (0.02 mmol), [Ph$_3$C][B(C$_6$F$_5$)$_4$] (0.02 mmol), N,N-dimethyl-2-allylaniline, styrene toluene, rt.
[b] Weight of final polymer.
[c] Determined by GPC in THF at 40° C. against polystyrene standard.
[d] Incorporation ratio of N-monomer 1x [N] and styrene [St], determined by $^1$H NMR analysis.
[e] Determined by differential scanning calorimetry.

As described above, a copolymer of the polar olefin 1x and styrene was obtained by the production method of the present invention.

[Example 11] Production of Nonpolar Olefin Polymers

<Polymerization of α-Olefin AP (1v) and AP$^R$ (Table 12)>

Figure 34:
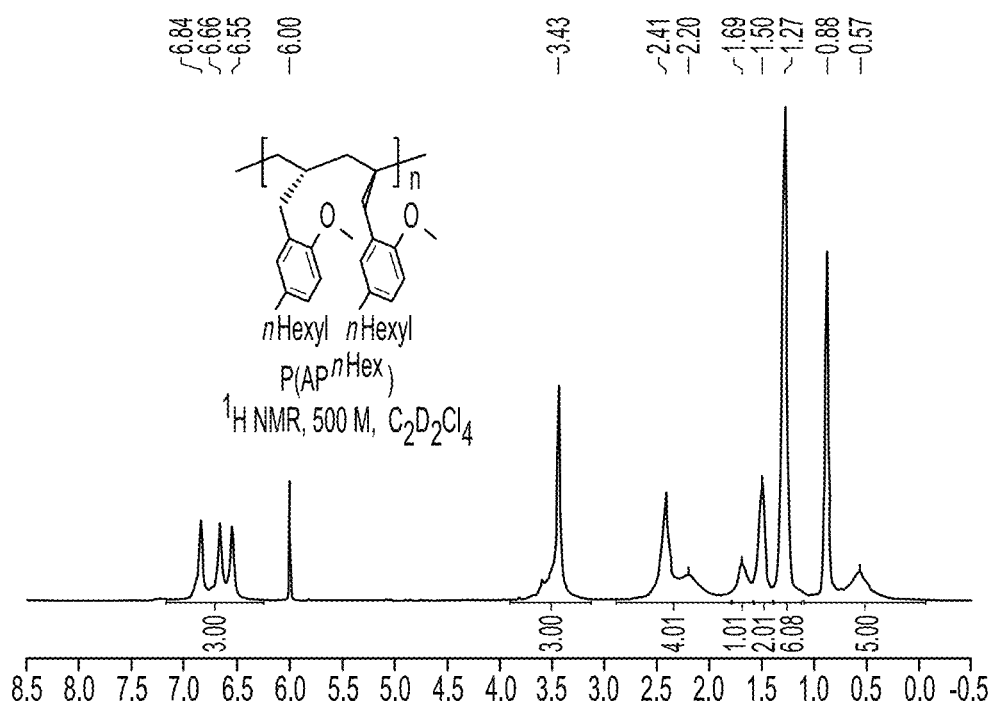
FIG. 34 shows the $^1$H NMR spectrum of a polymer obtained in Run 3 of Table 12.
Figure 35:
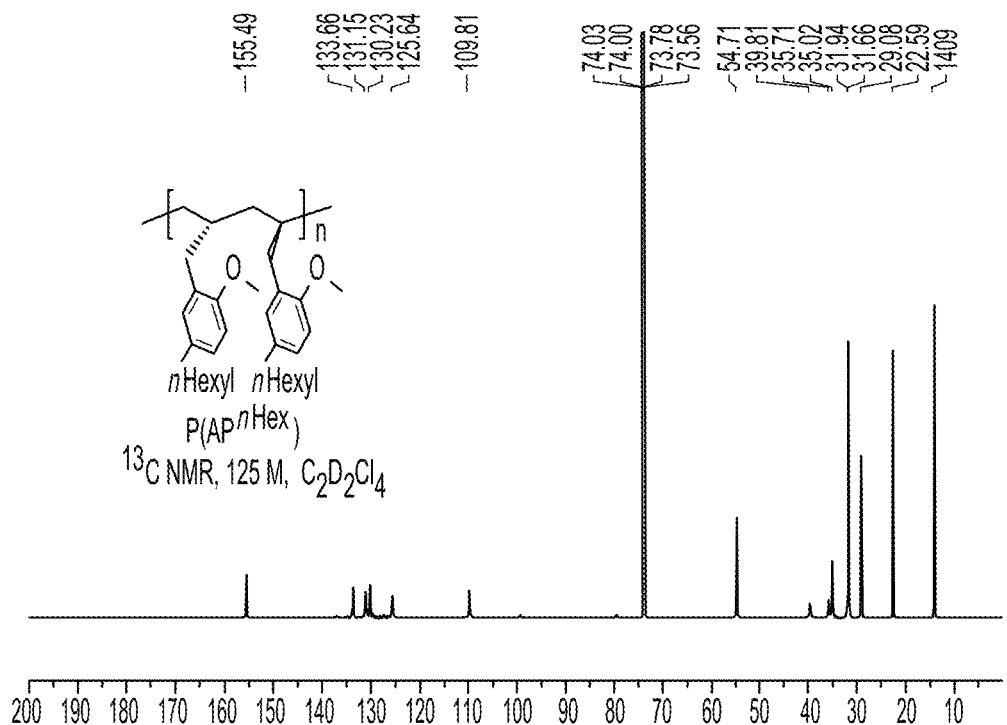
FIG. 35 shows the $^{13}$C NMR spectrum of the polymer obtained in Run 3 of Table 12.
Figure 36:
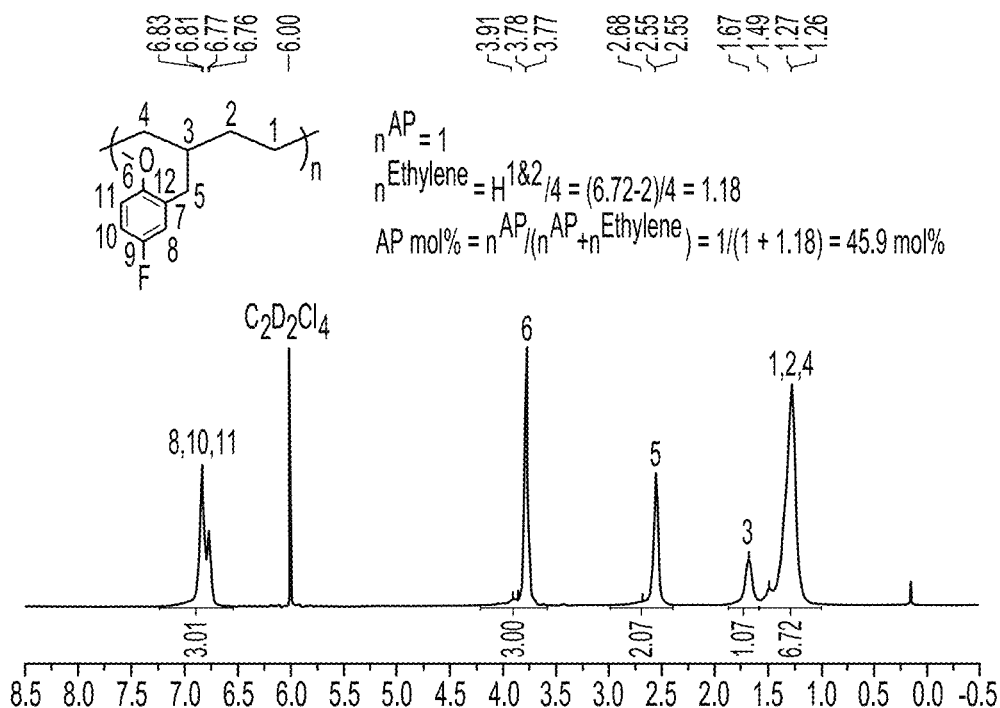
FIG. 36 shows analysis values and $^1$H NMR spectrum of a copolymer obtained in Run 7 of Table 14.
Figure 37:
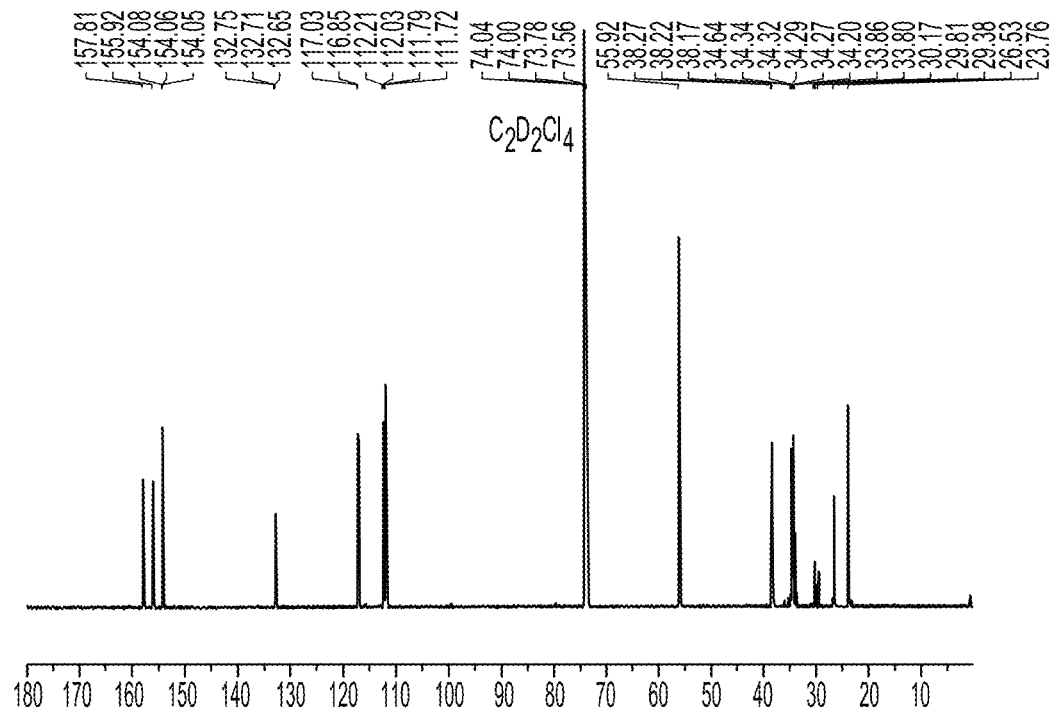
FIG. 37 shows the $^{13}$C NMR spectrum of the copolymer obtained in Run 7 of Table 14.
Figure 38:
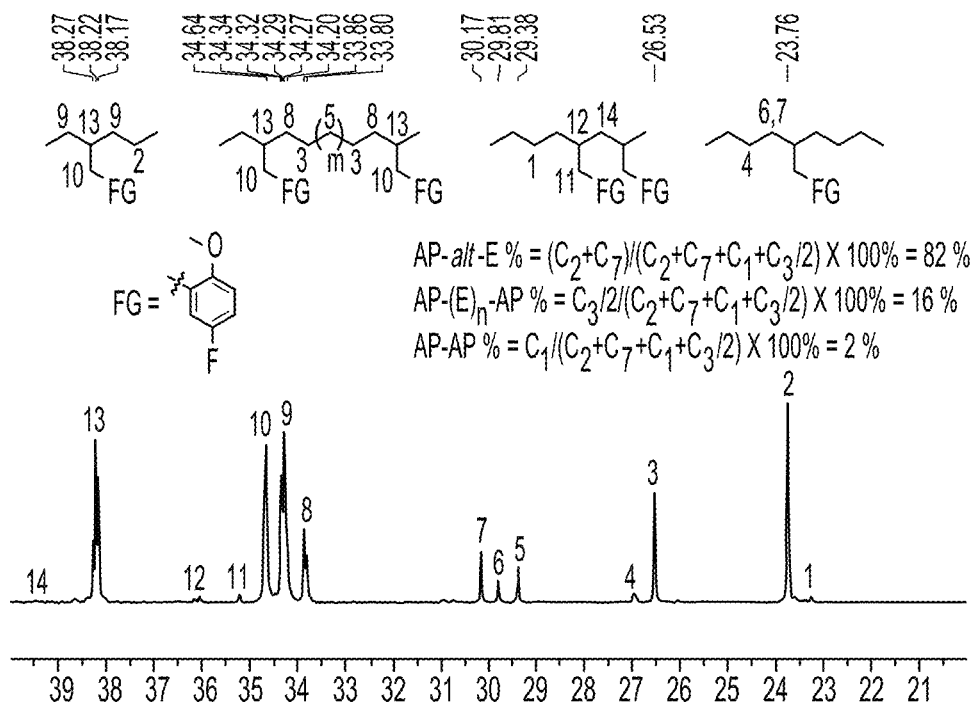
FIG. 38 shows analysis values and a partial enlarged view of the $^{13}$C NMR spectrum of the copolymer obtained in Run 7 of Table 14.
Figure 39:
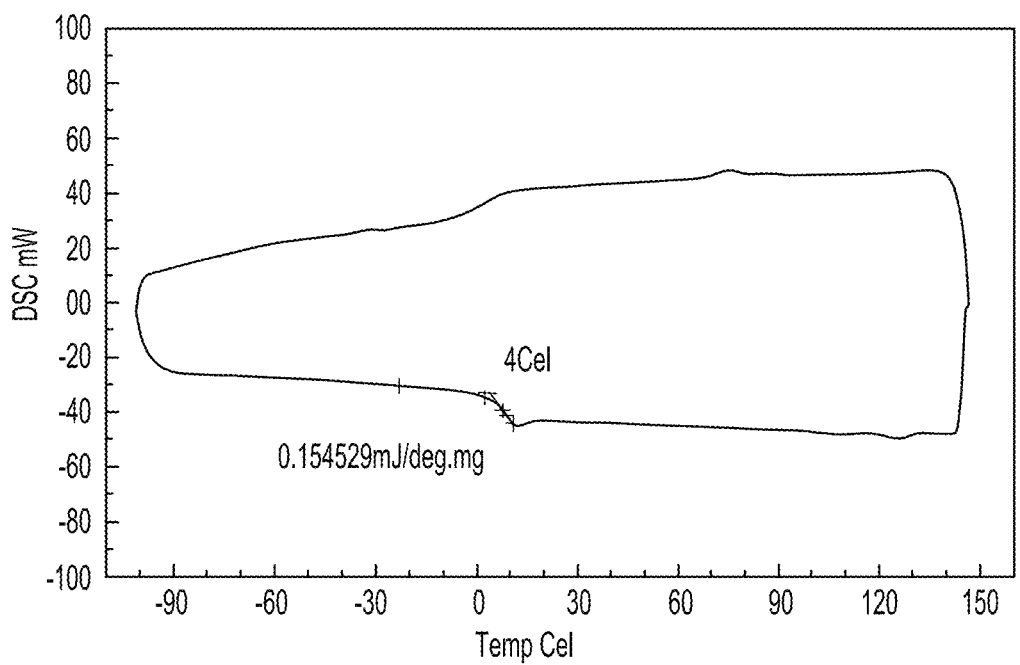
FIG. 39 shows the DSC curve of the copolymer obtained in Run 7 of Table 14.

Polymerization reactions were performed in the same manner as in Example 3, except that the monomer, the complex, the ratio of the monomer and the catalyst, the reaction time and the like were changed as shown in Table 12. The results of measuring the physical properties of the thus obtained polymers are shown in Table 12 and FIGS. 34 and 35.

An AP polymer product and AP$^R$ polymer products were obtained using the Sc-1 complex. When the [O]/[M] ratio was increased from 100/1 to 1,000/1 and the reaction time was extended, the resulting polymers had an increased the number-average molecular weight (Mn). These polymers were highly syndiotactic homopolymers (>95 rrrr %).

TABLE 12

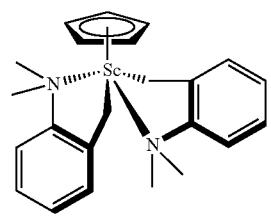

[Sc] =

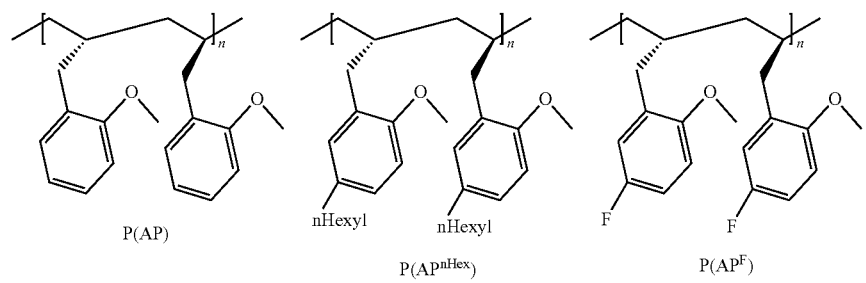

TABLE 12-continued

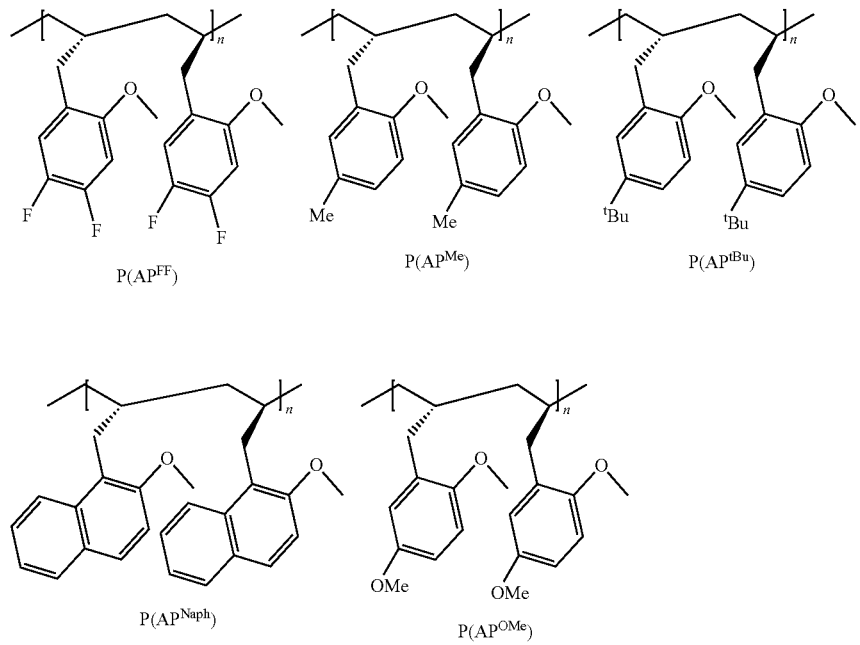

| Run[a] | [O] | [O]:[M] | Time (h) | Conv. (%) | $M_n{}^b$ (× 10³)[c] | $M_w/M_n{}^b$ | $T_g{}^c$ (° C.) | $T_m{}^c$ (° C.) | rrrr[d] |
|---|---|---|---|---|---|---|---|---|---|
| 1 | AP | 100:1 | 0.2 | 100 | 13.7 | 1.6 | 63 | 152 | >95 |
| 2 |  | 1000:1[e] | 1 | 98 | 25.1 | 1.8 | 64 | 155 | >95 |
| 3 | AP$^{nHex}$ | 100:1 | 0.67 | 92 | 17.0 | 1.5 | −16 | — | >95 |
| 4 |  | 1000:1[e] | 6 | 93 | 34.9 | 2.2 | −15 | — | >95 |
| 5 | AP$^F$ | 100:1 | 3 | 96 | 10.6 | 1.8 | 54 | 197 | >95 |
| 6 |  | 1000:1[e] | 12 | 94 | 19.1 | 2.0 | 59 | 200 | >95 |
| 7 | AP$^{FF}$ | 100:1 | 24 | 77 | 7.2 | 1.9 | 60 | 240 | >95 |
| 8 | AP$^{Naph}$ | 100:1 | 24 | 68 | 3.7 | 1.5 | 108 | — | >95 |
| 9 |  | 1000:1[e] | 36 | 10 | 4.4 | 1.5 | 108 | — | >95 |
| 10 | AP$^{Me}$ | 100:1 | 1.5 | 100 | 17.4 | 1.5 | 51 | — | >95 |
| 11 |  | 1000:1[e] | 5 | 84 | 32.8 | 1.9 | 64 | — | >95 |
| 12 | AP$^{tBu}$ | 100:1 | 1.5 | 99 | 15.9 | 1.4 | 71 | — | >95 |
| 13 |  | 1000:1[e] | 5 | 83 | 28.4 | 1.9 | 68 | — | >95 |
| 14 | AP$^{OMe}$ | 100:1 | 24 | 35 | 6.6 | 1.5 | 42 | — | >95 |

[a]Conditions: [M] (0.02 mmol), [Ph₃C][B(C₆F₅)₄] (B) (0.02 mmol), 3 mL toluene, 20° C., unless otherwise noted.
[b]Determined by GPC in THF at 40° C. against polystyrene standard.
cDetermined by differential scanning calorimetry.
[d]Determined by ¹³C NMR analysis.
[e][M] = [B] = 0.01 mmol, 10 mL toluene.

[Example 12] Production of Nonpolar Olefin and Polar Olefin Copolymers

<Copolymerization of α-Olefin AP (1v) and Ethylene (Table 13)>

Polymerization reactions were performed in the same manner as in Example 4, except that the complex, the ratio of the monomer and the catalyst, the reaction time and the like were changed as shown in Table 13. The results of measuring the physical properties of the thus obtained polymers are shown in Table 13.

No copolymer was obtained using the complex 1 (Sc-1), and highly syndiotactic homopolymers were obtained instead. The reason for this is presumed to be because the use of the catalyst having a sterically small ligand preferentially coordinated the AP monomer on the Sc-1 complex and thereby allowed the polymerization to proceed. When the sterically bulky complex 2 (Sc-5) was used, an ethylene-2-allylanisole (E-AP) copolymer product (P1) was obtained exclusively (Table 13, Run 2). When the [O]/[M] ratio was increased from 200/1 to 500/1, 1,000/1, 2,000/1 and 5,000/1 in E at 1 atm, the number-average molecular weight (Mn) was markedly increased in the resulting copolymers (P1 to P5); however, the AP monomer introduction rate was maintained with a slight increase in these copolymers (Table 13, Runs 2 to 6).

By ¹³C{¹H} NMR analysis, it was indicated that the copolymers (P1 to P5) mainly had an alternating AP-E sequence (67 to 76%) along with small amounts of AP-(E) n-AP sequence (n≥2, 19 to 33%) and E-AP-AP-E sequence (0 to 5%).

Further, the copolymers (P1 to P5) were amorphous and had a glass transition temperature.

TABLE 13

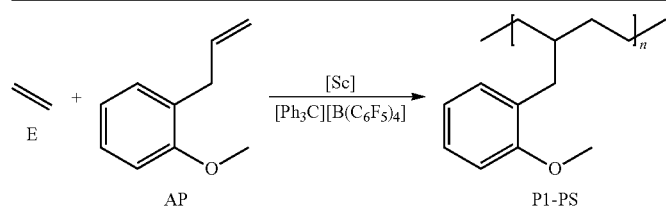

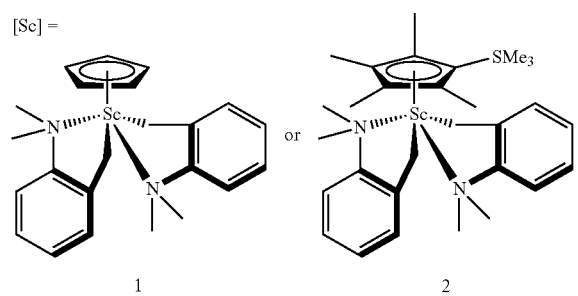

| Run[a] | [M] | [O]/[M][b] | Yield (g)[c] | Time | Activity (g·mol-Sc$^{-1}$·h$^{-1}$·atm$^{-1}$) | $M_n$ (10$^3$ g mol$^{-1}$)[d] | $M_w/M_n$[d] | AP/E[e] | $T_g$[f] |
|---|---|---|---|---|---|---|---|---|---|
| 1[b] | 1 | 200/1 | 0.20 | 10 min | — | 5 | 1.65 | 100/0[h] | 60 |
| 2[g] | 2 | 200/1 | 0.70 | 15 min | 1.4 × 10$^5$ | 41 (P1) | 1.68 | 39/61 | −8 |
| 3 | 2 | 500/1 | 0.91 | 5 min | 1.1 × 10$^6$ | 90 (P2) | 1.58 | 39/61 | −6 |
| 4 | 2 | 1000/1 | 1.61 | 15 min | 6.4 × 10$^5$ | 173 (P3) | 1.94 | 41/59 | 4 |
| 5 | 2 | 2000/1 | 3.05 | 6 h | 5.1 × 10$^4$ | 344 (P4) | 1.70 | 45/55 | 5 |
| 6 | 2 | 5000/1 | 8.35 | 24 h | 3.5 × 10$^4$ | 552 (P5) | 1.98 | 46/54 | 6 |

[a]Conditions: [M] (0.01 mmol), [Ph$_3$C][B(C$_6$F$_5$)$_4$] (B) (0.01 mmol), ethylene (1 atm), 150 mL toluene, 20° C., unless otherwise noted.
[b]Feed ratio (in mole) of AP and a scandium complex.
[c]Gram of the polymer product.
[d]Determined by gel permeation chromatography (GP C) in o-dichlorobenzene at 140° C. against polystyrene standard. $M_n$ = number average molecular weight, $M_W$ = weight average molecular weight.
[e]Molar ratio of AP and E in the copolymer, determined by $^1$H nuclear magnetic resonance (NMR) analysis.
[f]Determined by differential scanning calorimetry (DSC).
[g][M] = [B] = 0.02 mmol, 50 mL toluene.
[h]Syndiotactic homopolymer of AP.

[Example 13] Production of Nonpolar Olefins and Polar Olefin Copolymers

<Copolymerization of α-Olefin AP$^R$ and Ethylene (Table 14)>

Substituted 2-allylanisoles were synthesized in accordance with the methods described in the following documents.
(1) P. Anbarasan, H. Neumann, M. Beller, Chem. Eur. J. 17, 4217-4222 (2011)
(2) H. Jiang, W. Yang, H. Chen, J. Li, W. Wu, Chem. Commun. 50, 7202-7204 (2014)

Polymerization reactions were performed in the same manner as in Example 4, except that the monomer, the complex, the ratio of the monomer and the catalyst, the reaction time and the like were changed as shown in Table 14. The results of measuring the physical properties of the thus obtained polymers are shown in Table 14 and FIGS. 36 to 39.

Using the above-synthesized substituted 2-allylanisoles as monomers, ethylene-substituted 2-allylanisole (E-AP$^R$) copolymer products were obtained. It was confirmed that the yield and the molecular weight were improved by increasing the ratio of the monomer and the complex and extending the reaction time.

By modifying the substituents of the monomers, the glass transition temperature was controlled in a wide range.

TABLE 14

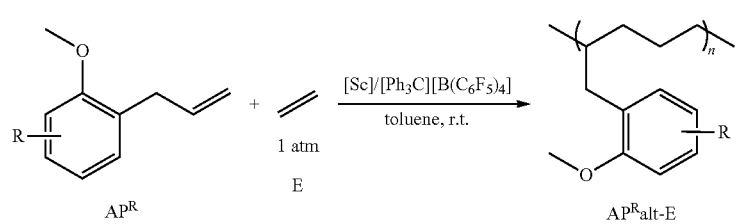

TABLE 14-continued

[Sc] = 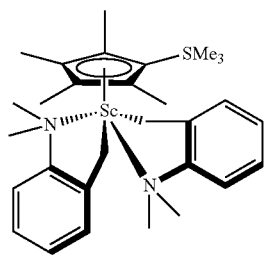

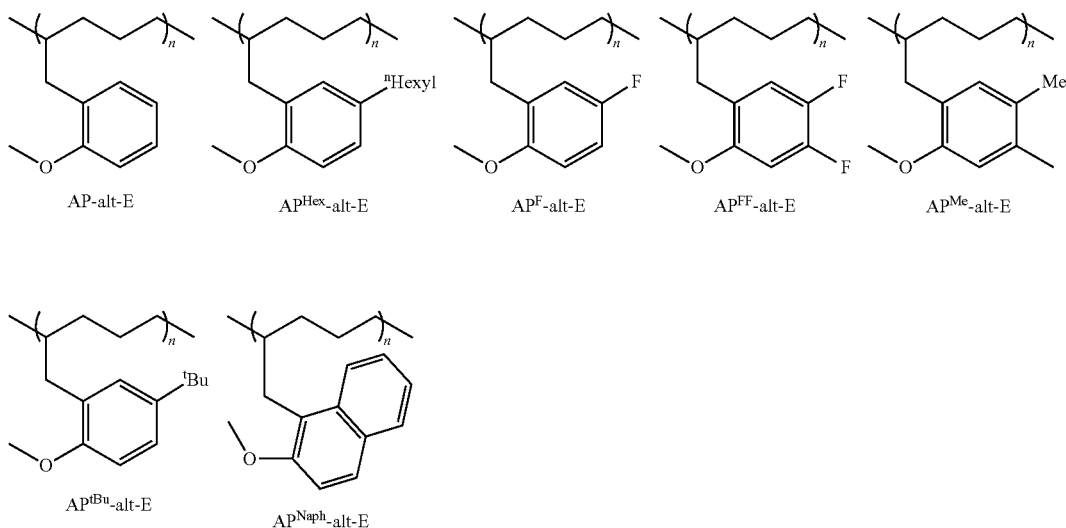

| Run[a] | [O] | [O]:[M][b] | Time (h) | Yield (g)[c] | Activity (kg·mol-Sc$^{-1}$·h$^{-1}$·atm$^{-1}$) | $M_n^d$ (×10$^3$) | $M_w/M_n^d$ | AP$^R$/E[e] | $T_g^f$ (° C.) |
|---|---|---|---|---|---|---|---|---|---|
| 1 | AP | 500:1 | 0.5 | 1.60 | 171 | 106 | 1.9 | 40/60 | −6 |
| 2 |  | 2000:1 | 6 | 3.05 | 51 | 344 | 1.7 | 45/55 | 5 |
| 3 |  | 5000:1 | 24 | 8.35 | 35 | 552 | 2.0 | 46/54 | 6 |
| 4 | AP$^{nHex}$ | 500:1[g] | 2.5 | 2.43 | 49 | 164 | 1.5 | 36/64 | −31 |
| 5 |  | 2000:1 | 20 | 4.33 | 22 | 464 | 1.7 | 42/58 | −28 |
| 6 | AP$^F$ | 500:1[g] | 10 min | 1.38 | 564 | 124 | 1.9 | 42/58 | 5 |
| 7 |  | 5000:1 | 10 | 7.94 | 79 | 446 | 1.8 | 46/54 | 4 |
| 8 | AP$^{FF}$ | 1000:1[g] | 4 | 3.33 | 42 | 125 | 1.8 | 36/64 | 2 |
| 9 |  | 2000:1[h] | 15 | 3.64 | 74 | 338 | 1.8 | 34/66 | 0 |
| 10 | AP$^{Me}$ | 500:1[g] | 1.5 | 1.96 | 65 | 105 | 1.8 | 42/58 | 9 |
| 11 |  | 2000:1 | 9 | 3.35 | 37 | 420 | 1.6 | 38/62 | 11 |
| 12 | AP$^{tBu}$ | 500:1[g] | 4.5 | 1.96 | 22 | 150 | 1.8 | 42/58 | 23 |
| 13 |  | 2000:1 | 48 | 4.11 | 8 | 424 | 1.7 | 40/60 | 21 |
| 14 | AP$^{Naph}$ | 500:1[g] | 2 | 2.00 | 50 | 115 | 2.0 | 41/59 | 52 |
| 15 |  | 2000:1 | 16 | 3.85 | 24 | 259 | 1.8 | 41/59 | 47 |

[a]Conditions: [M] (0.01 mmol), [Ph$_3$C][B(C$_6$F$_5$)$_4$] (B) (0.01 mmol), ethylene (1 atm), 150 mL toluene, 20° C., unless otherwise noted.
[b]Feed ratio (in mole) of AP$^R$ and a scandium complex.
[c]Gram of the polymer product.
[d]Determined by gel permeation chromatography (GPC) in o-dichlorobenzene at 140° C. against polystyrene standard. M$_n$ = number average molecular weight, M$_W$ = weight average molecular weight.
[e]Molar ratio of AP$^R$ and E in the copolymer, determined by $^1$H nuclear magnetic resonance (NMR) analysis.
[f]Determined by differential scanning calorimetry (DSC).
[g][M] = [B] = 0.02 mmol, 50 mL toluene.

INDUSTRIAL APPLICABILITY

According to the production method of the present invention, a copolymer of a nonpolar olefin and a polar olefin, which copolymer has a high ratio of a polar olefin structural unit and a high molecular weight, as well as a highly syndiotactic polar olefin polymer can be provided. The (co)polymer of the present invention is excellent in adhesion and compatibility with polar materials and are, therefore, expected to be utilized in various plastic materials, additives and the like.

The invention claimed is:
1. A nonpolar olefin-polar olefin copolymer that is a copolymer of a nonpolar olefin monomer and a polar olefin monomer represented by the following Formula (IV), the copolymer having a ratio of a polar olefin structural unit of not lower than 30% by mole with respect to all structural units:

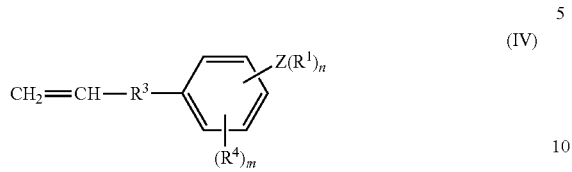

(IV)

wherein, Z represents a heteroatom selected from the group consisting of nitrogen, oxygen, phosphorus, sulfur, and selenium; $R^1$ represents a substituted or unsubstituted hydrocarbyl group having 1 to 30 carbon atoms; n represents an integer of 1 or 2 depending on the atomic species of Z; $R^3$ represents a hydrocarbylene group having 1 to 5 carbon atoms; and $R^4$ represents a halogen atom, a hydrocarbyl group having 1 to 10 carbon atoms, an alkylthio group having 1 to 10 carbon atoms, an alkylamino group having 1 to 10 carbon atoms, or an alkoxy group having 1 to 10 carbon atoms; when $R^4$ is a hydrocarbyl group, $R^4$ is optionally bound to form a fused ring; and m represents an integer of 0 to 4.

2. The nonpolar olefin-polar olefin copolymer according to claim 1, wherein the copolymer has a number-average molecular weight of not less than $2.0 \times 10^3$.

* * * * *